(12) United States Patent
Murphy et al.

(10) Patent No.: US 6,235,254 B1
(45) Date of Patent: *May 22, 2001

(54) HYBRID CATALYST HEATING SYSTEM WITH WATER REMOVAL FOR ENHANCED EMISSIONS CONTROL

(75) Inventors: Oliver J. Murphy; Rajesh T. Kukreja, both of Bryan, TX (US)

(73) Assignee: Lynntech, Inc., College Station, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,791

(22) Filed: Jul. 1, 1997

(51) Int. Cl.[7] .............................. B01D 47/00; B01J 8/02; B01J 8/00; F01N 3/00
(52) U.S. Cl. .................. 423/212; 423/210; 423/213.2; 423/245.3; 60/274; 60/300
(58) Field of Search ................ 423/210, 245.3, 423/213.2, 212; 60/274, 300

(56) References Cited

U.S. PATENT DOCUMENTS

| | | | |
|---|---|---|---|
| 3,761,229 | 9/1973 | Schwartz | 422/105 |
| 3,779,014 | 12/1973 | Nohira et al. | 60/286 |
| 4,499,864 | 2/1985 | Lovercheck et al. | 123/3 |
| 4,928,485 | 5/1990 | Whittenberger | 60/299 |
| 5,118,475 | 6/1992 | Cornelison | 422/174 |
| 5,130,109 | 7/1992 | Wan | 423/213.2 |
| 5,143,701 | 9/1992 | Schatz | 422/177 |
| 5,155,995 | 10/1992 | Kinnear et al. | 60/300 |
| 5,163,290 | 11/1992 | Kinnear | 60/274 |
| 5,184,462 | 2/1993 | Schatz | 60/274 |
| 5,207,734 | 5/1993 | Day et al. | 60/278 |
| 5,216,880 | 6/1993 | Aoki et al. | 60/276 |
| 5,259,190 | 11/1993 | Bagley et al. | 60/300 |
| 5,357,752 | * 10/1994 | Lucchesi | 60/274 |
| 5,379,592 | 1/1995 | Waschkuttis | 60/286 |
| 5,419,121 | 5/1995 | Sung et al. | 60/274 |
| 5,487,774 | 1/1996 | Peterson et al. | 95/45 |
| 5,497,617 | * 3/1996 | Bagley | 60/274 |
| 5,498,278 | 3/1996 | Edlund | 96/11 |
| 5,569,441 | * 10/1996 | Engler | 60/300 |

(List continued on next page.)

FOREIGN PATENT DOCUMENTS

4103668 A1  2/1991  (DE) .

OTHER PUBLICATIONS

P. Mark Golben, John E. Fox, PCT Patent Application, WO 94/03710, "Exhaust Gas Preheating System," 34 pages, drawing—8 pages.

D. L. Trim, "Catalytic Combustion," 1983, pp. 249–282, Applied Catalysis, vol. 7, (1983).

John R. Anderson and Michel Boudart, "Catalyst Science and Technology," 1981, p. 1941.

Primary Examiner—Steven P. Griffin
Assistant Examiner—Jonas N. Strickland
(74) Attorney, Agent, or Firm—Streets & Steele; Jeffrey L. Streets

(57) ABSTRACT

The present invention provides a method and apparatus for heating a catalytic converter at least to a light off temperature. In accordance with the invention, the catalytic converter may be heated using a novel monolith construction, electrical heating, catalytic combination of a fuel and oxygen or combinations of these methods. Heating or thermally conditioning a catalyst in accordance with the invention rapidly brings the catalyst up to the light off temperature for the efficient conversion of pollutant gases, such as unacceptable emissions emanating from an internal combustion engine, into water, carbon dioxide and other acceptable emissions. In particular, the invention provides efficient heating of the catalytic converter despite the potential presence of water on the catalyst during startup.

89 Claims, 53 Drawing Sheets

U.S. PATENT DOCUMENTS

| | | | |
|---|---|---|---|
| 5,571,484 | 11/1996 | Pettit et al. | 422/173 |
| 5,588,291 * | 12/1996 | Maus | 60/274 |
| 5,617,720 | 4/1997 | Achleitner et al. | 60/274 |
| 5,617,721 | 4/1997 | Slawson | 60/284 |
| 5,678,403 * | 10/1997 | Kanehara et al. | 60/311 |
| 5,776,417 * | 7/1998 | Frost et al. | 60/297 |
| 5,813,222 * | 9/1998 | Appleby | 60/274 |

* cited by examiner

HYBRID CATALYST HEATING SYSTEM WITH WATER REMOVAL FOR ENHANCED EMISSIONS CONTROL

BACKGROUND OF THE INVENTION

1. Field of the Invention

The present invention relates generally to the field of catalysis for the reduction of emissions from internal combustion engines. More particularly, the present invention relates to a method and apparatus for rapidly heating a catalytic converter to operating temperatures.

2. Background of the Related Art

Catalytic converters are commonly used to reduce unwanted emissions through catalytic combination of the emissions with oxygen from the air. Catalytic combination, often referred to as catalytic combustion, is a flameless process in which mixtures of emissions (or fuel) and air (or oxygen) are passed over a catalyst at a temperature high enough to favor total oxidation of the emissions (or of the fuel). The reaction occurs at the catalyst surface resulting in liberation of energy and production of reaction products. For organic fuels, the reaction products are primarily carbon dioxide and water.

The control and suppression of unwanted emissions created by the operation of an internal combustion engine is a primary consideration for engine designers and vehicle manufacturers because of nearly world-wide governmental requirements regarding acceptable emission levels. Over eighty percent (80%) of the unacceptable emissions or pollutants created by internal combustion engines equipped with catalytic converters occur during cold start operations. These pollutants are emitted for a period of one to three minutes after cold engine starting, in large part because that is the time period required for the catalyst to reach an efficient operating temperature. Therefore, even though the engine exhaust is flowing through the catalytic converter, until the exhaust heats the catalytic converter to its operating range from engine start up, the engine emissions are only slightly catalyzed during that time period.

In order to meet governmental emission standards for internal combustion engine exhaust, a catalytic converter is located in the exhaust stream of the engine. The converter typically includes a canister holding a suitable catalyst, such as a three-way catalytic converter (TWC) catalyst monolith, that will oxygenate unburned, unacceptable components in the exhaust stream including hydrocarbons (HC), their partially oxidized derivatives such as aldehydes and carbon monoxide (CO), and at the same time reduce nitrogen oxides ($NO_x$), after almost stoichiometric fuel burn with oxygen in the cylinders of the engine. The exhaust gas is passed through the catalyst monolith, thereby completing the oxygenation of unburned HC and CO, and the reduction of $NO_x$ in the exhaust to convert these unacceptable emissions into acceptable emissions. Certain unacceptable emissions in the exhaust stream, including unburned hydrocarbons and carbon monoxide, require an oxidation reaction to destroy them so that they end up as the corresponding oxides, e.g., water and carbon dioxide. On the other hand, $NO_x$ requires a reduction reaction to develop $N_2$ and $O_2$. In fact, the $O_2$ product of this reduction contributes to the oxidation of the HC and CO in the exhaust.

Catalytic converters are typically manufactured by coating a substrate, such as a metal or ceramic material, with a high surface area material, typically a metal oxide media. The catalytic material, such as a noble metal, is then deposited on the high surface area material. In the formation of such a catalytic converter, a sintered, dense and hardened ceramic substrate for example, which can be in the shape of a honeycomb, wagon-wheel, spiral or other molded or shaped objects, or simply be in the form of pellets, is coated with a slurry of the high surface area material, after which the catalyst is applied to the slurry-coated substrate, typically by application of a solution of a salt of that metal.

More particularly, the underlying ceramic substrate can be cordierite, mullite, alumina, lithium aluminosilicates, titania, zircon, feldspar, quartz, fused silica, clays, kaolin clay, aluminum titanate solid solutions, silicates, zirconia, spinels, glasses, glass ceramics, aluminates, and mixture thereof. The constituent ceramic materials are generally admixed with binders or shaping agents, processed, molded where applicable, and sintered. Coating of the substrate with the high surface area media can be effected either by immersion or dipping, followed by heat-treating the coated substrate at a temperature between 500 and 600° C. Procedures for depositing a high surface area "wash-coat" on the previously sintered ceramic substrate are disclosed, for example, in U.S. Pat. No. 3,824,196. Following application of the slurry of high surface area material, the catalyst is applied in the manner stated above. Alternatively, a single "wash-coat" mixture of the high surface area media and the catalytic material can be applied together.

TWC catalysts are currently formulated and designed to be effective over a specific operating range of both lean and rich fuel/air conditions and a specific operating temperature range. These particular catalyst compositions enable optimization of the conversion of HC, CO, and $NO_x$. This purification of the exhaust stream by the catalytic converter is dependent on the temperature of the exhaust gas and the catalytic converter works optimally at an elevated temperature, generally at or above about 300° C. "Light-off temperature" is generally defined as the temperature at which fifty percent (50%) of the emissions from the engine are being converted as they pass through the catalyst. The time period between "cold start" and reaching the light off temperature is generally referred to as the "light-off time."

The conventional method of heating the catalytic converter is to heat the catalyst by contact with high temperature exhaust gases from the engine. This heating, in conjunction with the exothermic nature of the oxidation reaction occurring at the catalyst, will bring the catalyst to light-off temperature. However, until the light-off temperature is reached, the exhaust gas passes through the catalyst relatively unchanged. In addition, the composition of the engine exhaust changes as the engine heats from the cold start temperature, and the catalyst monolith is typically designed to work best with the composition of the exhaust stream produced at the normal elevated engine operating temperature.

There have been several attempts to shorten or avoid the light-off time of the catalytic converter. Current techniques employ one of the following methods: electrical heating of the exhaust gases and/or of the catalytic converter itself; thermal insulation of the exhaust line and/or the catalytic converter; multi-chambered configurations of the catalytic converter; placing the catalytic converter adjacent to the engine for heating; combustion of fuels upstream of the catalytic converter; and catalytic combination of fuels and oxygen at the catalyst surface. All of these methods have drawbacks and limitations.

Placing the catalytic converter almost immediately adjacent to the engine is not desirable because of the tendency to overheat the catalyst with resulting accelerated degradation of the catalyst. Thermal insulation is also not a desirable option because of the same problems, especially during operation at maximum operating temperature ranges.

Electrical heating of catalytic converters ("EHC") has been a popular proposed method of attempting to preheat the catalyst monoliths. Limitations on the equipment and process, however, affect the utility of this method. The primary limitation on electrical preheating is the electrical energy required by the heater. The typical car battery is not a practical power source to supply the electrical power because the electrical load on the vehicle battery during the period required may exceed the rated battery output. In any event, the load placed on a typical 12 volt vehicle battery will shorten the lifetime of the battery. Also, there is a measurable delay between the time the operator of the vehicle places the ignition switch in the "on" position and the time the heater brings the catalyst to light-off temperature.

Typically, in the interval between start up and light-off, the exhaust stream is oxygen deficient. Because the catalyst requires oxygen to complete the catalytic reaction, supplemental air must be blown over the catalyst. Even when using a secondary air flow to overcome oxygen deficiency, the secondary air flow must be closely controlled to avoid an excess of oxygen, in which case the catalytic converter is less effective in reducing $NO_x$. However, it should be noted that $NO_x$ contributes a very small portion of unacceptable emissions when an engine is cold; most of the cold start emissions that must be dealt with comprise HC, CO and the like.

An alternative to battery powered electrical heating has been to decrease the strain on the power supply by supplying the power directly from an alternator rather than directly from the vehicle battery. An alternator powered, electrically heated catalyst ("APEHC") still requires a 5 to 10% increase in battery capacity to cope with the EHC start-up scenario. Even with the APEHC system, there is still a concern with respect to battery capacity because electrical heating is needed for an extended period of time, i.e., more than 25–30 seconds. In addition, the maximum alternator power output required in the APEHC system requires a complicated switching mechanism and an altered alternator speed between 2,000 and 4,500 rpm during the heating up time period, and the alternator must be oversized.

The multi-chamber configurations of catalytic converters generally conform to one or two theories. In one multi-chamber configuration, a small portion of catalyst known as a "starter catalyst" is positioned upstream from the primary catalyst. This "starter catalyst" is generally closer to the exhaust manifold. This location, in conjunction with a smaller thermal mass associated with its smaller size and materials of construction, causes the catalyst to heat much more quickly than the primary catalyst. This configuration, however, is generally unacceptable because the starter catalyst in the exhaust stream creates a higher back pressure which reduces the overall engine efficiency and robs the engine of power output.

Another method of providing multiple chambers in the exhaust flow includes a first catalyst having low temperature characteristics used only during cold start conditions, and, after the catalyst temperature rises to a certain elevated level, the exhaust gas flow is switched to pass through the conventional catalytic converter configuration. A variation of this approach is to run all cold start emissions through a separate absorber (such as a zeolite or a metal sieve-type substance) where unacceptable emissions are captured and later released back into the exhaust stream. This method, however, is impractical because of the complicated switching mechanism used to divert flow to the absorber, the size and space requirements of the absorber, and the impracticality of releasing the unacceptable emissions from the absorber back into the exhaust stream.

An additional method for reducing cold start emissions runs the engine excessively rich in the cold start condition and ignite the resulting super-rich mixture to directly heat the catalyst. This approach has proved wholly unreliable and has other serious drawbacks, including reduced engine and catalyst life.

Catalytic combination of a fuel with oxygen at the surface of the catalyst generates heat that can rapidly bring the catalytic converter to light off temperature. For example, the introduction of hydrogen to a TWC catalyst can heat portions of the catalyst to 300° C. or greater within a period of several seconds. However, the significant amount of hydrogen necessary to cause this rapid, high temperature heating makes it impractical to store enough hydrogen for any large number of heating cycles. Consequently, it is a practical result that hydrogen must be generated onboard the vehicle.

In accordance with the present invention, it has been found that the conversion efficiency of the catalyst in the catalytic converter is detrimentally affected by the presence of water. A large amount of water vapor may be introduced to the catalyst along with the reactant gases, such as hydrogen and air. Even the catalytic combination of hydrogen and air produces water. If the reactants are provided in low concentrations or the catalyst is operated at a temperature below about 100° C. for extended periods of time, then water will remain or condense on the catalyst surface.

This water collects within the pores of the catalyst or washcoat layer and covers or surrounds the noble metal catalyst particles within the washcoat layer. Therefore, in order for the catalytic combination reaction to occur, the hydrogen and air must diffuse through the water (either liquid or ice) layer or film, greatly increasing the time to reach catalyst light-off temperatures. The presence of water can effect the performance of catalyst particles in many applications, including regenerable particulate filters used to trap carbon particles in diesel engine exhaust fumes.

Therefore, there is a need for a catalytic converter heating system which provides rapid heating of the catalytic converter without the inherent drawbacks stated above. Thus, there remains a need for an improved catalytic converter system that reduces ineffective catalytic action immediately after cold start-up of an engine. Such a system must be simple and must not reduce the rated lifetime of the engine, the catalytic converter, or the battery components of the vehicle.

SUMMARY OF THE INVENTION

The present invention provides a method of conditioning a catalyst for catalytic destruction or decomposition of a pollutant gas, comprising the steps of electrically heating a first region of a catalyst, and catalytically oxidizing a fuel that undergoes low temperature catalytic oxidation with oxygen in the catalyst monolith. The method may further comprise the step of passing the pollutant gas through the catalyst monolith. Additionally, the method may further comprise the step of catalytically combining oxygen and a second fuel that undergoes low temperature catalytic oxidation in the catalyst monolith. Preferably the electrical heating renders the first region substantially dry.

Preferably, the fuel will catalytically oxidize at a temperature below about 250° C., below about 130° C. or below about 75° C. The fuel may be an organic gas, such as propane, butane, propene, butene and combinations thereof, or an organic liquid, such as pentane, hexane, heptane, pentene, hexene, heptene and combinations thereof. However, the most preferred fuels are selected from hydrogen, methanol, ethanol, dimethoxymethane, trimethoxymethane, methylformate, diethyl ether, and combinations thereof. It may be necessary or desirable to mix the gaseous or liquid fuel with oxygen to obtain a substantially homogeneous mixture prior to introducing the fuel to the catalyst monolith. The liquid fuel may preferably be introduced as a fine mist or spray and most preferably having droplets sized less than about 25 μm. A source of oxygen may communicate with the catalyst monolith to provide an excess of oxygen, a substantially stoichiometric amount of oxygen, or a sub-stoichiometric amount of oxygen to the catalyst monolith.

In accordance with the present invention, the catalyst monolith may be electrically heated to a temperature above about 100° C., to a temperature sufficiently high to provide substantially complete oxidation of the fuel, or to a temperature above about 250° C. The catalytic combination of oxygen and fuel on the catalyst monolith may be provided to yield a temperature sufficiently high to provide substantially complete oxidation of the pollutant gas. The flow rate of the fuel or the oxygen may be adjusted to obtain a desired temperature. In one embodiment of the invention, a second fuel that undergoes low temperature catalytic oxidation is catalytically combined with oxygen in the catalyst monolith, wherein the second fuel is a liquid fuel.

The invention also includes a method of heating a catalyst, comprising the steps of electrically heating a region of the catalyst monolith to a first temperature, and then chemically heating the region of the catalyst monolith to a second temperature greater than the first temperature. The step of chemically heating may comprise combining a fuel that undergoes low temperature catalytic oxidation with oxygen.

The invention also provides a catalyst bed, comprising a porous substrate, a porous washcoat covering a surface of the porous substrate, and catalyst particles exposed over a surface of the washcoat, wherein the washcoat and ceramic substrate have sufficient porosity to draw condensates into the ceramic substrate. Preferably the porous metal or ceramic substrate is hydrophilic and may contain both nano-pores and micro-pores, perhaps having pores with a diameter between about 5 and about 1000 Angstroms. Porous metal substrates may comprise sintered metal particles and may be electrically conductive to form a resistive element of an electrical heater.

The invention further provides a system for heating a catalyst monolith in an exhaust gas line, comprising an electrical heater in thermal communication with a region of the catalyst monolith, a fuel source, and a conduit disposed between the fuel source and the catalyst monolith. The electrical heater may comprise a second catalyst monolith having a metal substrate. Further, the electrical heater may be disposed in the exhaust gas line upstream from the catalyst monolith. Preferably, the system will further comprise a flow control member disposed in the conduit. The fuel source may be a hydrogen generator, such as an electrolyzer, or any suitable fluid container. Additionally, the system may further include an oxygen source selected from air, stored oxygen and an oxygen producing electrolyzer.

Yet another aspect of the invention provides an electrically heated device for catalytic conversion of exhaust gases comprising a catalytically active honeycomb structure having inlet and outlet end faces, a matrix of thin walls defining a plurality of cells extending longitudinally and mutually parallel therethrough between the inlet and outlet end faces, and at least two electrodes spaced around the outer surface and near the inlet end face of the structure.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
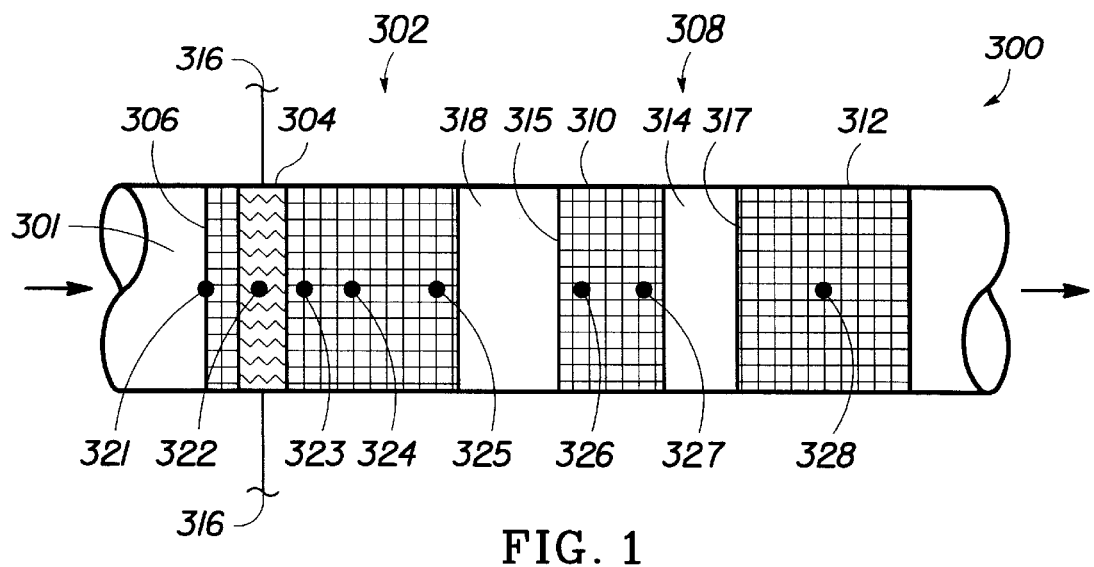
FIG. 1 is a cross-sectional view of a catalytic converter system of the present invention.

The present invention provides a method and apparatus for heating a catalytic converter at least to a light off temperature. In accordance with the invention, the catalytic converter may be heated using a novel monolith construction, electrical heating, catalytic combination of a fuel and oxygen or combinations of these methods. Heating or thermally conditioning a catalyst in accordance with the invention rapidly brings the catalyst up to the light off temperature for the efficient conversion of pollutant gases, such as unacceptable emissions emanating from an internal combustion engine, into water, carbon dioxide and other acceptable emissions. In particular, the invention provides efficient heating of the catalytic converter despite the potential presence of water on the catalyst during startup.

In one aspect of the invention, a novel catalytic converter monolith is provided which includes a porous substrate, a porous washcoat and catalyst particles. Unlike highly sintered ceramics or metal, the substrate of the present invention may be provided with sufficient porosity to draw moisture or condensates from the washcoat layer into the substrate layer. The pores throughout the substrate, which may include both nano-pores and micro-pores, provide a reservoir in which water can be stored until the temperature of the catalytic converter rises to vaporize and remove the water. Water vapor preferentially condenses within the pores rather than the exposed surfaces of the catalyst particles. Therefore, at least a major portion of the catalyst particles will remain relatively dry and active for immediate catalytic oxidation of a fuel that undergoes low temperature catalytic oxidation in the presence of oxygen. The porous substrate may comprise a porous metal or a porous ceramic. Furthermore, the porous metal may be electrically conducting and perhaps also serve as the element for electrical heating.

In another aspect of the invention, a method is provided for conditioning a catalyst for catalytic combination of a pollutant gas, such as an exhaust gas, with oxygen. This method comprises the steps of electrically heating a first region of the catalyst monolith and catalytically combining oxygen and a fuel that undergoes low temperature catalytic oxidation in the catalyst monolith. The electrical heating and catalytic oxidation may be performed simultaneously, semi-simultaneously or in sequence. Preferably, the electrical heating renders the first region of the catalyst monolith substantially dry. The method may further comprise the step of passing an exhaust gas through the catalyst monolith, either simultaneous with a portion of one or more of the previous steps or following completion of the previous steps. While the fuels may be organic gases or liquids, the preferred fuels are selected from hydrogen, methanol, ethanol, dimethoxymethane, trimethoxymethane, methylformate, diethyl ether, and combinations thereof. Both liquid and gaseous fuels are preferably mixed with oxygen or air to provide a substantially homogeneous mixture prior to introducing the fuels to the catalytic converter.

In another aspect of the invention, a plurality of chemical heating agents may be used. One preferred method comprises the steps of electrically heating a first region of the catalyst monolith, catalytically combining oxygen and a first fuel that undergoes low temperature catalytic oxidation in the catalyst monolith, and then catalytically combining oxygen and a second fuel that undergoes low temperature catalytic oxidation in the catalyst monolith. While the first and second fuels may be in the same phase or different phases, it is most preferred that the first fuel undergo catalytic oxidation at a much lower catalytic oxidation temperature than the second fuel. A preferred first fuel is hydrogen and a preferred second fuel is methanol. While hydrogen could be used satisfactorily for the entire chemical heating process, it is impractical to store sufficient amounts of gaseous hydrogen for any significant number of heating cycles. Furthermore, the oxygen may be provided to the catalyst monolith as air or stored oxygen in either excess, stoichiometric, or sub-stoichiometric quantities. Again, it is preferred that the electrical heating render the catalyst monolith substantially dry.

While the present invention includes any combination of electrical and chemical heating, it is beneficial to electrically heat the catalyst monolith to a temperature above about 100° C., thereby vaporizing water. It may also be beneficial to further heat the catalyst monolith to a temperature above about 250° C. Alternatively, electrically heating may be used to raise the catalyst monolith to a temperature sufficiently high to provide substantially complete oxidation of the fuel. The step of catalytically combining oxygen and the fuel on the catalyst monolith is preferably continued until the catalyst monolith reaches a temperature sufficiently high to provide substantially complete oxidation of the pollutant gas. To efficiently reach a desired temperature or avoid an undesirably high temperature, the method provides for adjusting the flow rate of the fuel or the oxygen. Where the fuel is a liquid, the present invention includes introducing liquid fuels to the catalyst monolith as a fine mist or spray.

The present invention also provides a method of heating a catalyst, comprising the steps of electrically heating a region of the catalyst monolith to a first temperature, and then chemically heating the region of the catalyst monolith to a second temperature greater than the first temperature. It is preferred that the step of chemically heating comprises catalytically combining a fuel that undergoes low temperature catalytic oxidation with oxygen in the catalyst monolith.

Furthermore, the present invention provides a system for heating a catalyst monolith in an exhaust gas line, comprising an electrical heater in thermal communication with a region of the catalyst monolith, a fuel source, and a conduit disposed between the fuel source and the catalyst monolith. The electrical heater may comprise a second catalyst monolith having a metal substrate and may be disposed in the exhaust gas line upstream from the catalyst monolith. The system preferably includes a flow control member disposed in the conduit. One preferred fuel source is a hydrogen generator. The system also preferably includes a source of oxygen, such as air or an electrolyzer.

Finally, the present invention provides a regenerable diesel particulate filter having both electrical and chemical heating as described above. The construction and operation of a regenerable diesel particulate filter is disclosed by U.S. Pat. No. 5,259,190 which is incorporated herein by reference.

FIG. 1 is a cross-sectional view of a catalytic converter system 300 of the present invention. The system 300 includes a pollutant gas passage 301, a first catalyst monolith section 302 having an electrical heater element 304 near its front face 306, and a second catalyst monolith section 308 disposed downstream from the first section 302. The second catalyst monolith section 308 may comprise one or more monolith members, such as monoliths 310 and 312 having a gap 314 therebetween. The electrical heater element 304 may be of any known design capable of heating the monolith section 302, either internal or external, but preferably incorporates a resistive metal substrate having electrical connections 316 for coupling with a power supply (not shown). A catalyst monolith having a resistive metal substrate suitable for heating the monolith is disclosed in U.S. Pat. No. 4,928,485, which is incorporated by reference herein.

For use in various experiments, the system 300 was equipped with eight thermocouples disposed within the catalyst monolith sections 302,308 near the radial center. The first catalyst monolith 302 having a total length of about 124 mm and an electrically heated region 304 was provided with five thermocouples 321,322,323,324,325 located at distances of about 3 mm, 16 mm, 32 mm, 57 mm and 114 mm, respectively, from the front face of the monolith. A second catalyst monolith section 308 includes a member 310 having a length of about 46 mm disposed downstream from the first catalyst monolith section 302 by a gap 318 of about 40 mm and member 312 having a length of about 79 mm disposed downstream from the member 310 by gap 314 of about 25 mm. The monolith member 310 was provided with two thermocouples 326,327 located at distances of about 6 and 38 mm from the front face 315. The monolith member 312 was provided with a single thermocouple 328 located at a distance of about 38 mm from the front face 317. Both monolith sections 302,308 were wrapped in an insulation and placed inside a glass tube.

Figure 2:
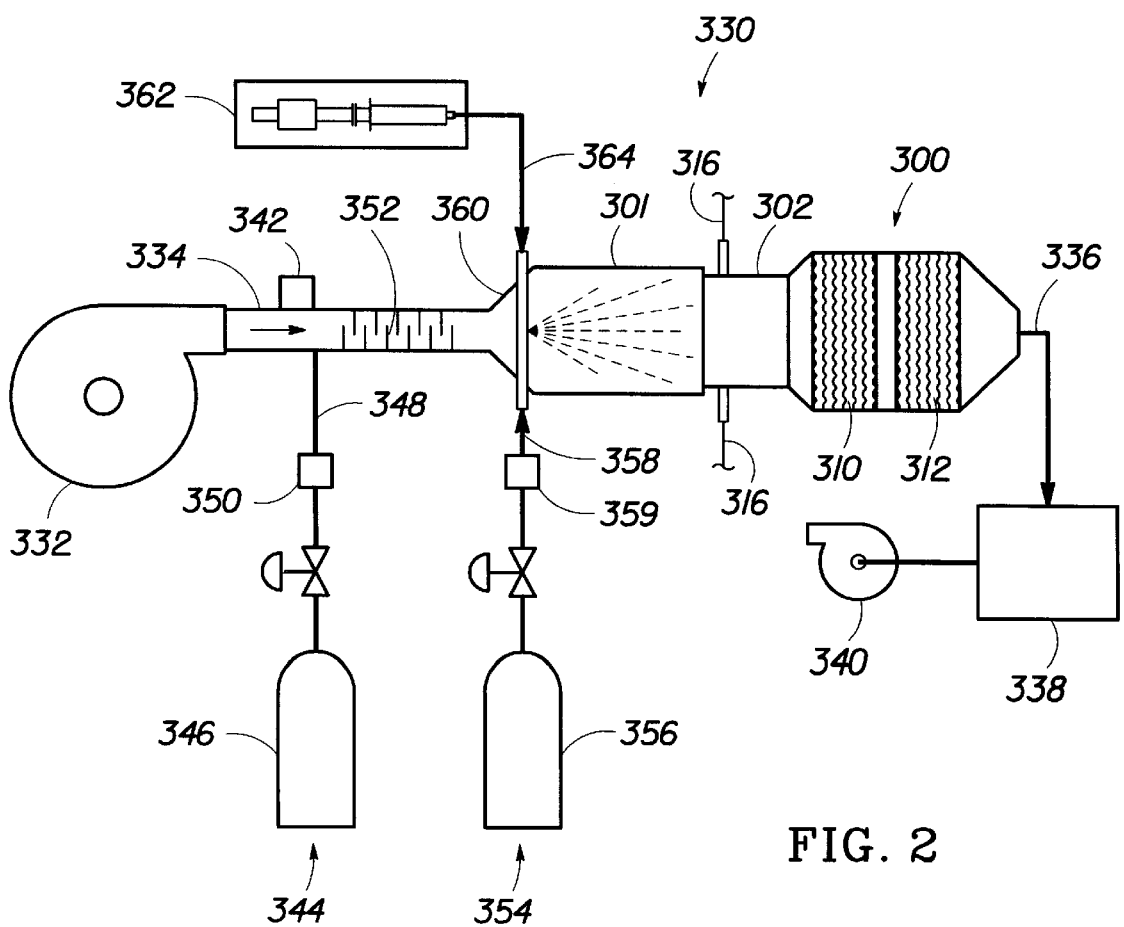
FIG. 2 is a schematic diagram of an experimental setup for testing the catalytic converter of FIG. 1.

FIG. 2 is a schematic diagram of an experimental setup 330 designed to simulate a vehicle exhaust system for testing the catalytic converter system 300 of FIG. 1. The setup included an air blower 332, representative of an engine exhaust gas flow, communicating through pipe sections 334 and 301 to the catalytic converter system 300. A flowmeter 342 was installed in the pipe section 334. The gases exiting the system 300 were collected by a gas sampling loop 336 and delivered to a gas chromatograph 338 having a suction pump 340 coupled to the outlet thereof.

The setup 330 was also provided with two separate subsystems 344, 354 for delivering gaseous and/or liquid fuels, respectively, that undergo low temperature catalytic oxidation with oxygen in the catalytic converter 300. The gaseous fuel subsystem 344 included a hydrogen tank 346 (with a regulator and control valve), a conduit 348 coupling the tank 346 with the pipe 334, and a flowmeter 350 disposed in the conduit 348 for monitoring the hydrogen flow rate. The gaseous fuel subsystem 344 was also equipped with a mixer, such as a static mixer 352, disposed in the pipe 334 to mix the gases before entering the catalytic converter 300. The liquid fuel subsystem 354 included an air tank 356 (with a regulator and control valve), a conduit 358 coupling the tank 356 with a nozzle 360 upstream of the catalytic converter 300, and a flowmeter 359 for monitoring the air flow rate. The liquid fuel subsystem 354 also included a syringe pump 362 for metering a liquid fuel, such as methanol, through a conduit 364 also communicating with the nozzle 360. The simultaneous flow of air and liquid fuel to a suitable nozzle 360 will produce a fine mist or spray of the fuel to the catalytic converter 300.

Figure 3A:
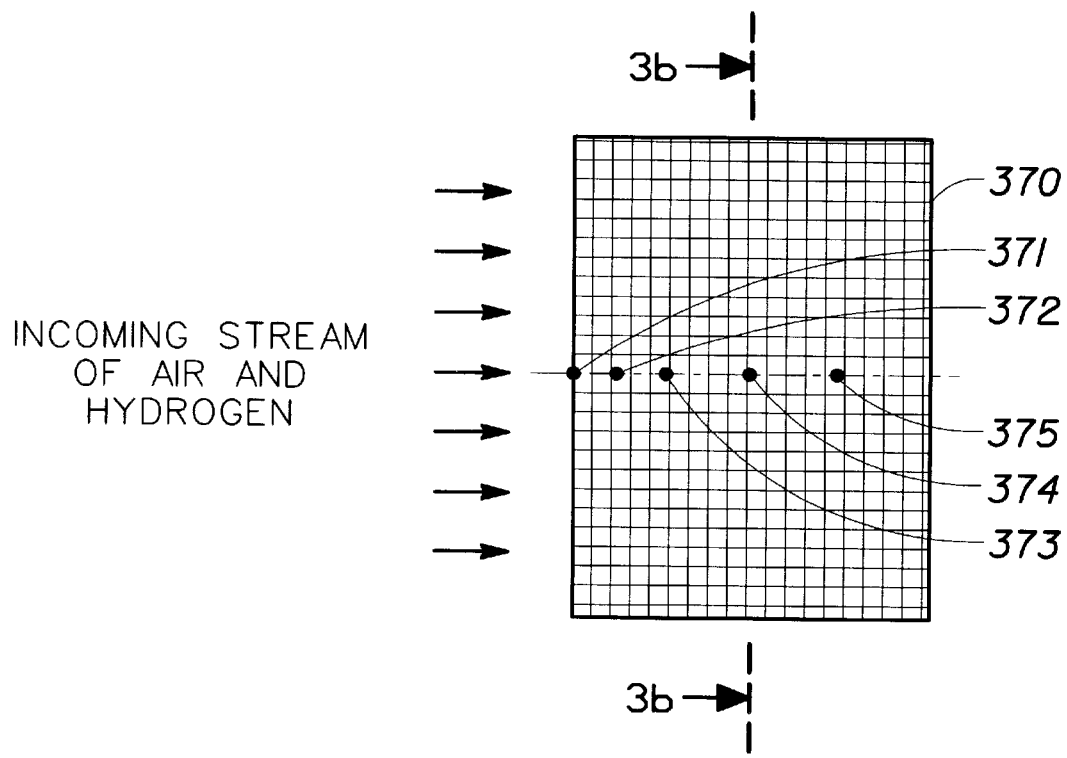
FIG. 3 is a cross-sectional view of an alternative catalytic converter.
Figure 3B:
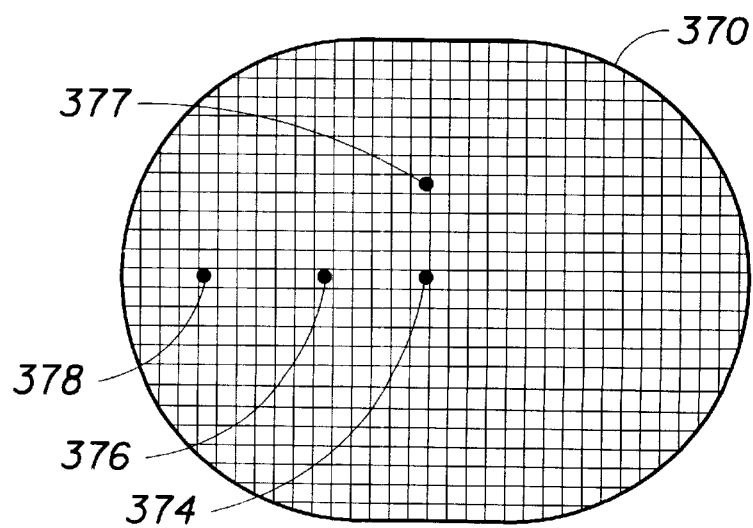

FIGS. 3(a) and 3(b) are cross-sectional side and face views of an alternative catalytic converter 370 which comprises a single continuous catalyst monolith. For use in various experiments, the catalytic converter 370 had a length of about 53 mm and an oval-like cross-section about 121 mm in width and about 80 mm in height. Again, eight thermocouples were disposed within the monolith 370. Five thermocouples 371,372,373,374,375 were disposed near the radial center of the monolith 370 at distances of about 0 mm, 5 mm, 11 mm, 22 mm, and 41 mm, respectively. Three additional thermocouples were disposed at other radial positions about 22 mm into the monolith 370. One thermocouple 376 was disposed about 19 mm to the side of the thermocouple 374, a second thermocouple 377 was disposed about 19 mm above the thermocouple 374, and a third thermocouple 378 was disposed about 44 mm to the side of thermocouple 374.

Figure 4:
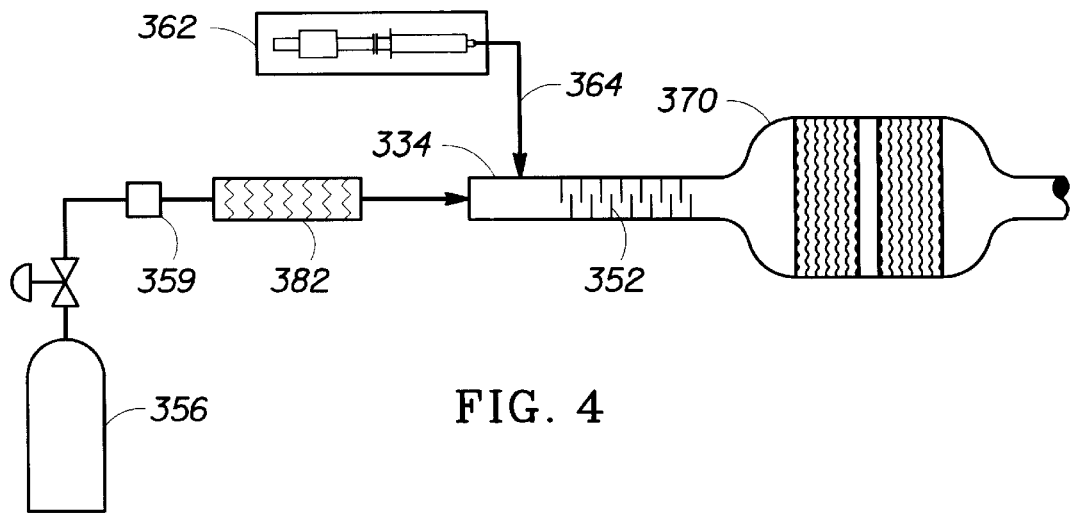
FIG. 4 is a schematic diagram of a second experimental setup for testing the catalytic converter of FIG. 3.

FIG. 4 is a schematic diagram of a second experimental setup 380 for testing the catalytic converter of FIG. 3. In accordance with setup 380, the air tank 356 (with a regulator and control valve) communicates air through a flowmeter 359, past a heating member 382 to pipe 334. A syringe pump 362 was used to deliver a liquid organic fuel through a conduit 364 into the pipe 334 where it was mixed with the air and passed through the mixer 352 before coming into contact with the catalytic converter 370. During various experiments with setups 330 (of FIG. 2) and 380, the output from each of the thermocouples was recorded by a data logger (not shown).

Figure 5:
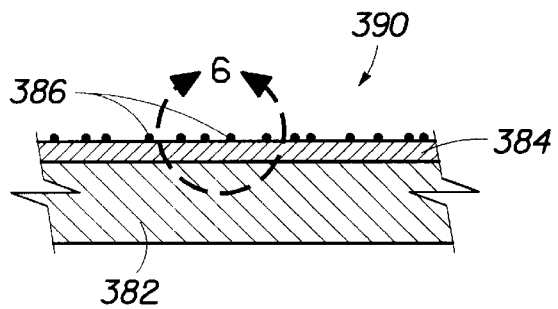
FIG. 5 is a cross-sectional view of a catalytic converter monolith having a porous ceramic substrate.

FIG. 5 is a cross-sectional view of a supported catalyst bed 390 in accordance with one aspect of the present invention. The catalyst bed 390 includes a porous substrate 382, a high surface area, porous washcoat 384 disposed over the porous substrate 382, and catalyst particles 386 exposed over the surface of the washcoat 384.

Figure 6:
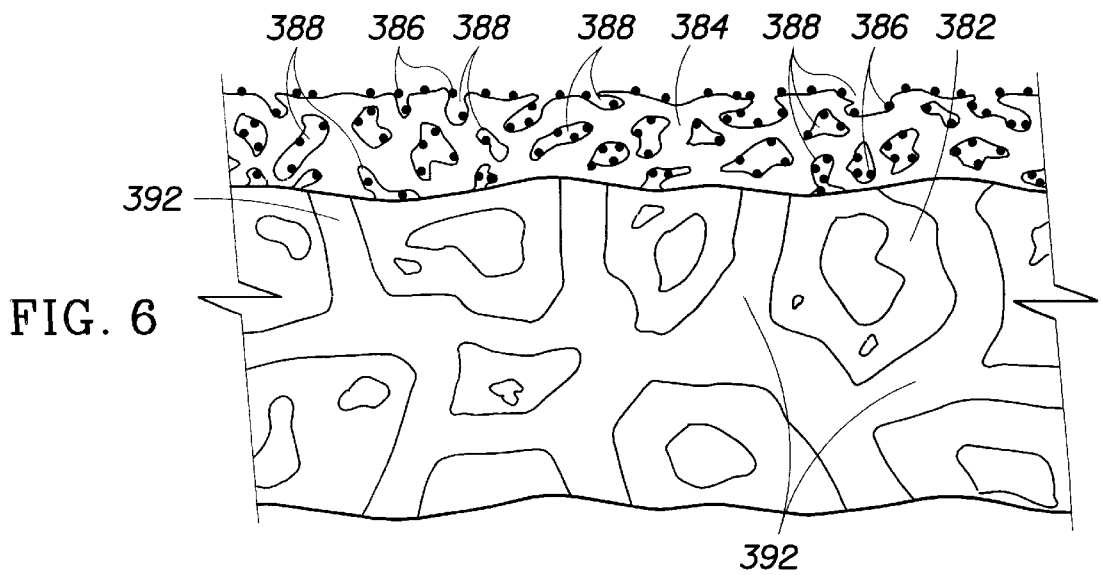
FIG. 6 is a magnified cross-sectional view of the porous ceramic substrate, washcoat and catalyst particles.

FIG. 6 is a magnified partial cross-sectional view of the supported catalyst bed 390 of FIG. 5 including the porous ceramic substrate 382, washcoat 384 and catalyst particles 386. The washcoat may be prepared in any fashion or formula known to those in the art, such as those washcoats disclosed in U.S. Pat. No. 5,130,109, which is incorporated herein by reference. Accordingly, the catalyst particles 386 may be applied over the washcoat or disposed throughout the washcoat so long as catalyst particles have surfaces that are exposed. The washcoat 384 includes pores 388 that provide a pathway from the top surface of the washcoat 384 to the pores 392 of the porous substrate 382. The pores 388 and 392 are preferably sized to draw moisture away from the catalyst particles of the washcoat layer 384 and into the pores of the substrate 382, thereby maintaining the catalyst in a relatively dry condition. The pores may include both nano-pores and micro-pores.

Fuels suitable for use in accordance with the present invention are listed in Table 1 below.

TABLE 1

| Compounds | Melting Point, °C. | Boiling Point, °C. | Auto-ignition Temp, °C. |
|---|---|---|---|
| Methane | −182.4 | −161.5 | 537 |
| Ethane | −182.8 | 88.6 | |
| Propane | −187.6 | −42.1 | |
| Butane | −138.4 | −0.5 | 287 |
| Pentane | −129.7 | 36.1 | 309 |
| Trimethyl pentane | −107 | 98.5 | |
| Hexane | −95.3 | 68.7 | 225 |
| Heptane | −90.6 | 98.5 | 222 |
| Octane | −56.8 | 125.6 | 206.1 |
| Acetylene | −84. | −80.8 | 298 |
| Ethylene | −169.0 | −103.7 | 449 |
| 1-Propene | −185.2 | −47.6 | 455 |
| 1-Butene | −185.3 | −6.2 | 375 |
| (trans) 2-Butene | −105.5 | 0.8 | 323 |
| (cis) 2-Butene | −138.9 | 3.7 | 323 |
| 1-Pentene | −165.2 | 29.9 | 273 |
| (trans) 2-Pentene | −140.2 | 36.3 | |
| (cis) 2-Pentene | −151.4 | 36.9 | |
| 2,3,4-Trimethyl-2-pentene | −113 | 116 | |
| 1-Hexene | −139.7 | 63.4 | 265 |
| (trans) 2-Hexene | −133. | 67.9 | 244 |
| (cis) 2-Hexene | −141.1 | 68.8 | |
| (tran) 3-Hexene | −115.4 | 67.1 | |
| (cis) 3-Hexene | −137.8 | 66.4 | |
| 1-Heptene | −119.7 | 93.6 | 262 |
| (tran) 2-Heptene | −109.5 | 98.1 | |
| (cis) 2-Heptene | | 98.4 | |
| (tran) 3-Heptene | −137 | 94 | |
| (cis) 3-Heptene | | 95.7 | |
| Tetrahydrofuran | −106 | 65 | |
| Dioxane | 11.8 | 101 | 180 |

TABLE 1-continued

| Compounds | Melting Point, °C. | Boiling Point, °C. | Auto-ignition Temp, °C. |
|---|---|---|---|
| Cyclohexane | | 78 | |
| Cyclohexene | −104 | 83 | |
| Cycloheptatriene | −79.5 | 116 | |
| Cycloheptene | −56 | 114.7 | |
| (cis) Cyclooctene | −16 | 145 | 280 |
| Cyclopentane | −94 | 50.1 | 380 |
| Cyclopentene | | 44 | |
| Cyclopropane | −128 | −33 | |
| 1-Methyl, 1-Cyclopentene | 0 | 72.1 | |
| Cycloheptane | −12 | 118.6 | |
| 1-Propanol | −126 | 97 | 413 |
| 2-Propanol | −89 | 82 | |
| n-Butyl alcohol | −89 | 117 | 343 |
| tert.Butyl alcohol | 25 | 83 | 480 |
| sec.Butyl alcohol | −115 | 98 | |
| Methyl ether | −141 | −24.8 | |
| Diethyl ether | −123 | 35 | |
| Propyl ether | −123 | 89 | |
| iso-Propyl ether | | 68 | |
| tert-Amyl ether | | 85 | |
| Butyl ethyl ether | −124 | 91 | |
| tert-Butyl ether | −97 | 72 | |
| Methanol | −98 | 64.6 | 463.9 |
| Ethanol | −114.1 | 78.5 | 422.3 |
| 1,1-Dimethoxyethane | | 64 | |
| Acetaldehyde | −125 | 21 | |
| Dimethoxymethane | −105 | 41 | |
| Diethoxymethane | | 87 | |
| 1,1-Diethoxyethane | | 102 | |
| 1,2-Diethoxyethane | −74 | 121 | |
| Methyl formate | −99.8 | 31.5 | 456 |
| Bis(2-Methoxyethyl) ether | −68 | 161 | |

EXAMPLE #1

Figure 7A:
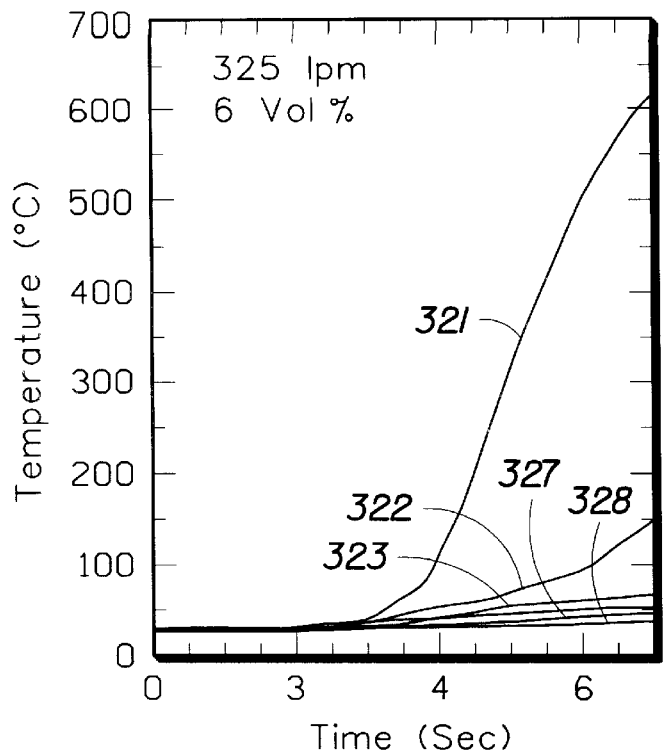
FIG. 7 is a graph of catalyst temperature over time with introduction of hydrogen and air into the catalytic converter of FIG. 1.
Figure 7B:
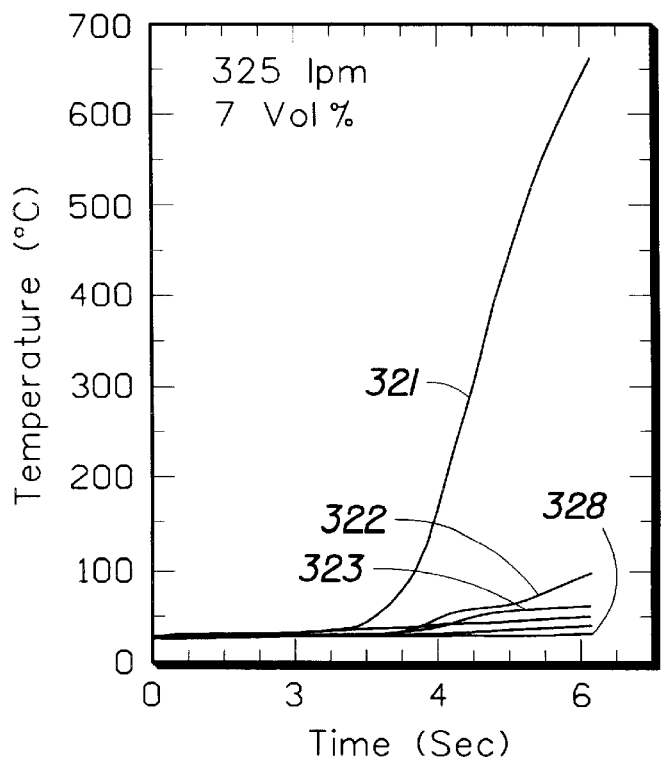
Figure 7C:
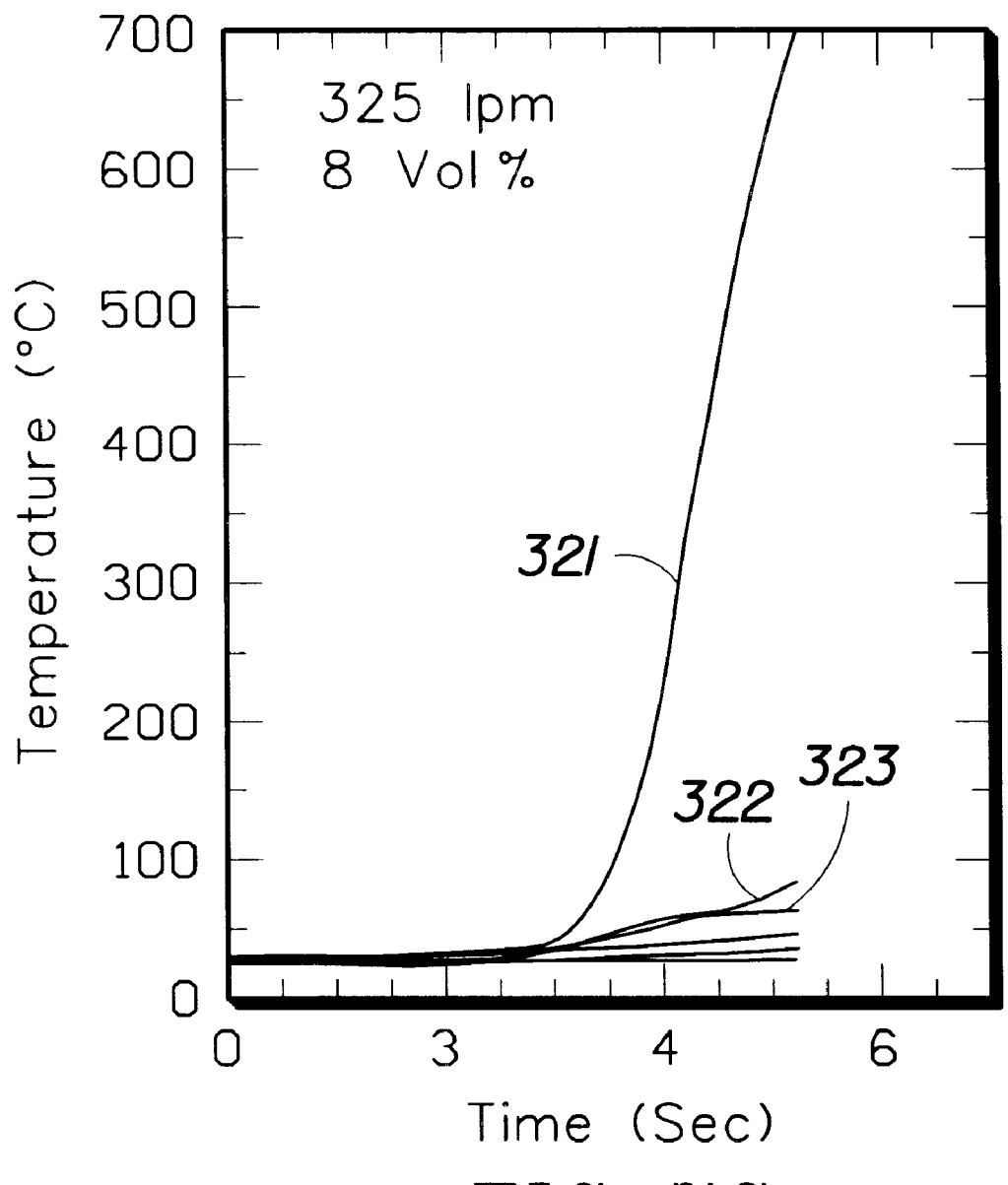

The experimental setup 330 of FIG. 2 was used for the introduction of hydrogen and air to a substantially dry catalytic converter 300. The blower 332 provided air through the catalytic converter 300 at a rate of about 325 liters per minute (lpm). Heating of the catalytic converter was tested at 6 volume percent (vol %), 7 vol % and 8 vol % hydrogen in air. FIGS. 7(a–c) are graphs showing the results of catalyst temperature over time with introduction of hydrogen and air.

EXAMPLE #2

The experimental setup 330 of FIG. 2 was used for the introduction of hydrogen and air to a wet catalytic converter 300. About 2 milliliters per minute of water was applied to the converter 300 at room temperature over a period of about 10 minutes through the liquid injection subsystem and allowed to soak for a period of about 10 minutes to simulate water that condenses in an automotive catalytic converter as the system cools. The blower 332 then provided air through the catalytic converter 300 at a rate of about 325 liters per minute (lpm) with about 6 vol % hydrogen. FIGS. 8(a–d) are graphs of the catalyst temperature over time with introduction of hydrogen and air to a wet catalyst along with no electrical heating, electrical heating from room temperature to 50° C., electrical heating from room temperature to 100° C., electrical heating from room temperature to 150° C.

In the graphs, the temperature profile given by each thermocouple is labeled by the corresponding reference number of FIG. 1. Also, the point at which the thermocouple 322 within the electrically heated region 304 reached a termination temperature, thereby shutting off the electrical heating, is indicated by the letters "EHC".

Figure 8A:
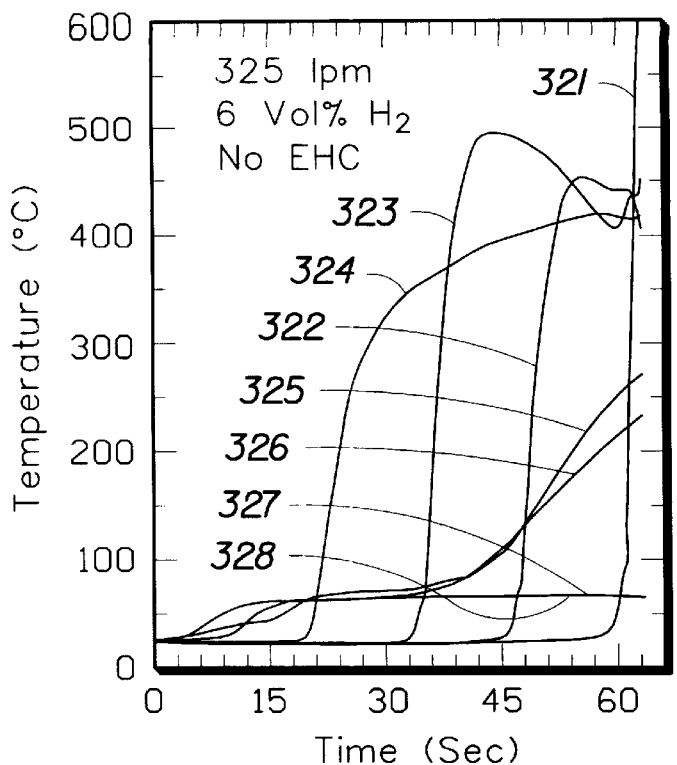
FIG. 8 is a graph of catalyst temperature over time illustrating the benefits of using both electrical heating and introduction of hydrogen and air into the catalytic converter of FIG. 1 when the catalyst is wet.
Figure 8B:
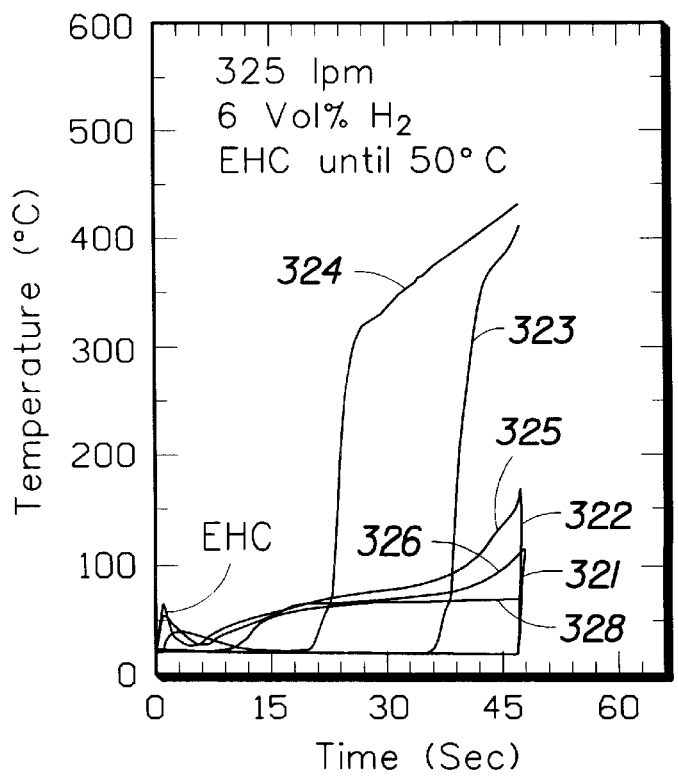
Figure 8C:
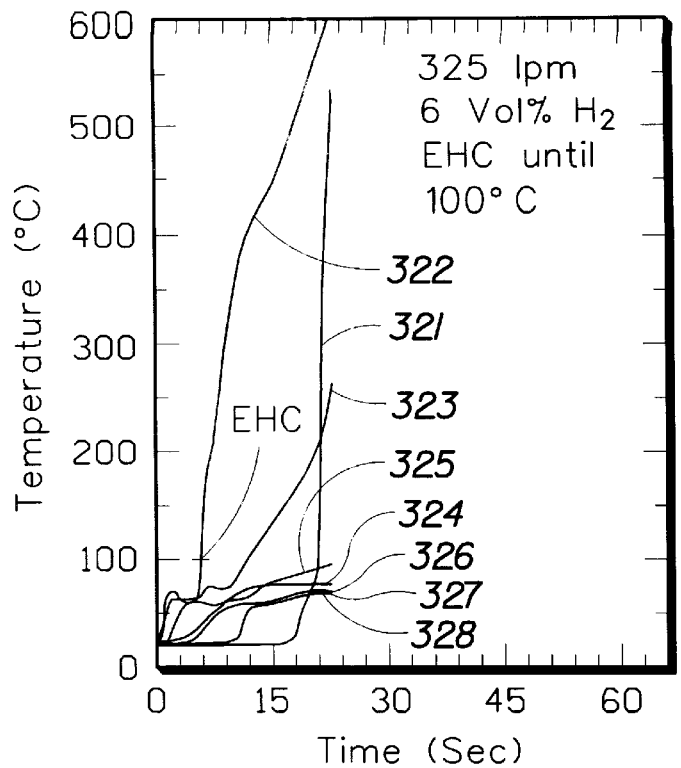
Figure 8D:
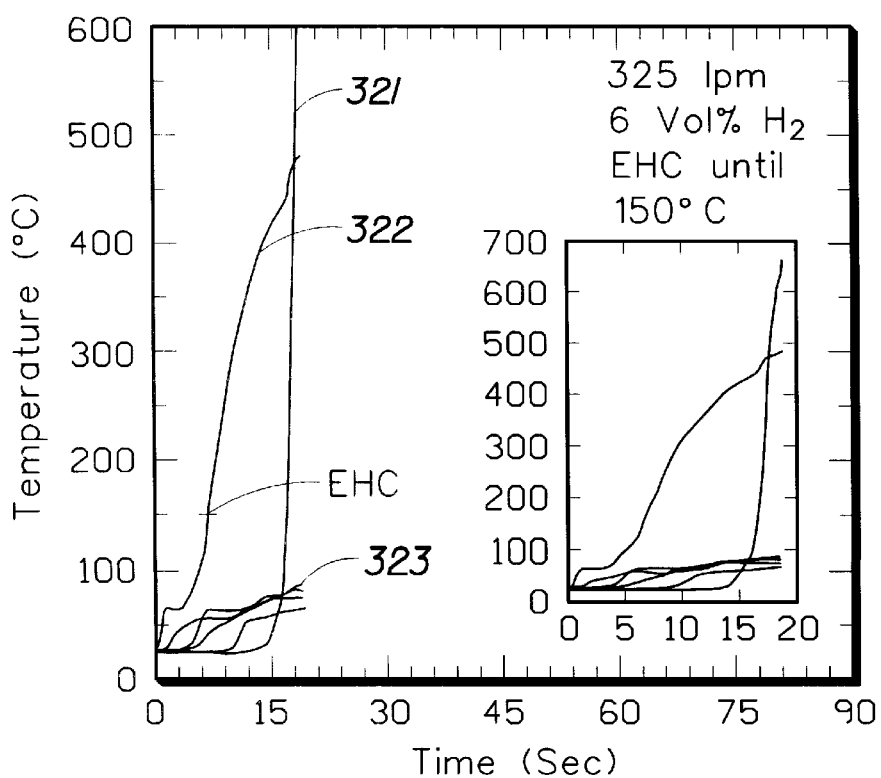
Figure 9A:
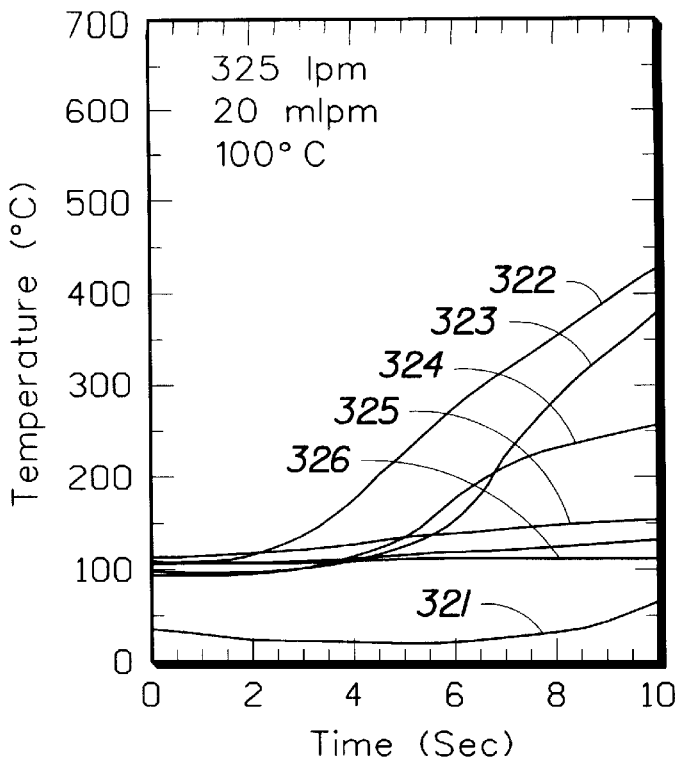
FIGS. 9–12 are graphs of catalyst temperature over time with introduction of methanol and air into the catalytic converter of FIG. 1 initially at a steady state temperature of 100° C., 150° C., 200° C. and 250° C., respectively.
Figure 9B:
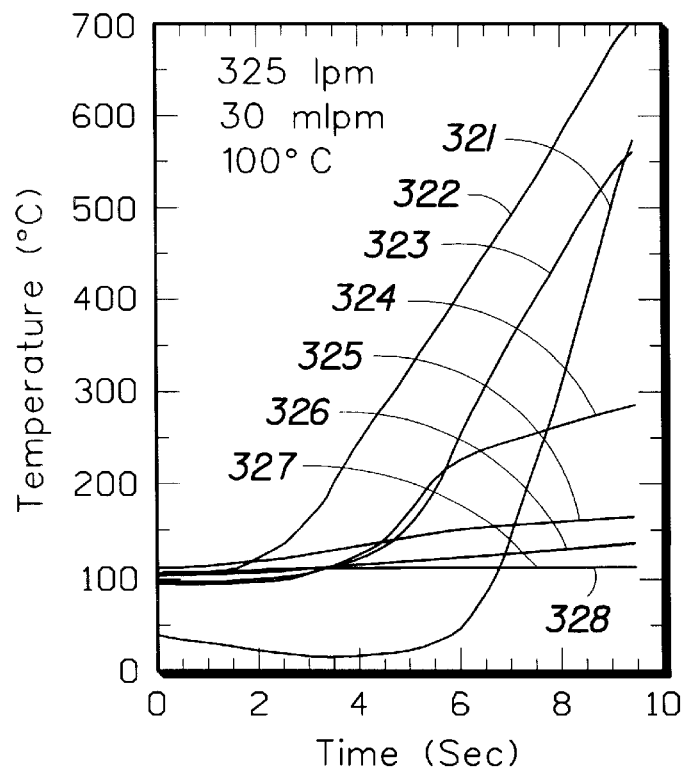
Figure 9C:
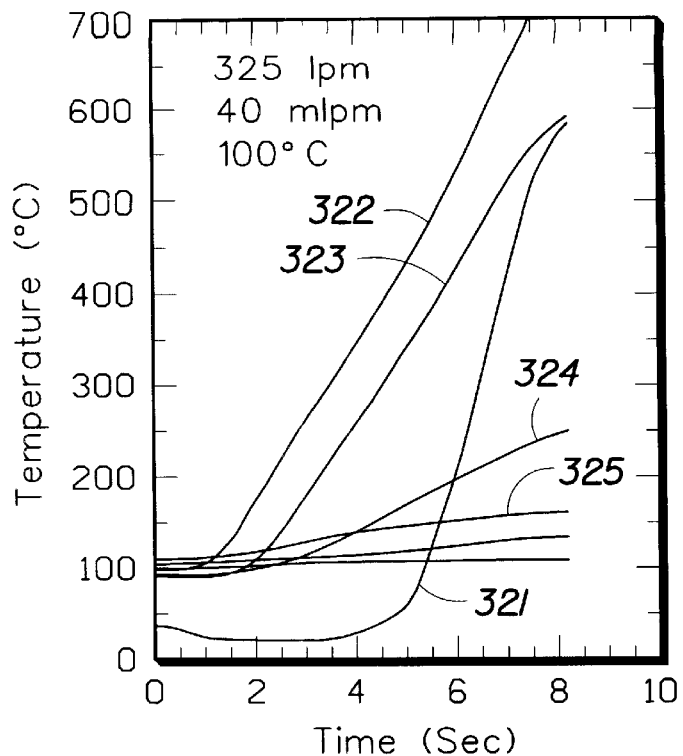
Figure 9D:
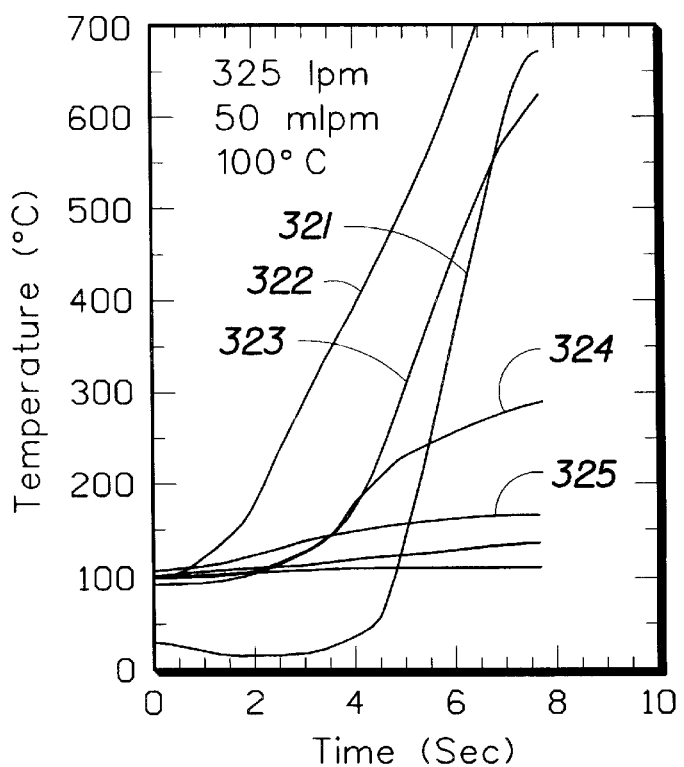
Figure 10A:
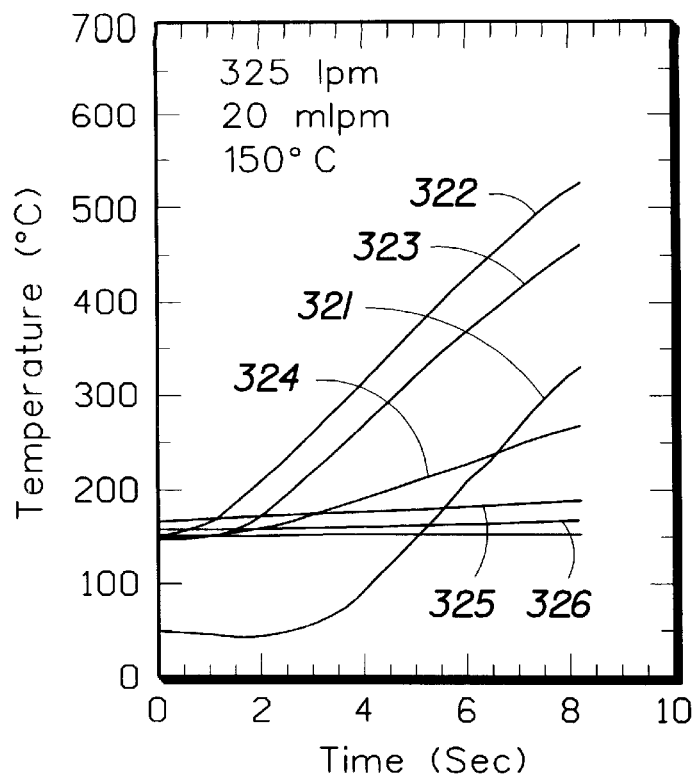
Figure 10B:
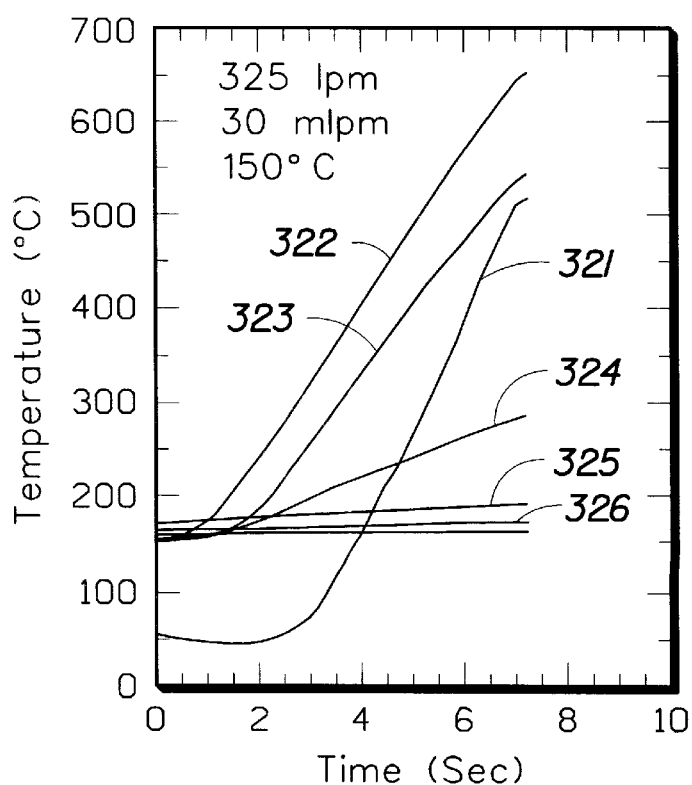
Figure 10C:
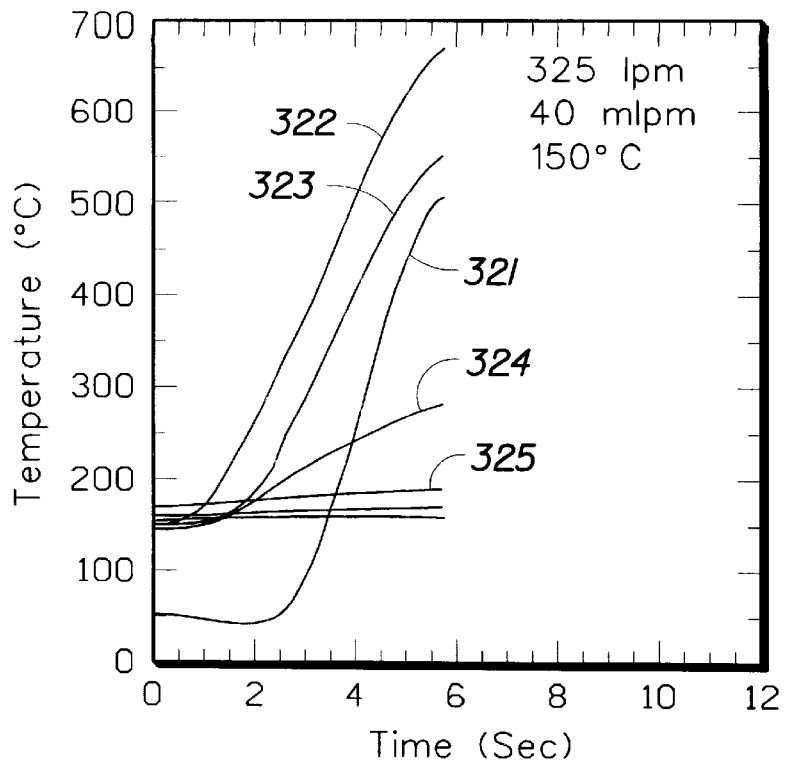
Figure 10D:
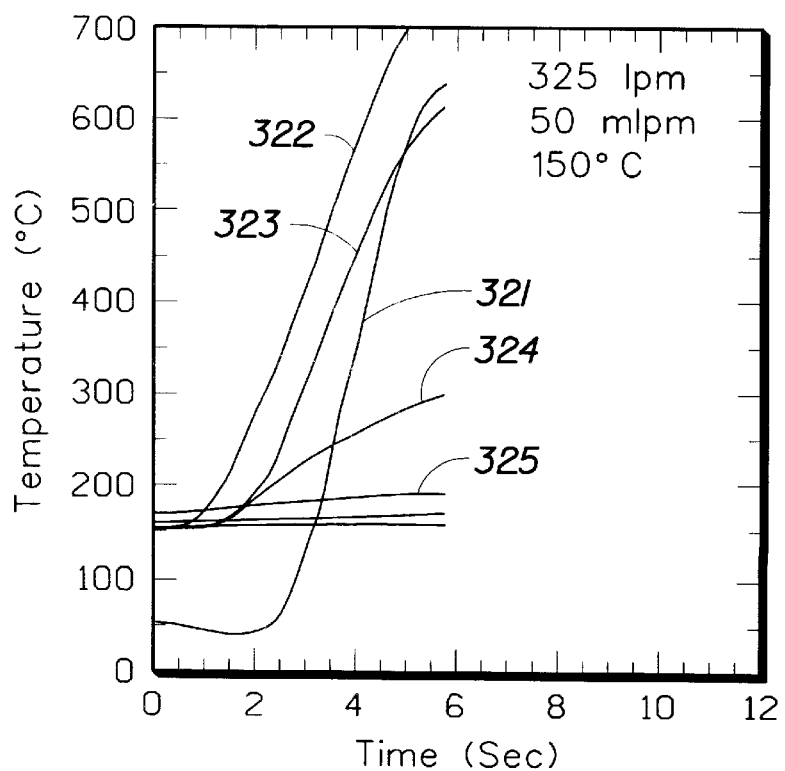

Note that in FIG. 8(a), the thermocouples 321,322 in the front of the monolith are initially cooler than thermocouples 323,324 which are somewhat further into the monolith. As electrical heating is used to greater and greater temperatures, the thermocouple 322 records the greater temperature increases. However, under each of the four conditions, the front thermocouple 321 eventually reached the highest temperature due to chemical heating after the catalyst was warm and dry. It is also apparent from FIGS. 8(a–d) that electrical heating was beneficial for rapidly heating the catalyst, especially to temperatures of about 100° C. or higher for the evaporation of water.

EXAMPLE #3

The experimental setup 330 of FIG. 2 was used for the introduction of methanol and air to the catalytic converter 300. The blower 332 then provided air through the catalytic converter 300 at a rate of about 325 liters per minute (lpm) for a sufficient period of time to achieve a steady state temperature of 100° C. throughout the entire catalytic converter. FIGS. 9(a–d) are graphs of the catalyst temperature over time with introduction of methanol at flow rates of 20 milliliters per minute (mlpm), 30 mlpm, 40 mlpm and 50 mlpm, respectively. The front thermocouple 321 is initially cooled by the flow of methanol and air. It is also apparent that the higher methanol flow rates provides more rapid heating.

EXAMPLE #4

The procedure of Example 3 was repeated, but at an initial steady state temperature of 150° C. FIGS. 10(a–d) are graphs of catalyst temperature over time with introduction of methanol at flow rates of 20 milliliters per minute (mlpm), 30 mlpm, 40 mlpm and 50 mlpm, respectively. Comparing FIGS. 10(a–d) with FIGS. 9(a–d), it is shown that a higher initial catalyst temperature allows the chemical heating to proceed at a much faster rate than at low initial catalyst temperatures.

EXAMPLE #5

Figure 11A:
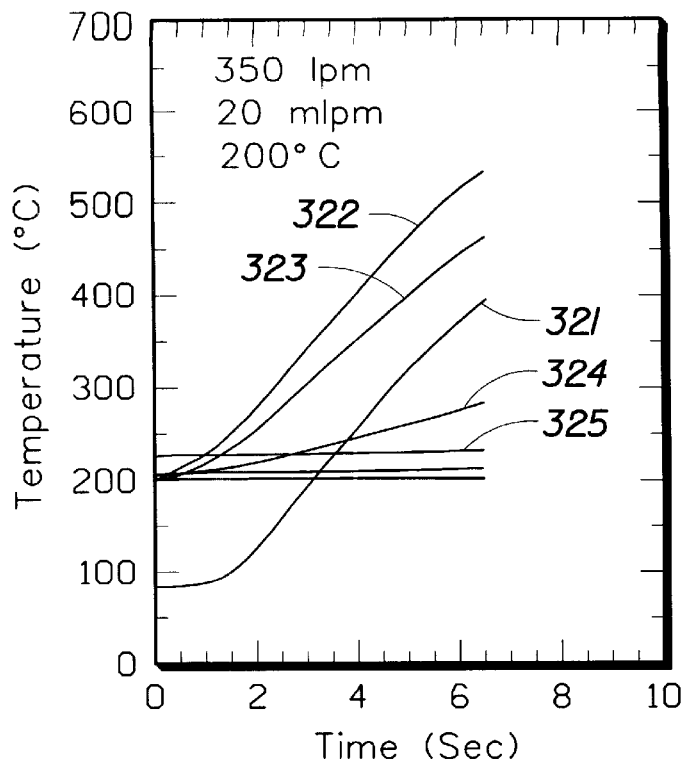
Figure 11B:
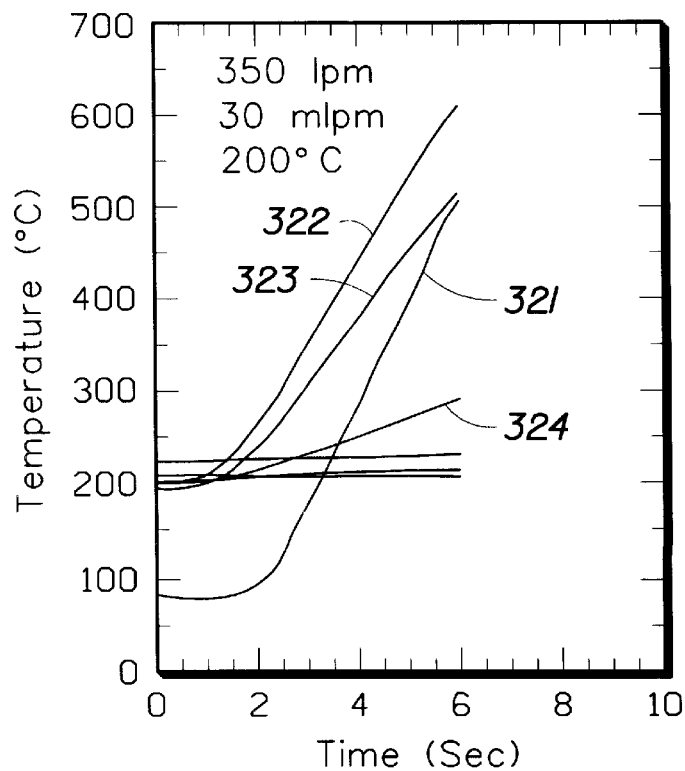
Figure 11C:
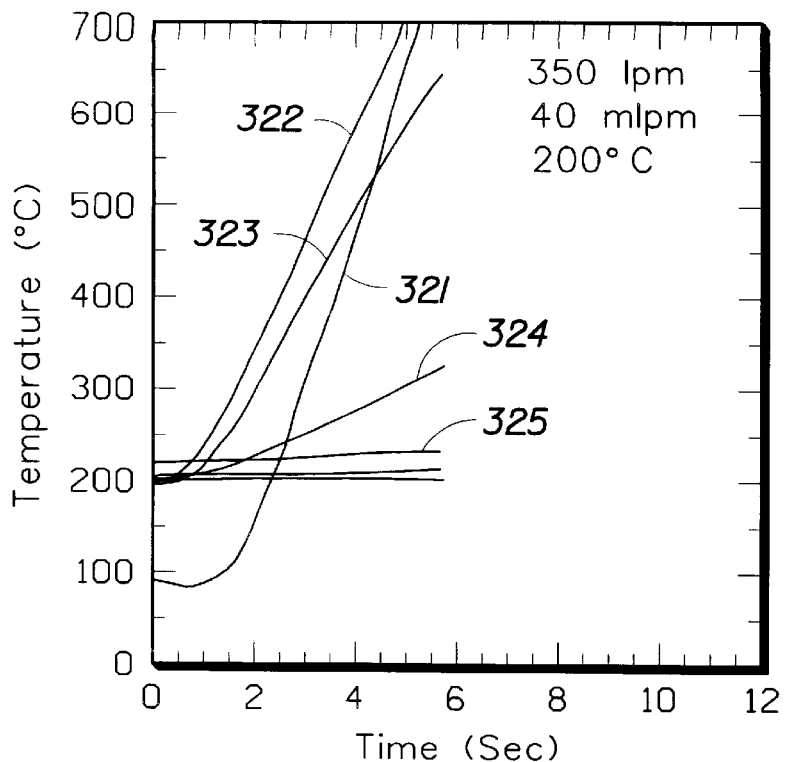
Figure 11D:
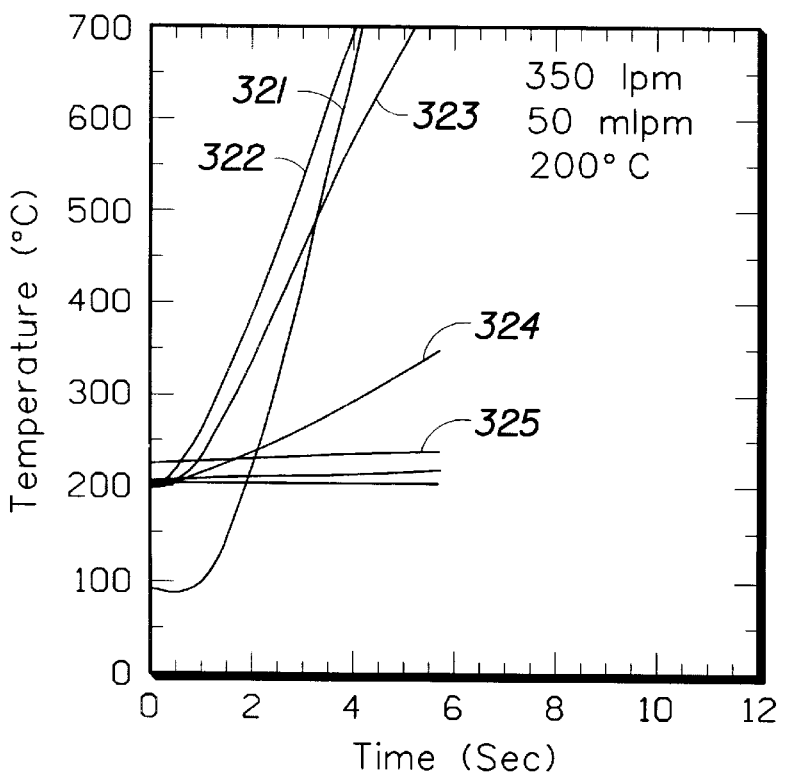

The procedure of Example 3 was again repeated, but at an initial steady state temperature of 200° C. and an air flow rate of 350 lpm. FIGS. 11(a–d) are graphs of catalyst temperature over time with introduction of methanol at flow rates of 20 milliliters per minute (mlpm), 30 mlpm, 40 mlpm and 50 mlpm, respectively. Comparing FIGS. 11(a–d) with FIGS. 10(a–d), it is again shown that a higher initial catalyst temperature allows the chemical heating to proceed at a much faster rate than at low initial catalyst temperatures. As shown in FIG. 11(d), the front region of the catalytic converter, represented by thermocouples 321 and 322, achieved a temperature of 700° C. within a period of only 4 seconds.

EXAMPLE #6

Figure 12A:
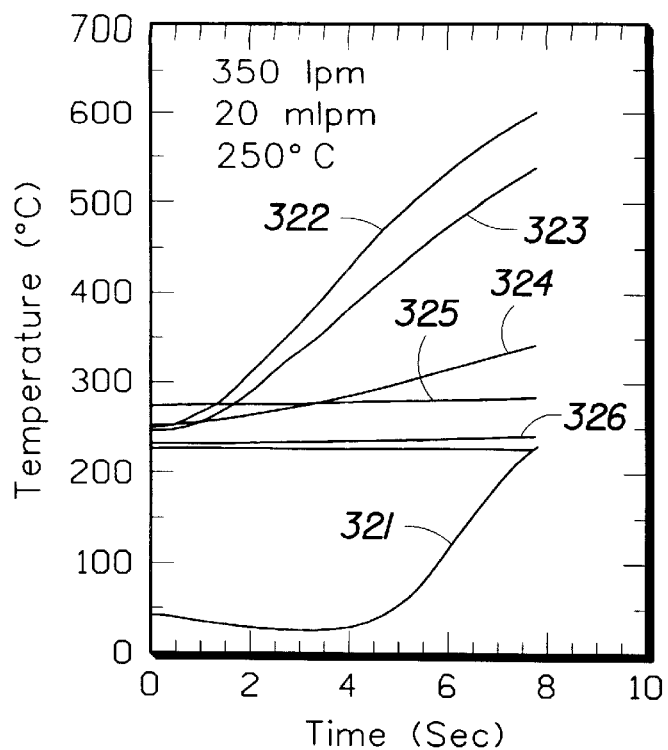
Figure 12B:
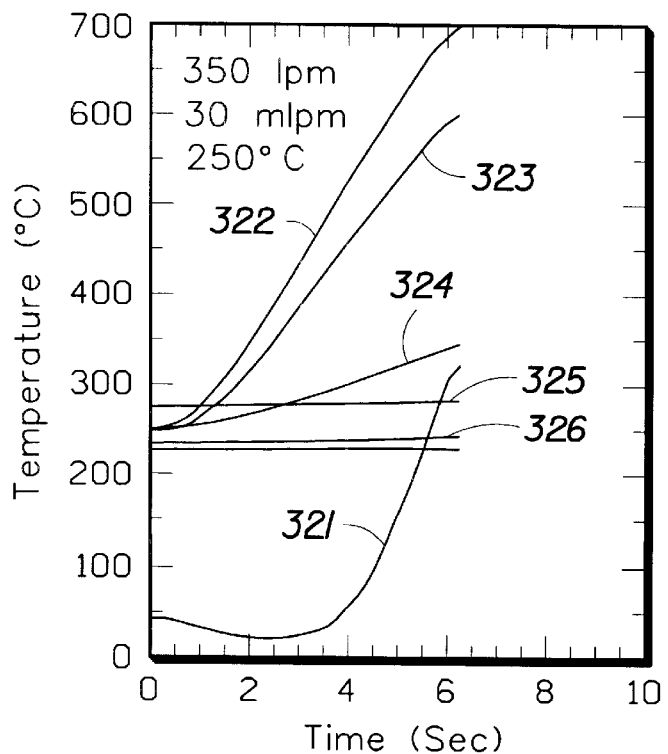
Figure 12C:
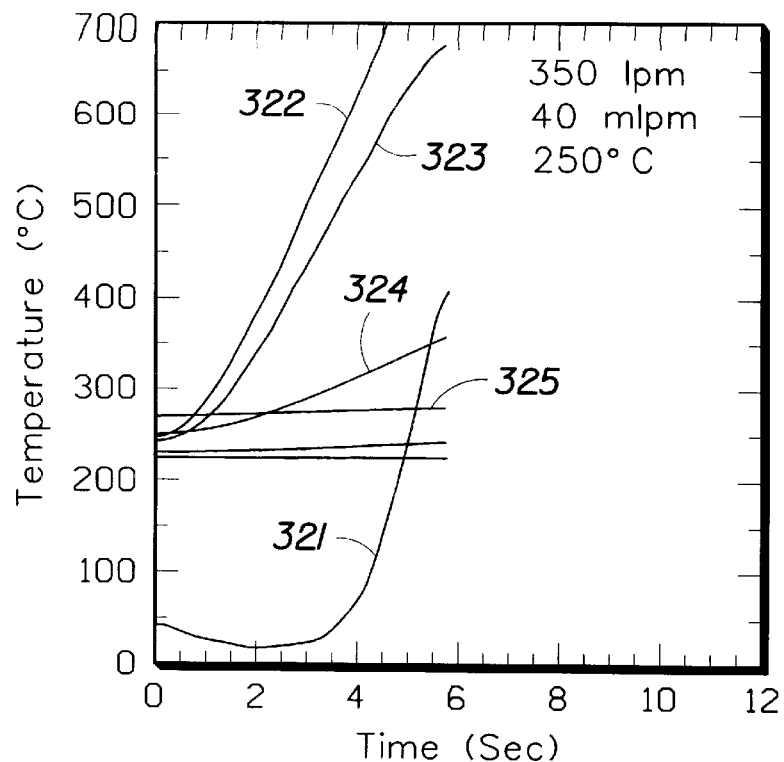
Figure 12D:
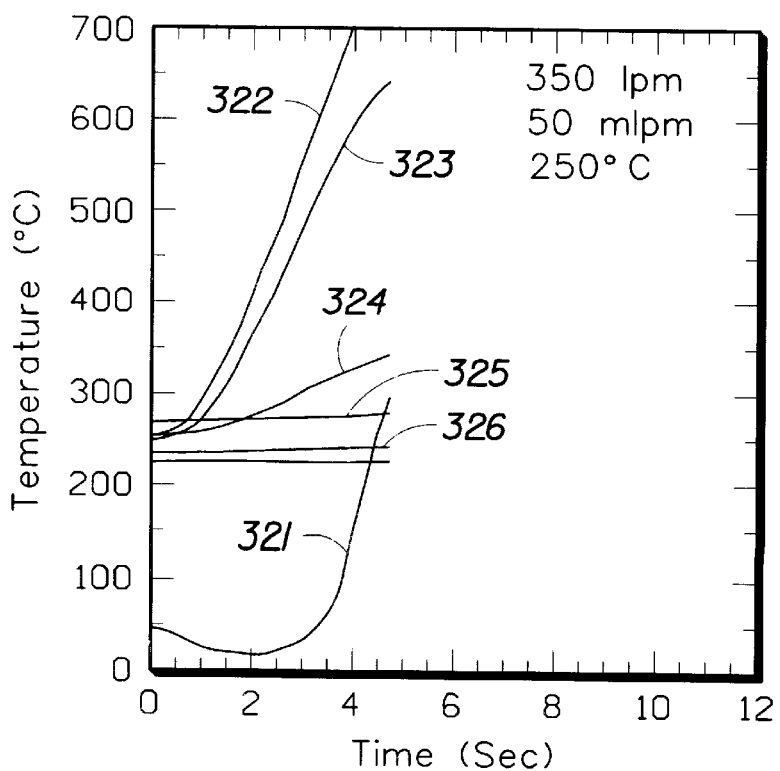
Figure 13A:
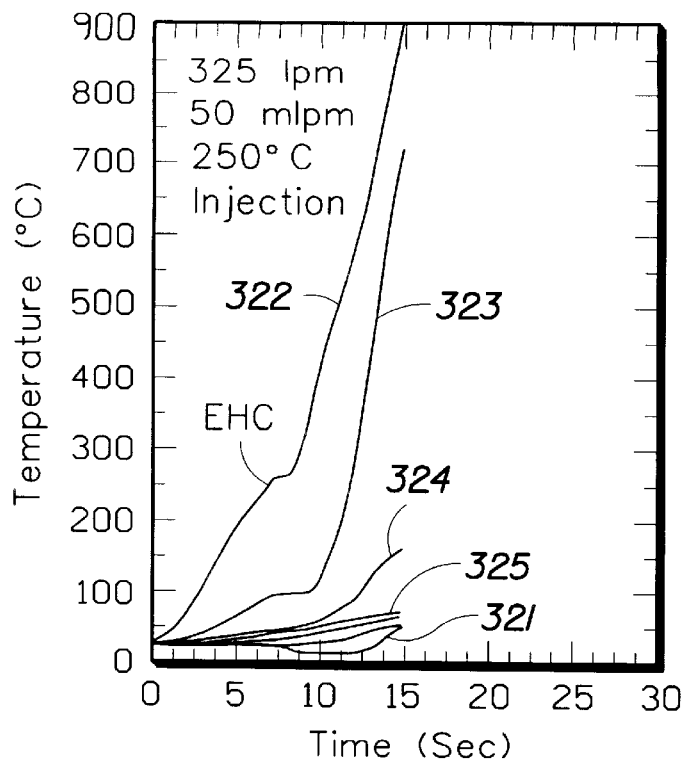
FIG. 13 is a graph of catalyst temperature over time illustrating the benefits of using both electrical heating and introduction of methanol and air into the catalytic converter of FIG. 1.
Figure 13B:
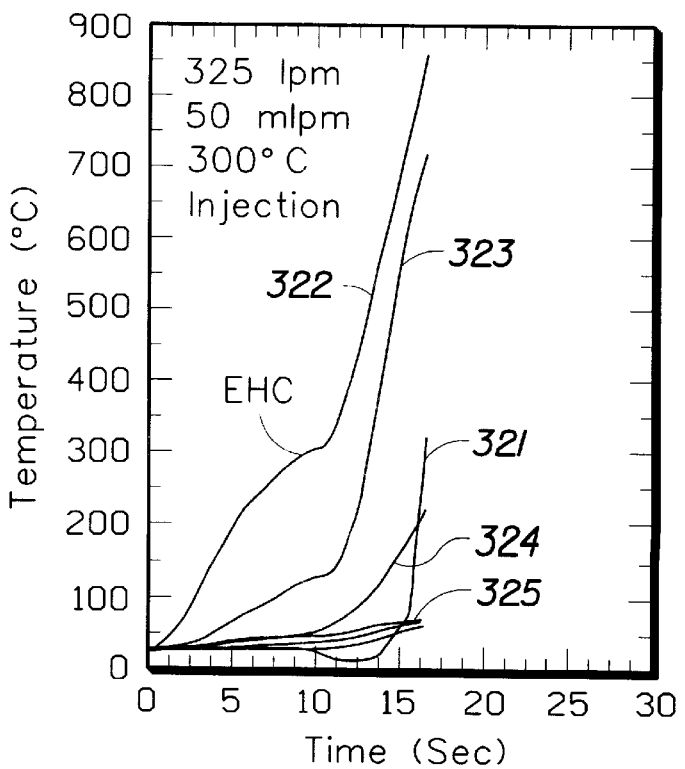
Figure 13C:
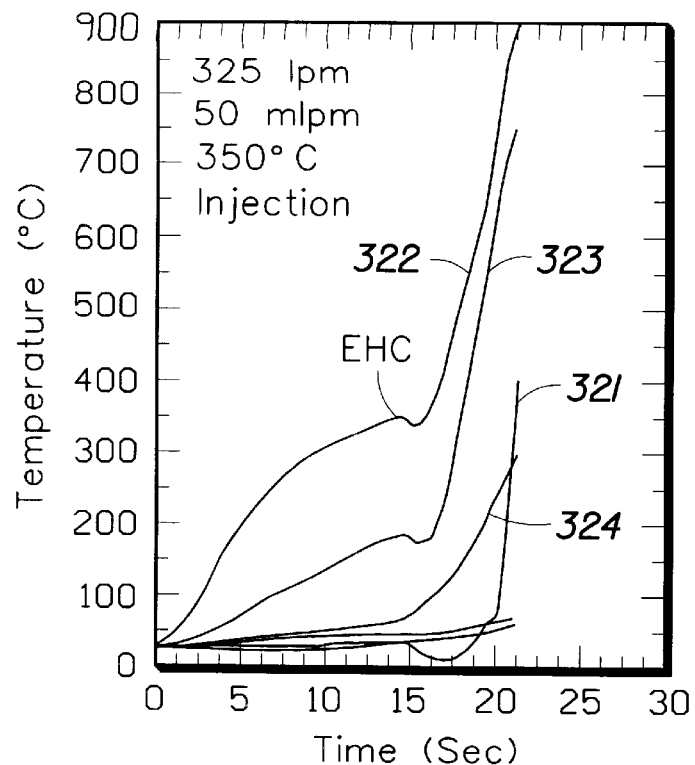
Figure 13D:
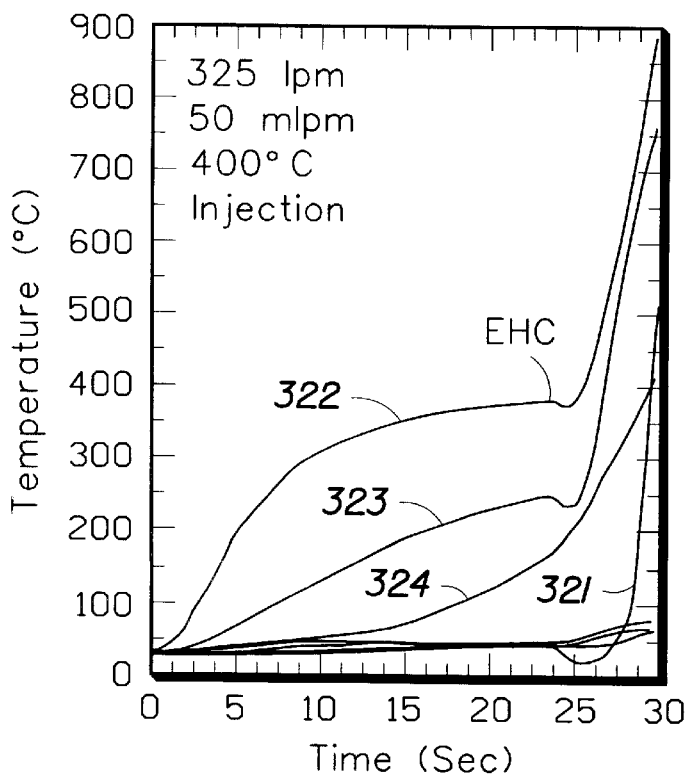

The procedure of Example 3 was once again repeated, but at an initial steady state temperature of 250° C. and an air flow rate of 350 lpm. FIGS. 12(a–d) are graphs of catalyst temperature over time with introduction of methanol at flow rates of 20 milliliters per minute (mlpm), 30 mlpm, 40 mlpm and 50 mlpm, respectively. Comparing FIGS. 12(a–d) with FIGS. 11(a–d), it is once again shown that a higher initial catalyst temperature allows the chemical heating to proceed at a faster rate than at low initial catalyst temperatures, but there are diminishing returns. As shown in FIG. 12(d), the front region of the catalytic converter, represented by thermocouples 321 and 322, achieved a temperature of 700 C. within a period of only 4 seconds. This performance is roughly the same as the performance under Example 5 at an initial catalyst temperature of 200 C.

EXAMPLE #7

The experimental setup 330 of FIG. 2 was used for transient heating of the catalytic converter 300 first using electrical heating to a set point temperature, then introducing 50 mlpm methanol and air to the catalytic converter 300. The blower 332 provided air through the catalytic converter 300 at a rate of about 325 liters per minute (lpm) throughout the experiment. FIGS. 13(a–d) are graphs of catalyst temperature over time with electrical heating up to a set point temperature of 250° C., 300° C., 350° C. and 400° C., respectively, before introducing the methanol. From these Figures, it is apparent that chemical heating with methanol is capable of heating the catalyst much more rapidly, as evidenced by the increased slope of the temperature profiles both electrical heating and introduction of methanol and air. Furthermore, delaying the introduction of methanol in favor of additional electrical heating was shown to delay attaining a catalyst temperature of 700° C.

EXAMPLE #8

Figure 14:
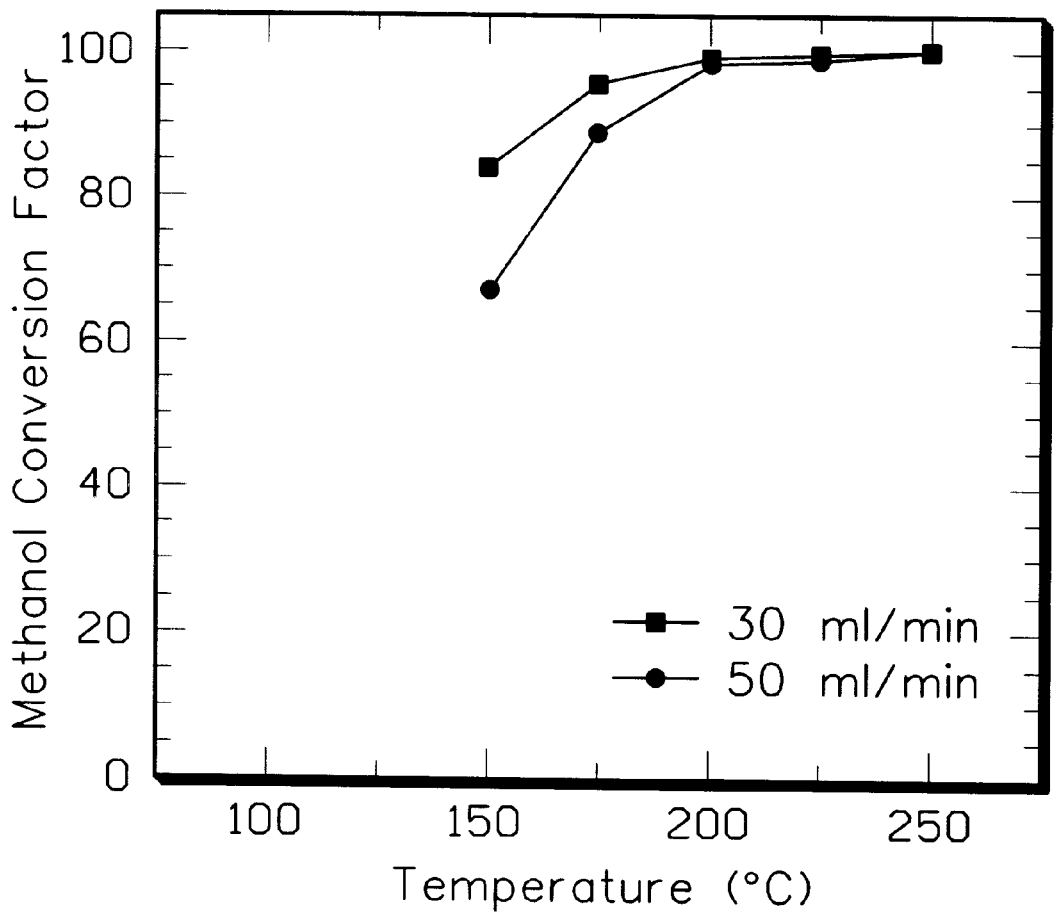
FIG. 14 is a graph of methanol conversion factor as a function of the catalyst monolith steady state temperature prior to introducing methanol.

Using the data from Examples 3–6, it was possible to calculate a methanol conversion factor that represents the efficiency with which methanol was reacted to produce heat. FIG. 14 is a graph of methanol conversion factor as a function of the catalyst monolith steady state temperature between 150° C. and 250° C. for methanol flow rates of 30 mlpm and 50 mlpm. At the lower temperatures of 150–200° C., the lower flow rate of methanol was more efficiently utilized. However, at catalyst temperatures of 200–250° C., the conversion efficiency at the two flow were roughly the same.

Figure 15:
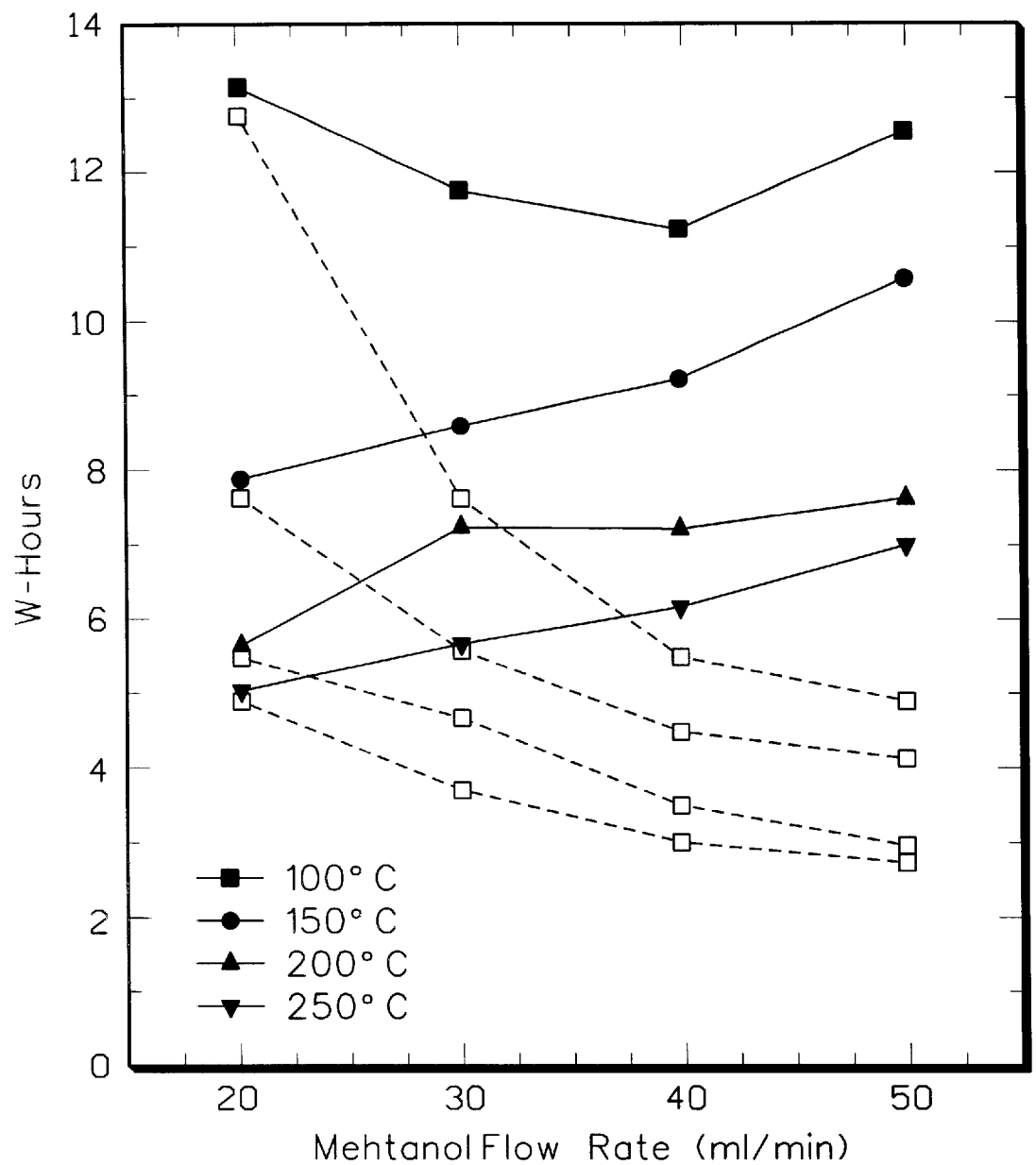
FIG. 15 is a graph of the chemical energy required and the time to reach 400° C. in a catalyst monolith preheated electrically under steady state conditions to 100° C., 150° C., 200° C. and 250° C.

FIG. 15 is a graph of the chemical energy required and the time to reach 400° C. in a catalyst monolith preheated electrically under steady state conditions to 100° C., 150° C., 200° C. and 250° C.

Figure 16A:
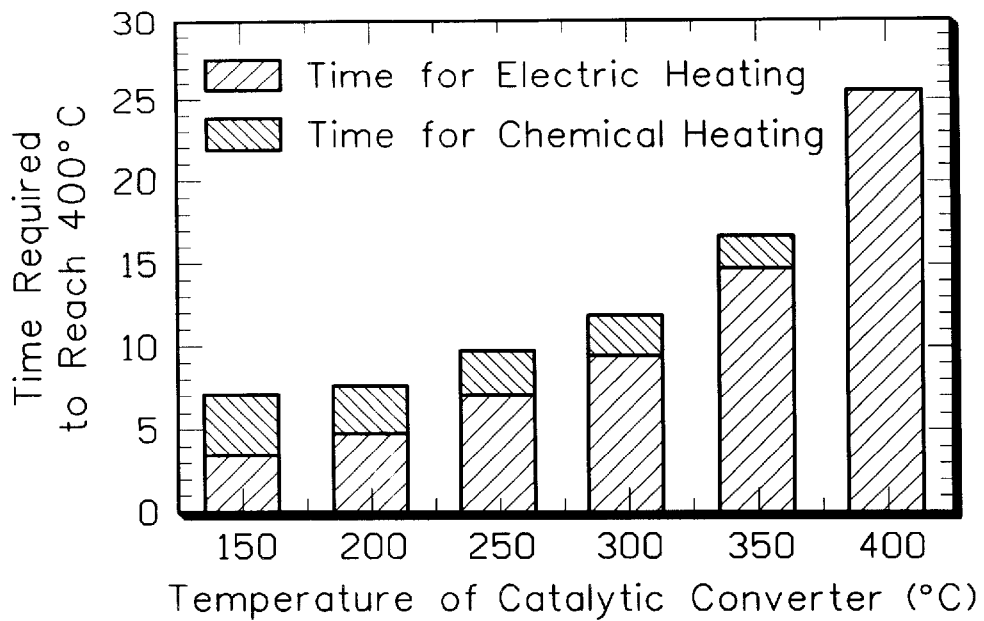
FIGS. 16 and 17 each show two bar charts illustrating the time and energy required for the catalyst to reach 400° C. as a function of the catalyst temperature at which methanol injection was commenced.
Figure 16B:
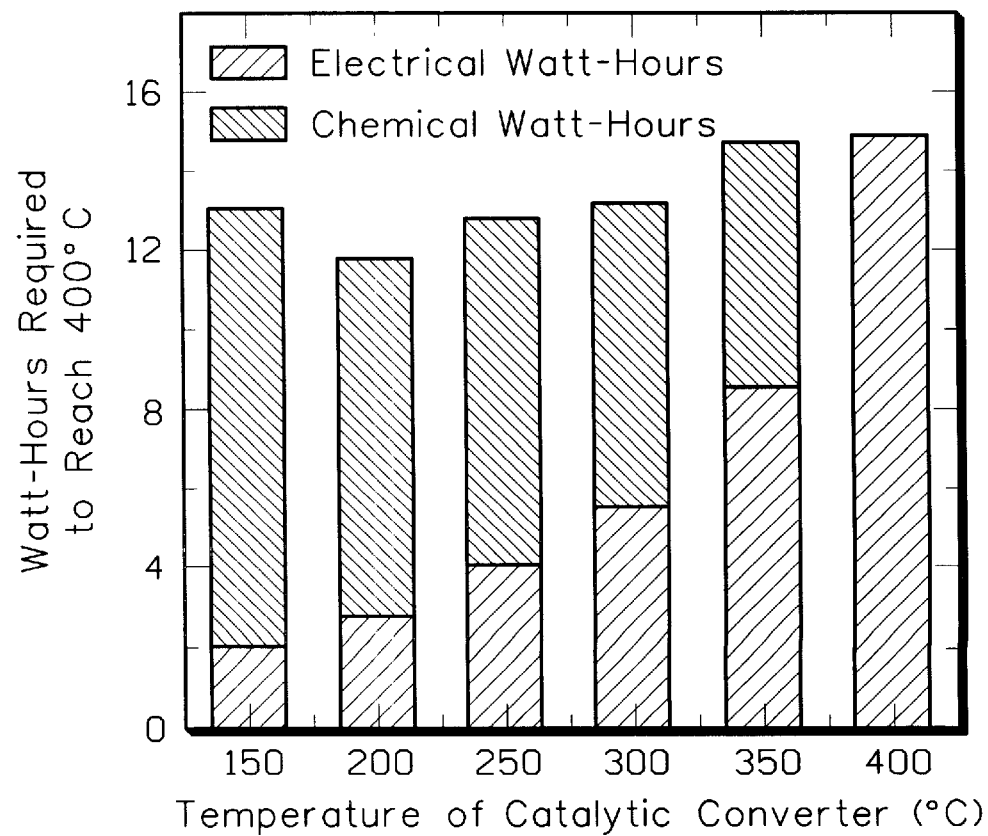
Figure 17A:
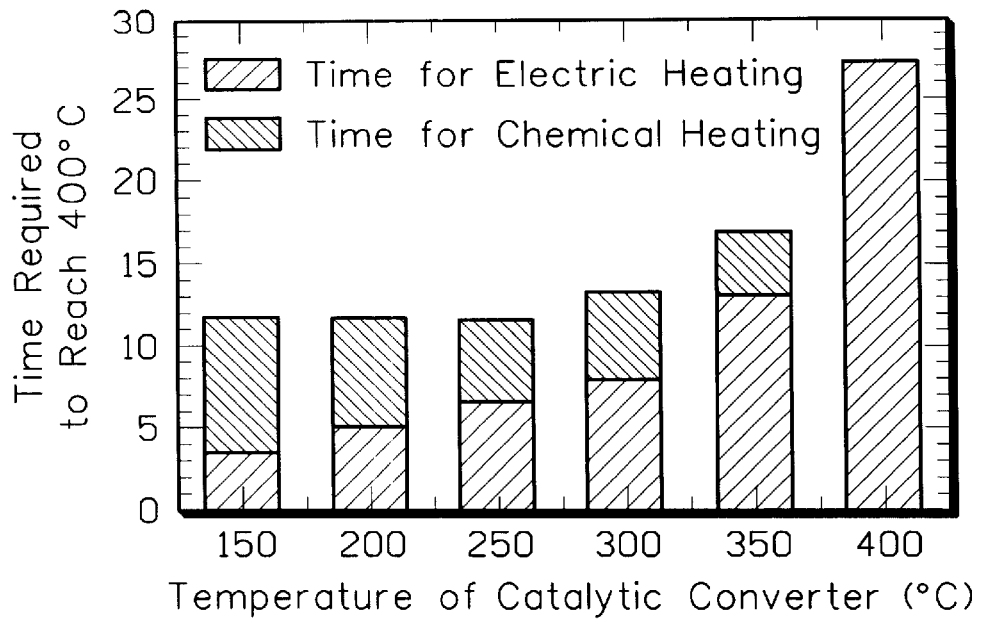
Figure 17B:
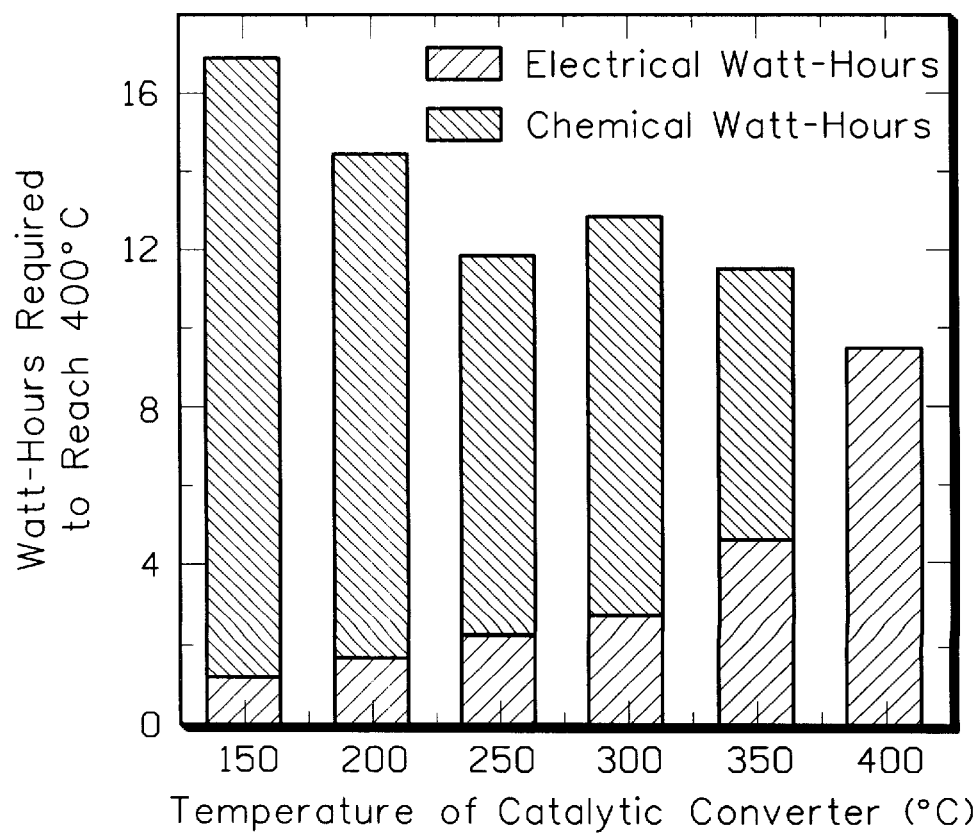
Figure 18A:
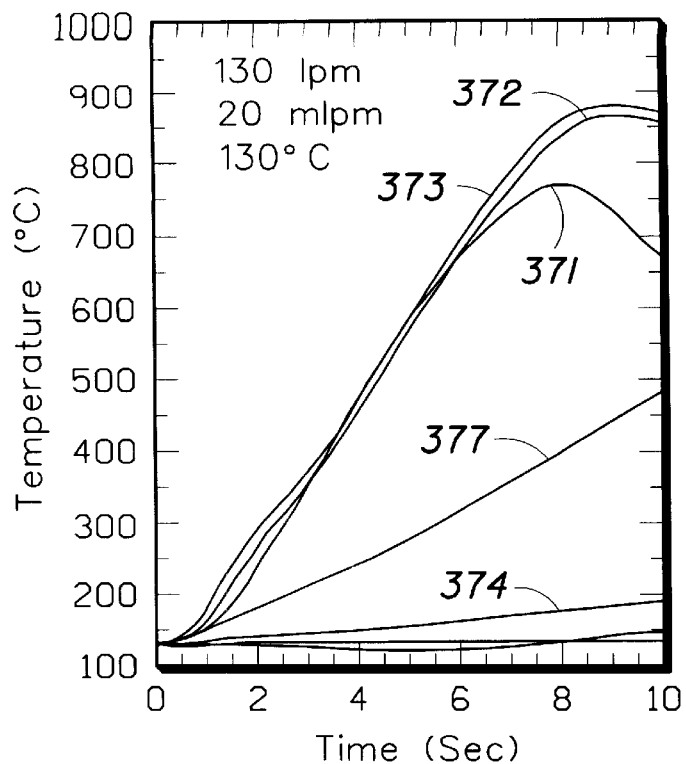
FIGS. 18 and 19 are graphs of catalyst temperature over time with introduction of trimethoxymethane at various flow rates and air into the catalytic converter of FIG. 3 preheated at 130° C.
Figure 18B:
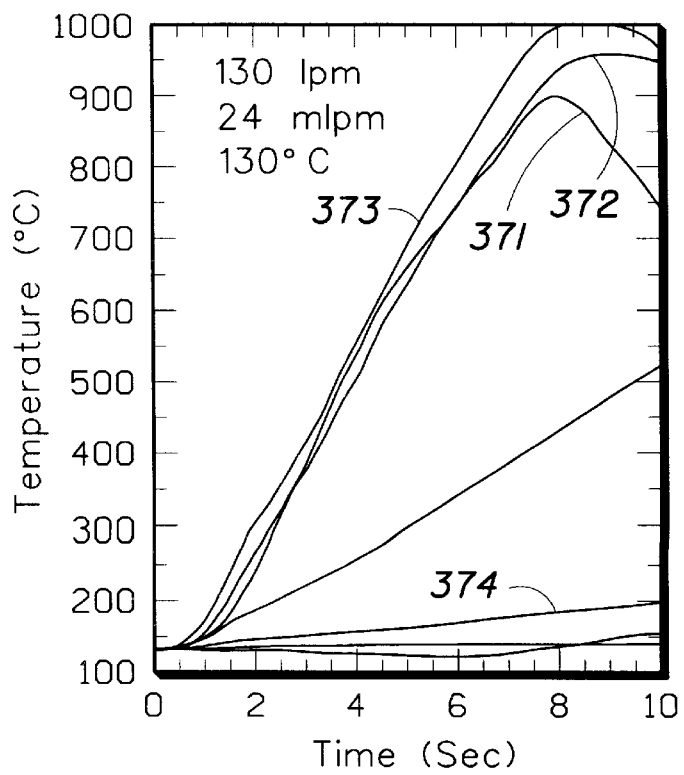
Figure 18C:
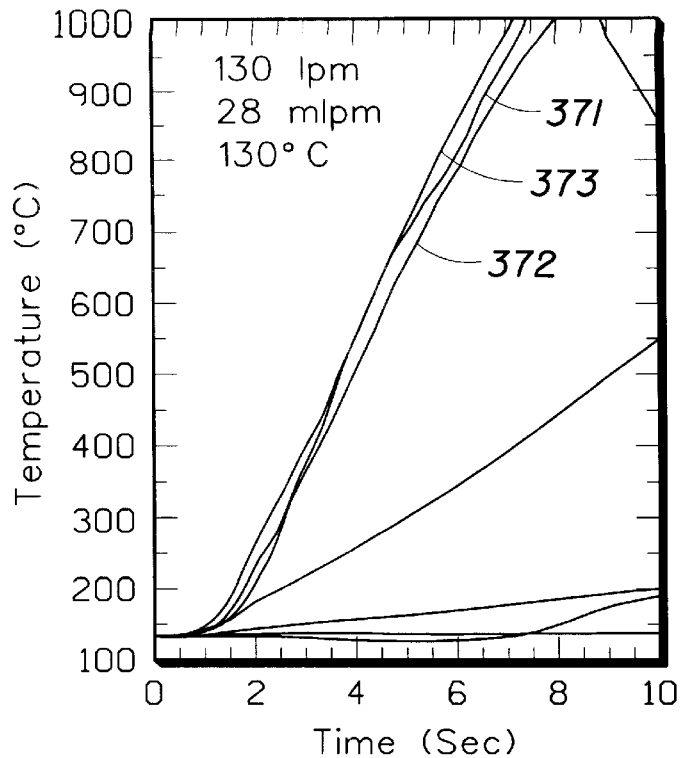
Figure 18D:
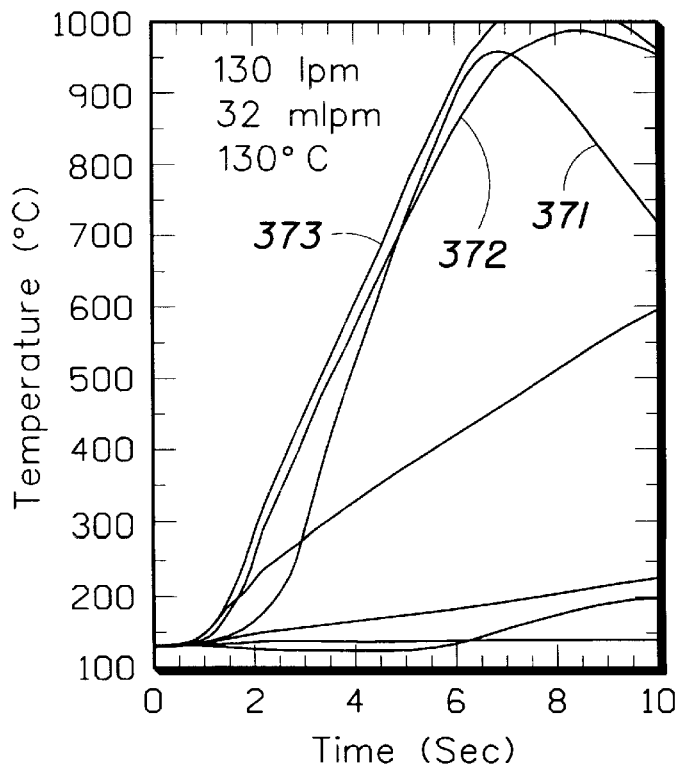
Figure 19A:
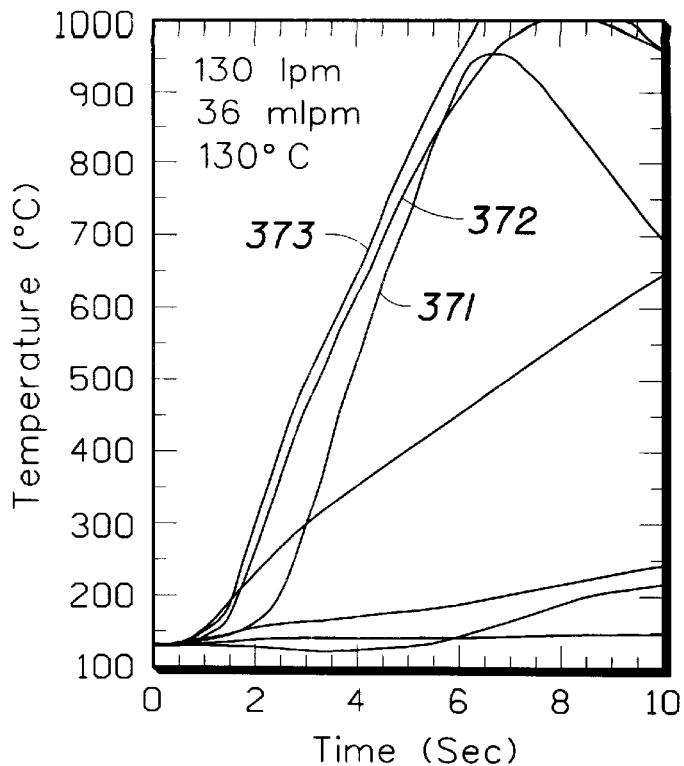
Figure 19B:
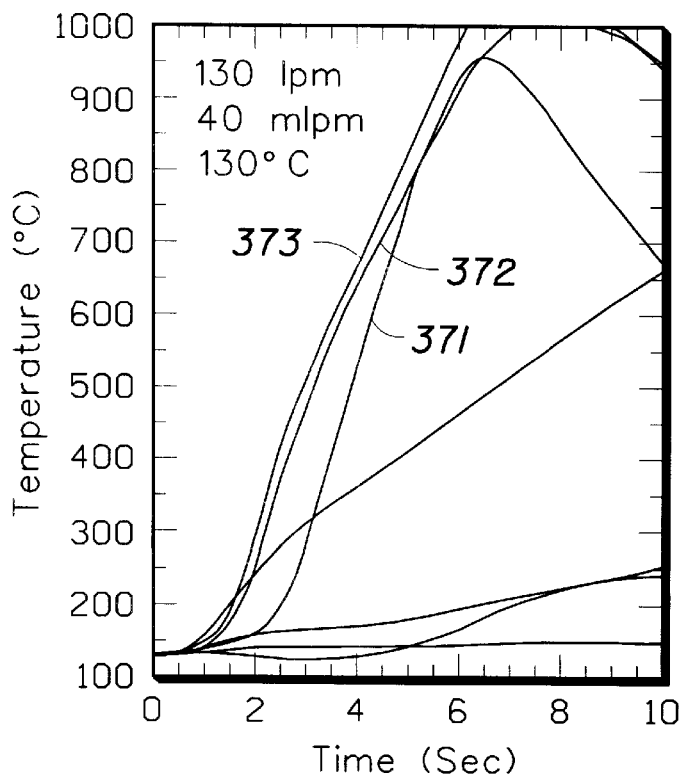
Figure 19C:
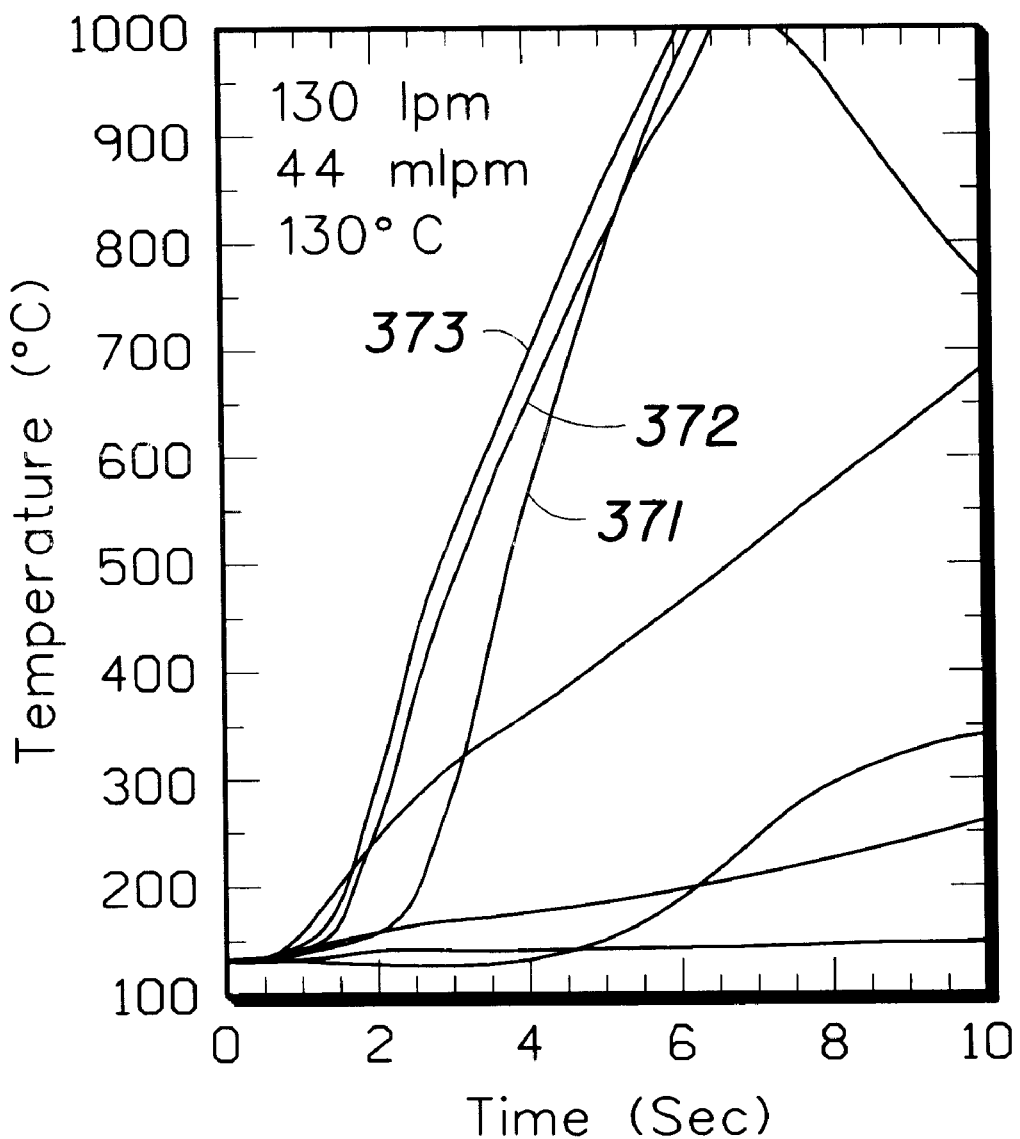
Figure 20A:
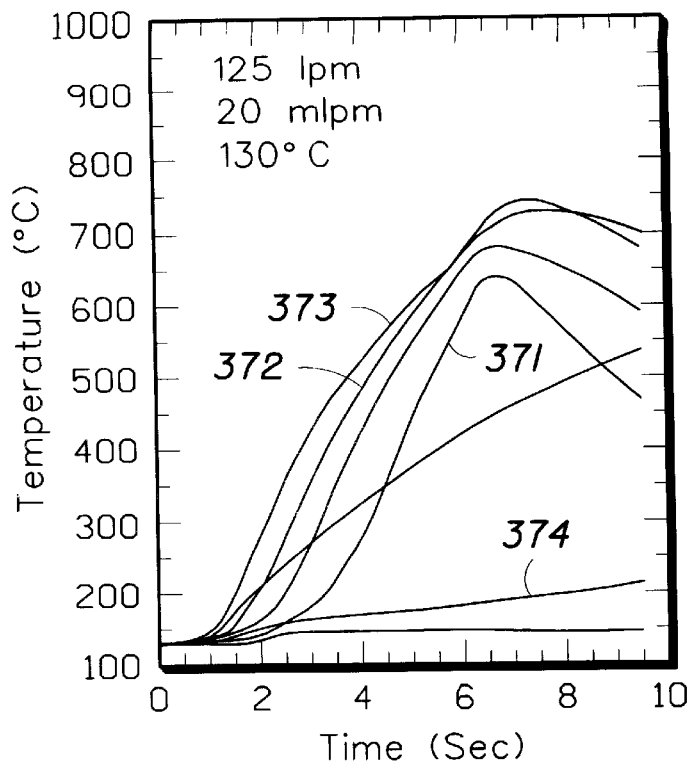
FIG. 20 is a graph of catalyst temperature over time with introduction of dimethoxymethane at various flow rates and air into the catalytic converter of FIG. 3 preheated at 130° C.
Figure 20B:
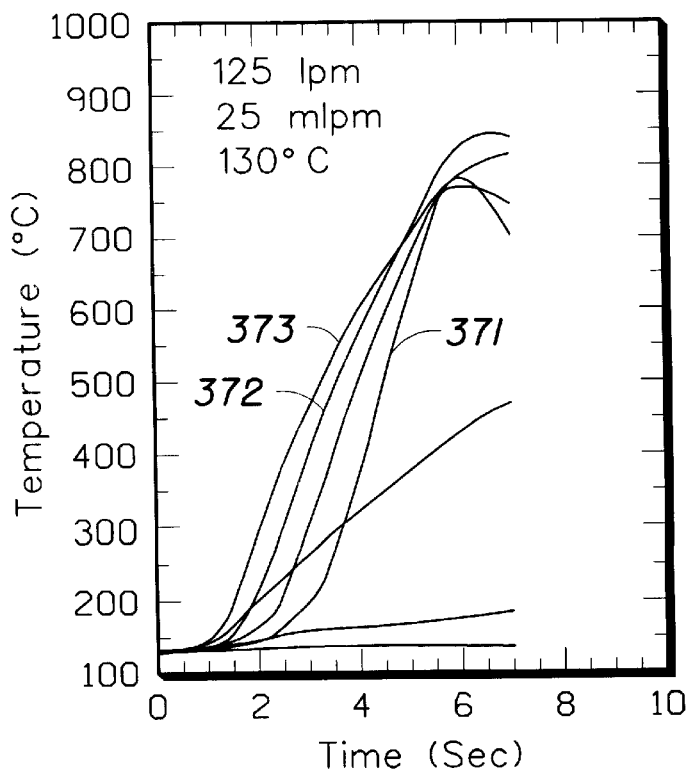
Figure 20C:
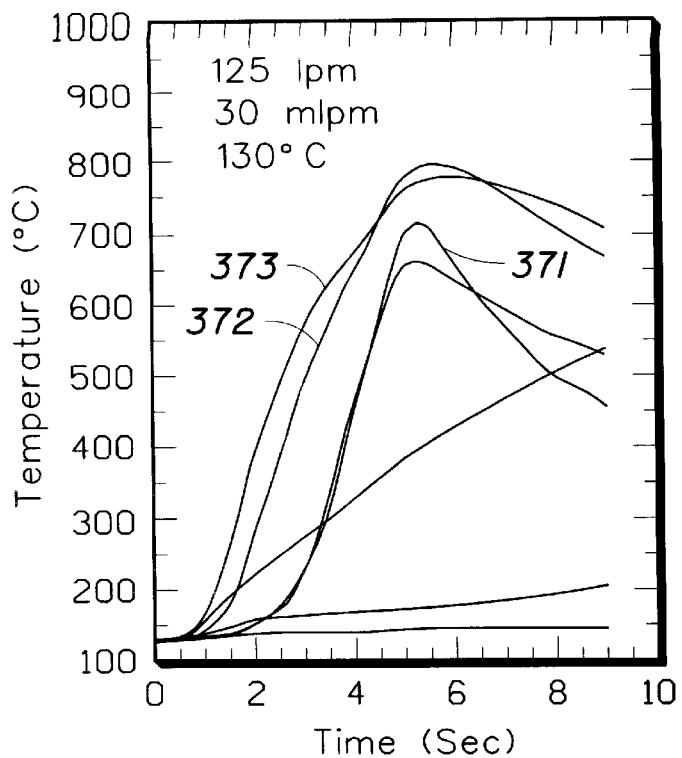
Figure 20D:
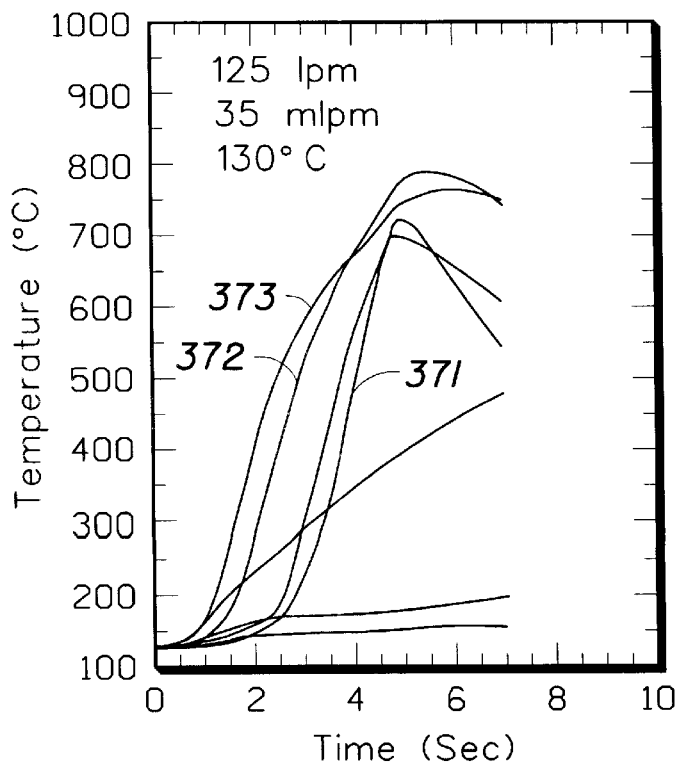
Figure 21A:
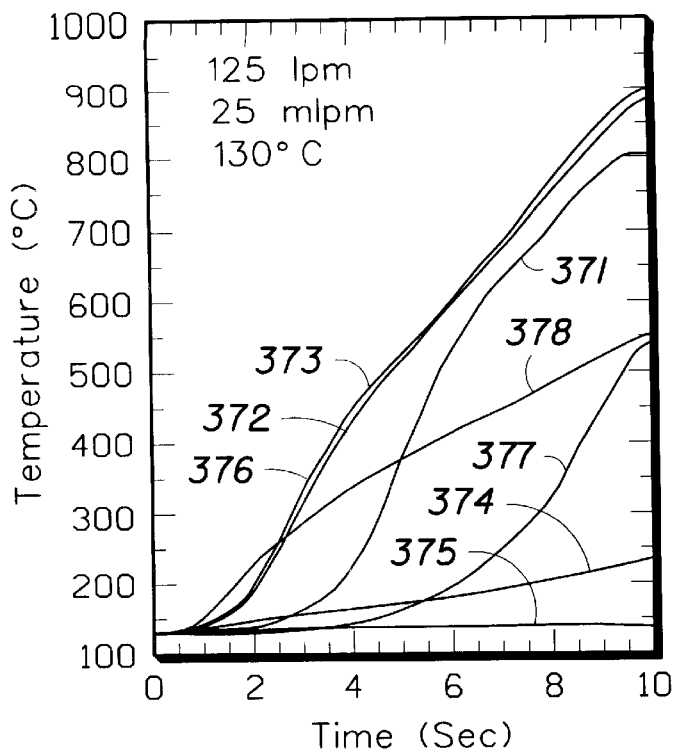
FIG. 21 is a graph of catalyst temperature over time with introduction of methyl formate at various flow rates and air into the catalytic converter of FIG. 3 preheated at 130° C.
Figure 21B:
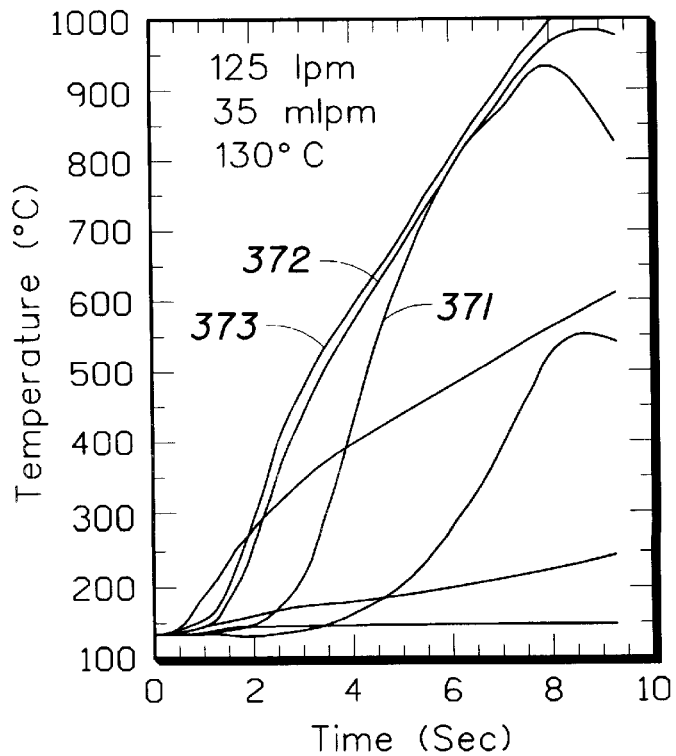
Figure 21C:
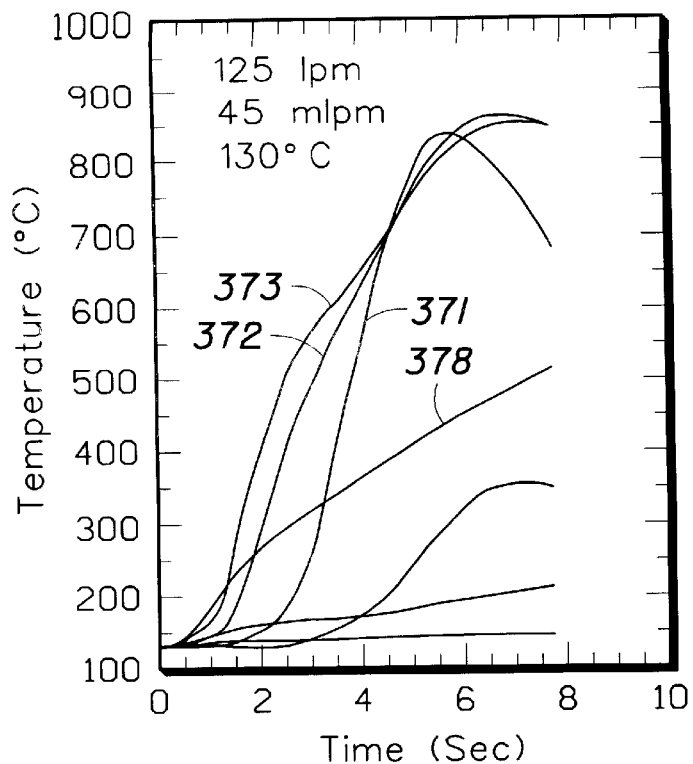
Figure 21D:
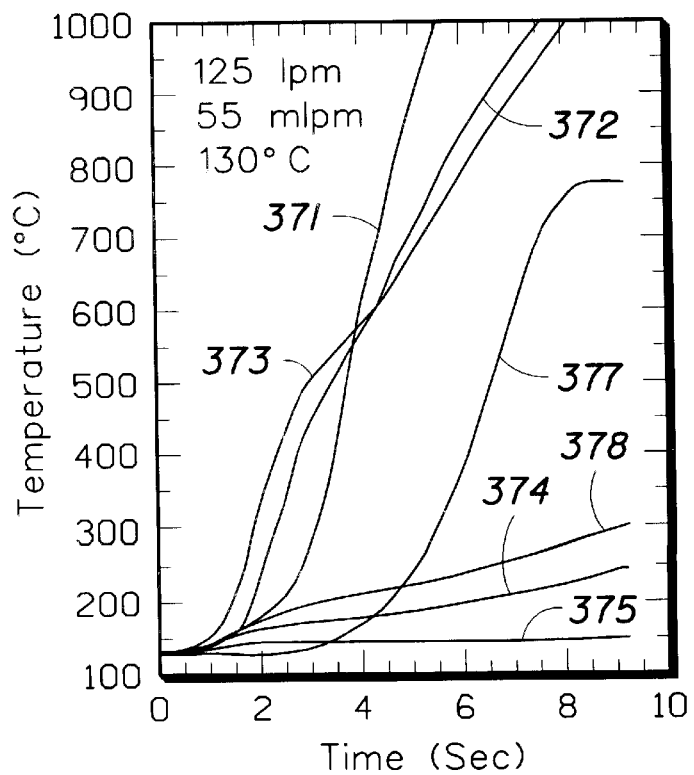
Figure 22A:
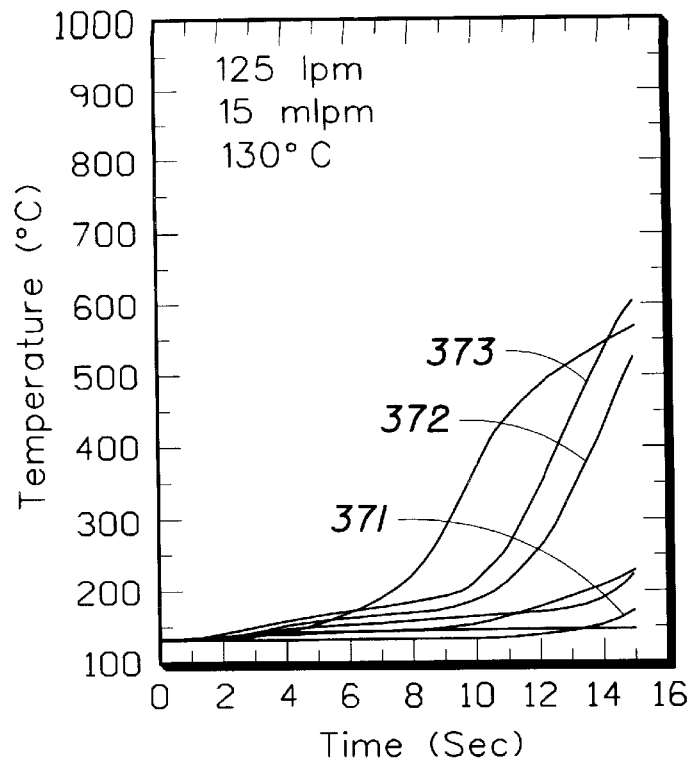
FIG. 22 is a graph of catalyst temperature over time with introduction of ethanol at various flow rates and air into the catalytic converter of FIG. 3 preheated at 130° C.
Figure 22B:
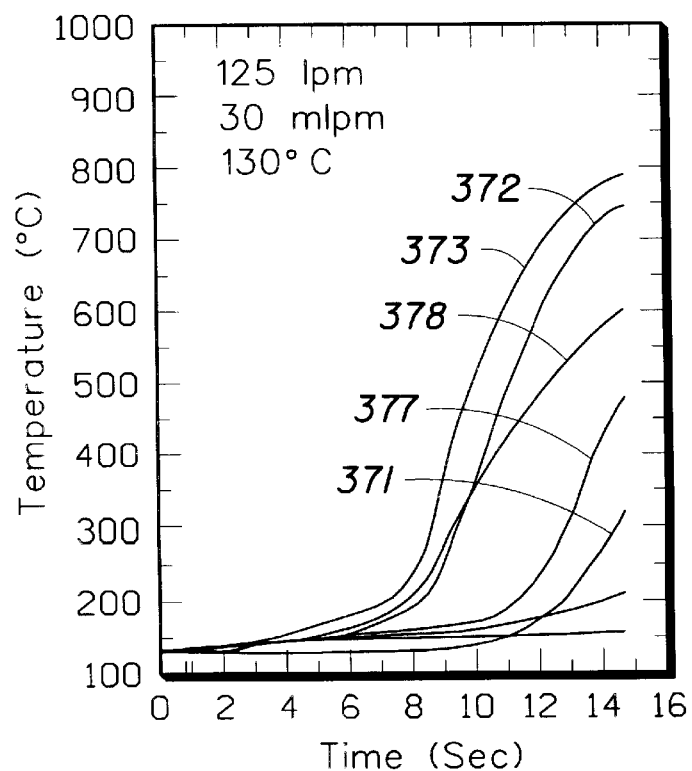
Figure 22C:
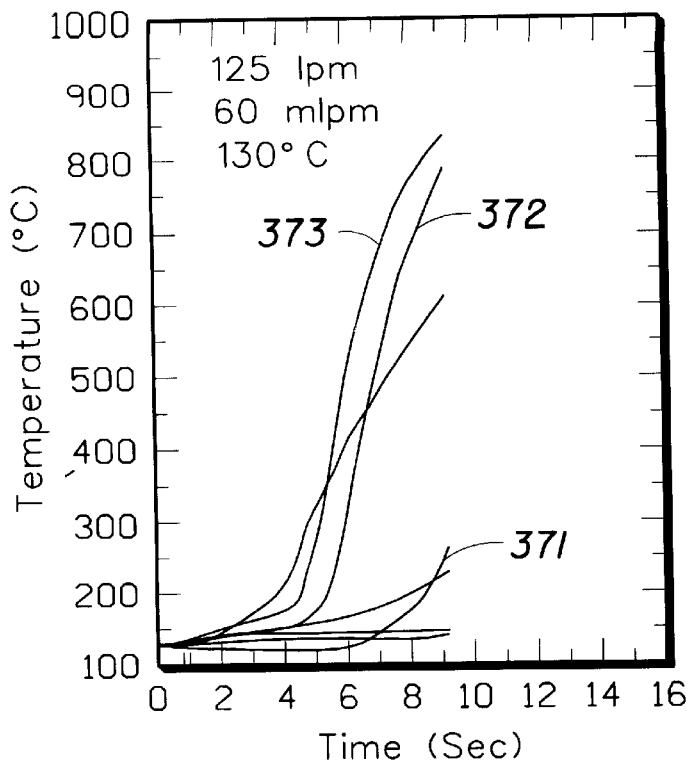
Figure 22D:
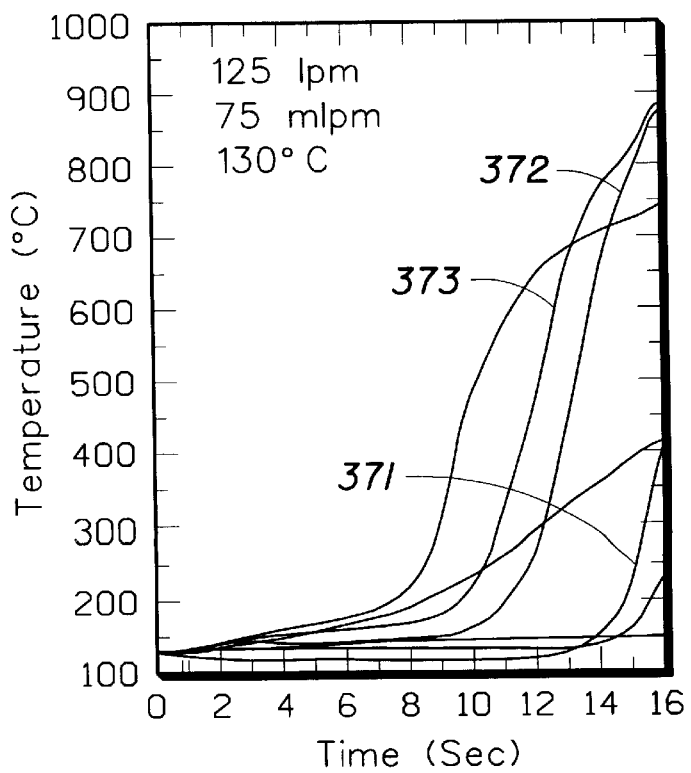

FIGS. 16 and 17 each show two bar charts illustrating the time and energy required for the catalyst to reach 400° C. as a function of the catalyst temperature at which methanol injection was commenced. FIGS. 16(a–b) includes data collected using 50 mlpm methanol. FIG. 16(a) shows that the shortest time period for achieving 400° C. was 7 seconds. This rapid heating was performed by using electrical heating to 150° C., but roughly similar rapid heating was achieve by electrical heating to 200° C. FIG. 16(b) shows that the least amount of energy required to reach 400° C. was achieved with electrical heating up to 200° C., but this was only marginally better than electrical heating up to 150° C. Note that FIG. 16(b) also shows that rapid heating requires more chemical energy than electrical energy.

FIGS. 17(a–b) show somewhat similar results using 30 mlpm methanol. However, comparing FIGS. 17(a–b) with FIGS. 16(a–b) it is shown that if lower flow rates of methanol were used, it was favorable to use more electrical heating. For example, it appears that at 30 mlpm methanol, electrical heating to 250° C. provided perhaps the most rapid heating.

EXAMPLE #9

The experimental setup 380 of FIG. 4 was used to provide a flow of air at 130 lpm and a steady state temperature of 130° C. FIGS. 18(a–d) and 19(a–c) are graphs of catalyst temperature over time with introduction of trimethoxymethane at flow rates of 20 mlpm, 24 mlpm, 28 mlpm, 32 mlpm, 26 mlpm, 40 mlpm and 44 mlpm, respectively. While heating was again more rapid with greater amounts of fuel (trimethoxymnethane), if the desired temperature is, for example, 700° C., then more than about 28–32 mlpm trimethoxymethane results in little, if any, benefit.

EXAMPLE #10

The experimental setup 380 of FIG. 4 was used to provide a flow of air at 125 lpm and an initial steady state temperature of 130° C. FIGS. 20(a–d) are graphs of catalyst temperature over time with introduction of dimethoxymethane at flow rates of 20 mlpm, 25 mlpm, 30 mlpm, and 35 mlpm, respectively.

EXAMPLE #11

The experimental setup 380 of FIG. 4 was used to provide a flow of air at 125 lpm and a steady state temperature of 130° C. FIGS. 21(a–d) are graphs of catalyst temperature over time with introduction of methyl formate at flow rates of 25 mlpm, 35 mlpm, 45 mlpm, and 55 mlpm, respectively.

EXAMPLE #12

The experimental setup 380 of FIG. 4 was used to provide a flow of air at 125 lpm and a steady state temperature of 130° C. FIGS. 22(a–d) are graphs of catalyst temperature over time with introduction of ethanol at flow rates of 15 mlpm, 30 mlpm, 60 mlpm, and 75 mlpm, respectively.

EXAMPLE #13

Figure 23A:
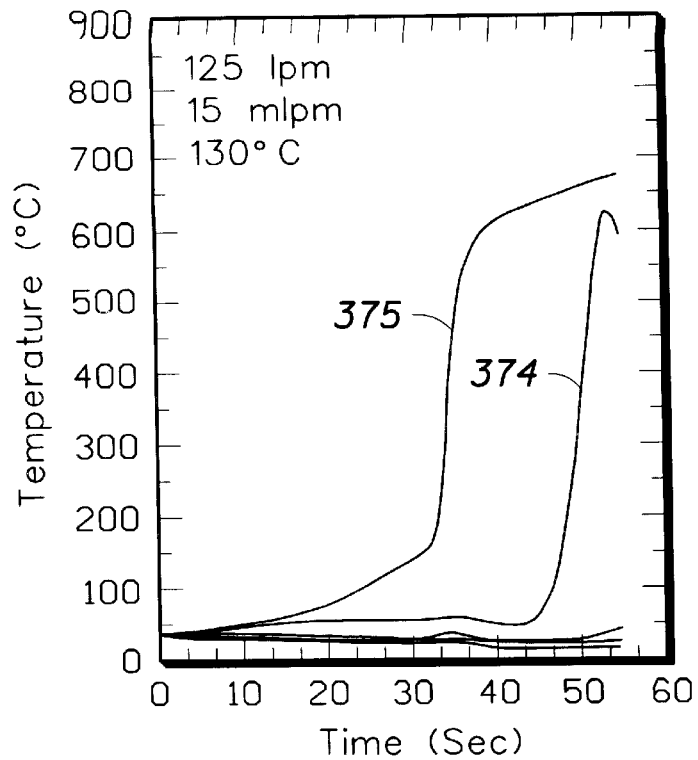
FIG. 23 is a graph of catalyst temperature over time with introduction of diethyl ether at various flow rates and air into the catalytic converter of FIG. 3 preheated at 130° C.
Figure 23B:
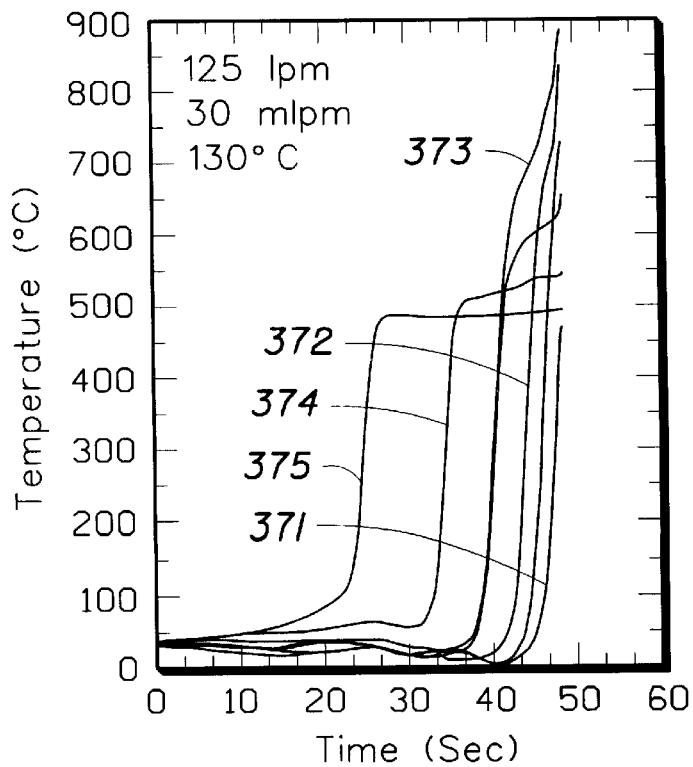
Figure 23C:
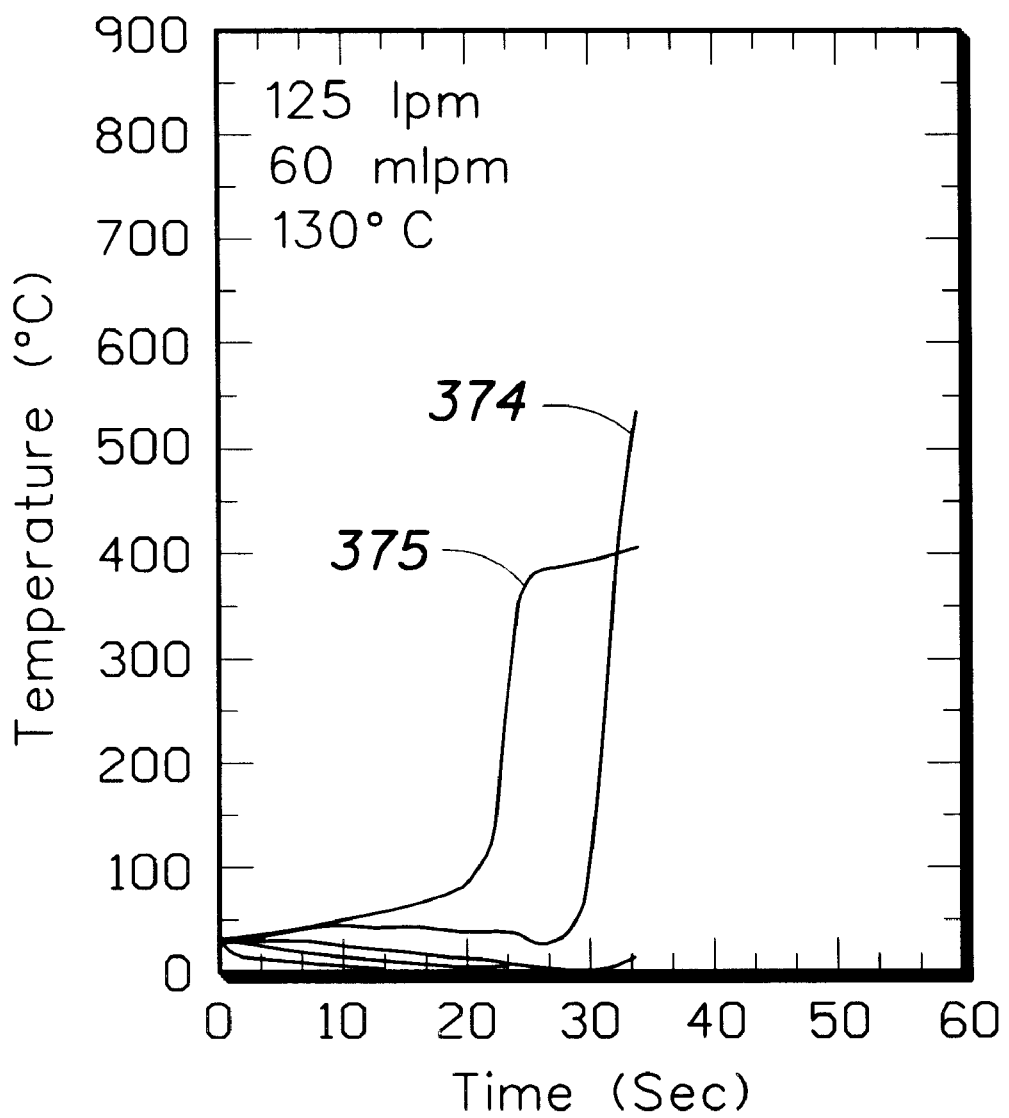
Figure 24A:
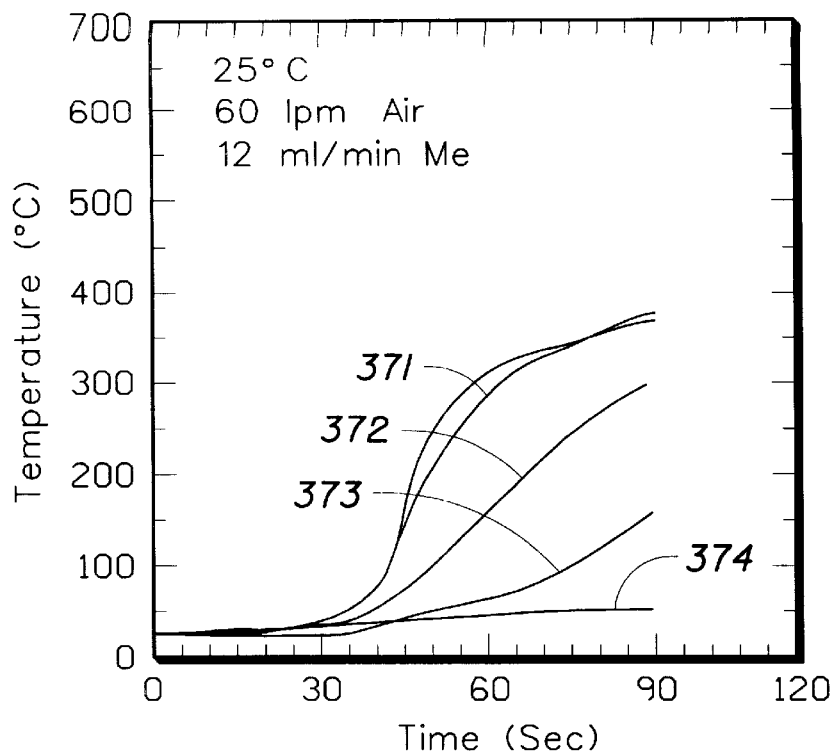
FIG. 24 is a graph of catalyst temperature over time with introduction of methanol and air into the catalytic converter of FIG. 3 preheated at 25° C., 45° C., 65° C. and 85° C.
Figure 24B:
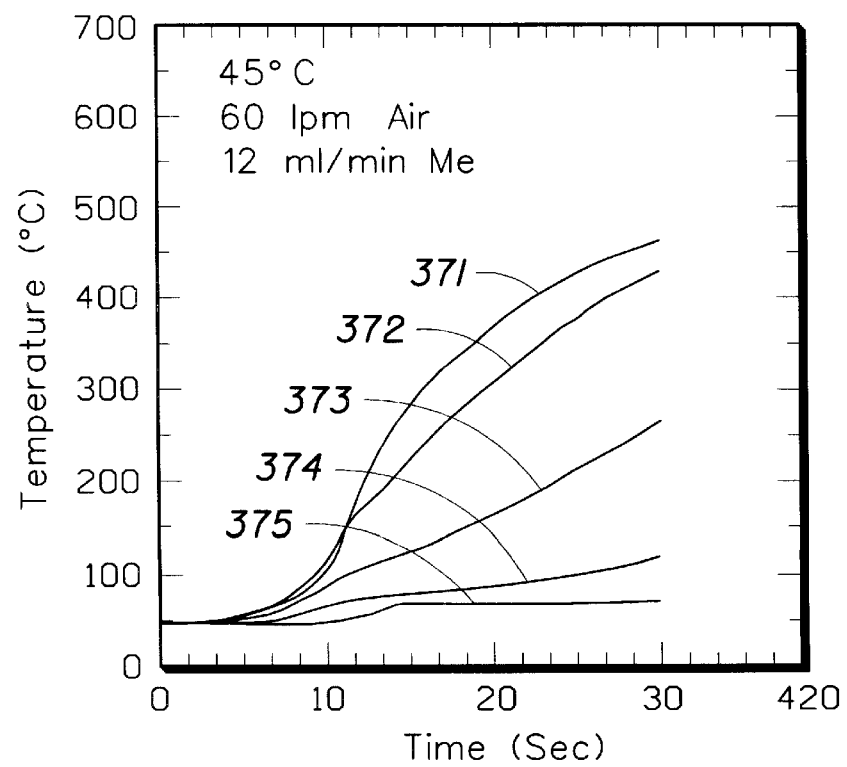
Figure 24C:
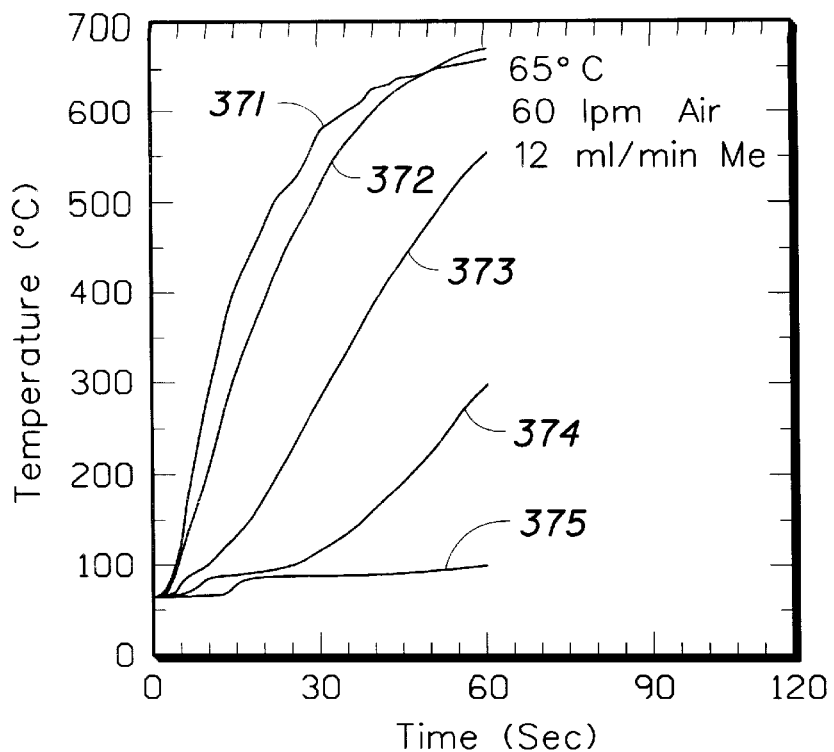
Figure 24D:
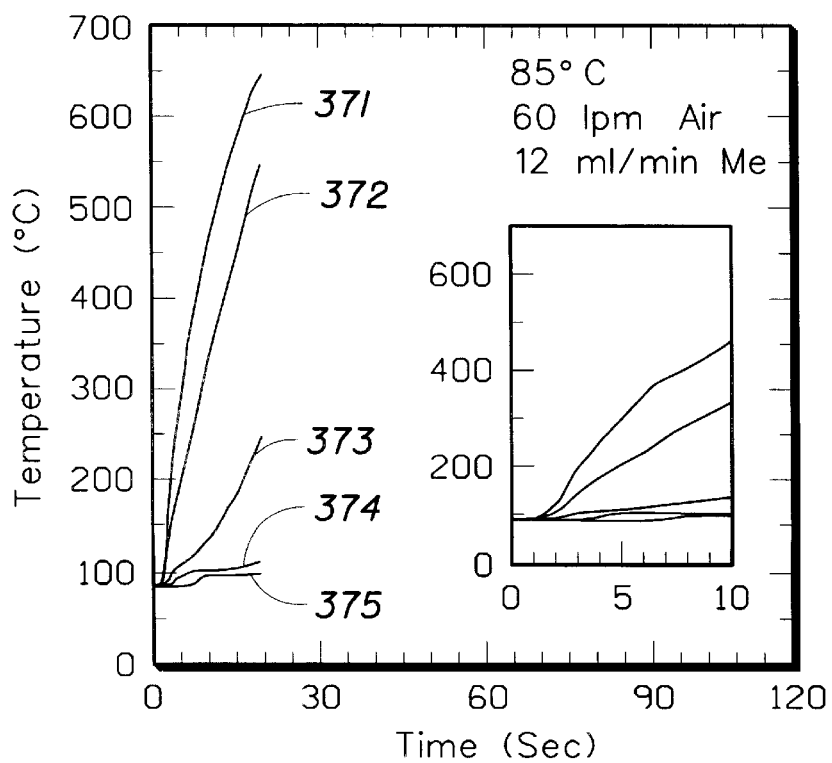
Figure 25A:
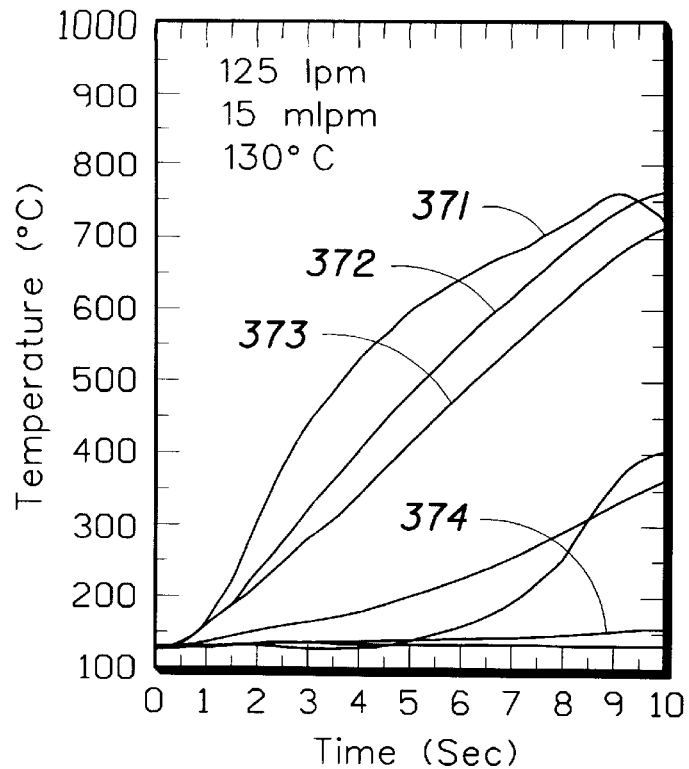
FIG. 25 is a graph of catalyst temperature over time with introduction of methanol at various flow rates and air into the catalytic converter of FIG. 3 preheated at 130° C.
Figure 25B:
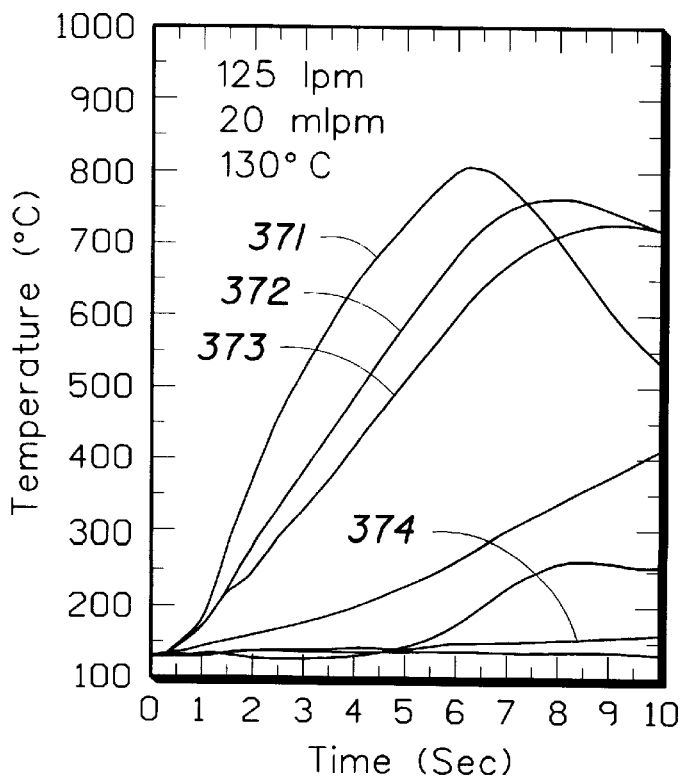
Figure 25C:
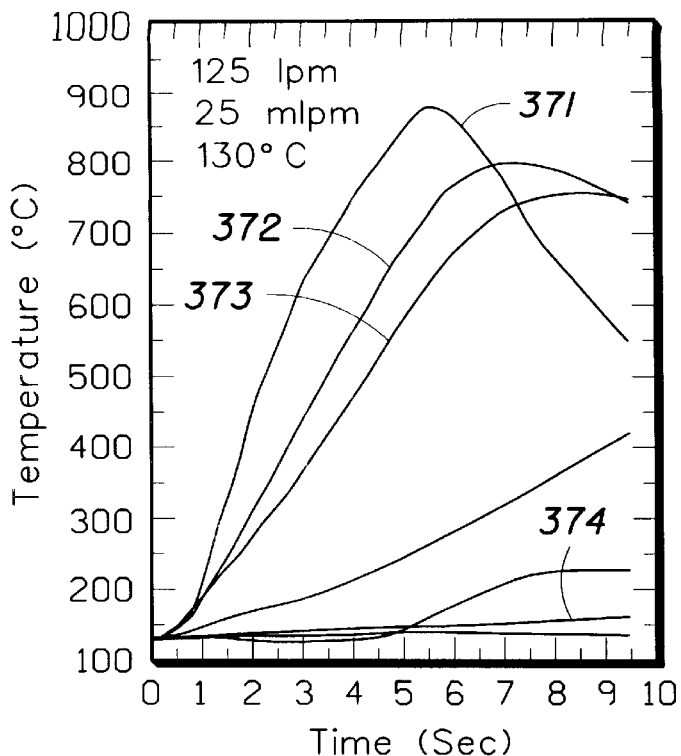
Figure 25D:
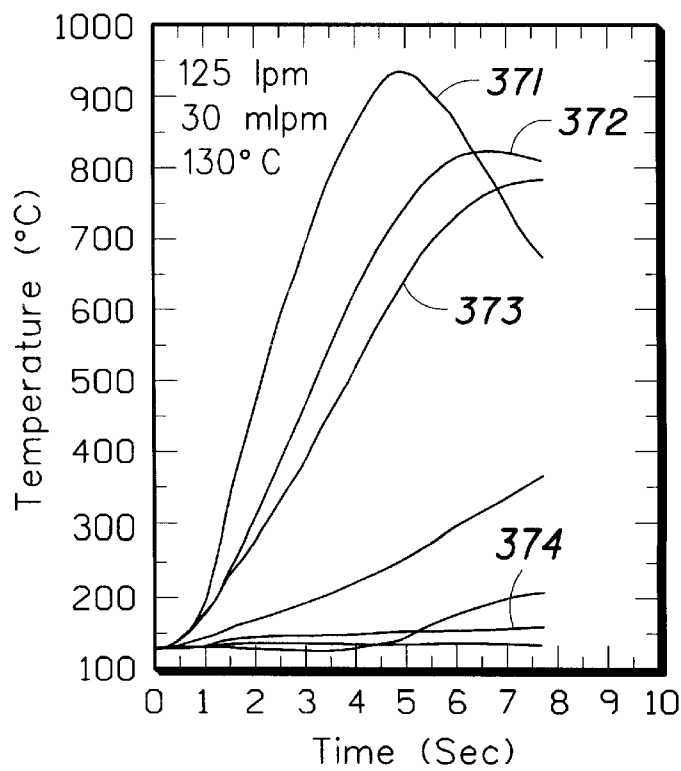

The experimental setup 380 of FIG. 4 was used to provide a flow of air at 125 lpm and a steady state temperature of 130° C. FIGS. 23(a–c) are graphs of catalyst temperature over time with introduction of diethyl ether at flow rates of 15 mlpm, 30 mlpm, and 60 mlpm, respectively.

EXAMPLE #14

The experimental setup 380 of FIG. 4 was used to provide a flow of air at 60 lpm. FIGS. 24(a–d) are graphs of catalyst temperature over time with introduction of methanol and air into an electrically preheated catalytic converter at 25° C., 45° C., 65° C. and 85° C., respectively. show a dramatic reduction in heating time with increasing preheated catalytic converter temperature.

EXAMPLE#15

The experimental setup 380 of FIG. 4 was used to provide a flow of air at 60 1pm and an electrically preheated catalyst at 130° C. FIGS. 25(a–d) are graphs of catalyst temperature over time with introduction of methanol at flow rates of 15 mlpm, 20 mlpm, 25 mlpm and 30 mlpm, respectively.

In accordance with the present invention, various combinations of the heating modes described above may be used simultaneously, sequentially, periodically or overlapping with each other. However, it is generally preferred that the first heating method be efficient at ambient temperatures and wet conditions. Any subsequent heating mode will preferably be efficient at temperatures and conditions prevailing at the point of initiating the subsequent heating mode. As mentioned above, these subsequent heating modes may be initiated before, simultaneous with, or after termination of the previous heating mode. Most preferably, combinations of heating modes should be chosen which collectively provide effective operation, i.e., high rate of temperature increase and efficient conversion of energy, over the desired range of temperatures. However, it should also be recognized that the selection of heating modes may involve a tradeoff between rate of heating and efficiency. Furthermore, other practical considerations should be considered, such as available storage quantities, ability to regenerate, battery life, operational safety and the like.

In various examples above, electrical heating was used in combination with chemical heating using hydrogen or methanol. However, the present invention specifically anticipates the use of even three or more heating modes, where the use of different chemicals is considered to be a separate mode. For example, it is believed that the sequential use of electrical heating, hydrogen oxidation, and methanol oxidation would provide an effective system. Electrical heating is largely unaffected by water on the catalyst and can rapidly bring the catalyst to a temperature above 100 C. or more. Gaseous hydrogen undergoes catalytic oxidation with air at low temperatures, even temperatures below 100 C., and, optionally, can be regenerated. Methanol is a liquid at ambient temperatures, allowing more efficient storage than hydrogen, and undergoes catalytic oxidation with air at temperatures rapidly achievable by hydrogen oxidation. Collectively, this system would provide rapid heating and efficient energy conversion.

Figure 26:
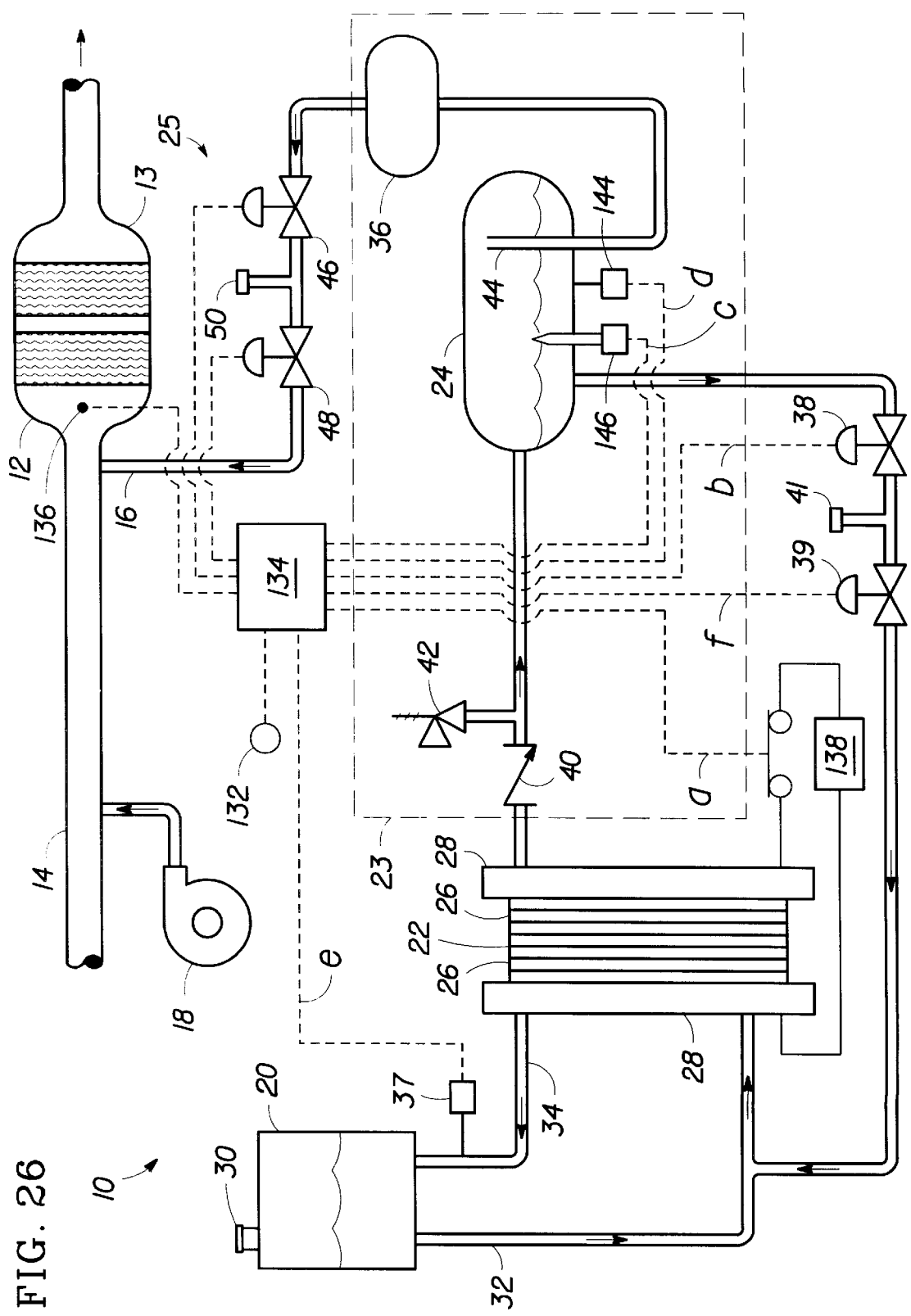
FIG. 26 is a schematic diagram of a hydrogen production and delivery system of the present invention for heating a catalytic converter.

FIG. 26 is a schematic flow diagram of a system 10, for use in accordance with one embodiment of the present invention, installed on a vehicle to deliver hydrogen to the exhaust system. The vehicle includes a catalytic converter 12 located in an exhaust line 14 from a vehicle's exhaust manifold, as shown. The exhaust line 14 is provided with hydrogen from a hydrogen inlet line 16 and, preferably, air from an air pump 18. The air pump could be any suitable air source for injecting air into the exhaust line at suitable pressure and volumetric flow rate to achieve any desired air/hydrogen ratio mixture. The air pump may be replaced by a venturi wherein the pressurized hydrogen gas provides a motive force sufficient to draw in ambient air.

The system 10 includes a water reservoir 20, an electrolyzer 22, a hydrogen storage vessel 24 and a hydrogen delivery system 25. The electrolyzer 22 may preferably comprise a plurality of stacked identical cells 26 between end plates 28. The water reservoir 20 preferably serves not only as a water storage chamber but also as a separator for oxygen gas and water and means of dissipating heat. The reservoir 20 may be a vehicle's windshield washer fluid storage container, but is preferably a dedicated reservoir/separator, optionally allowing collection and storage of oxygen via port 30. Water flows by gravity drain or is pumped from the reservoir 20 to the anodes of the electrolyzer 22 via a supply line 32. As the anodes produce oxygen, the oxygen and entrained water rises naturally back to the reservoir 20 via a return line 34.

The system also provides for the use of a low carbon-containing alcohol, e.g., methanol, ethanol or propanol, in the water throughout the system in order to depress the freezing point of the water. An alcohol, such as methanol, may be provided in any useful concentration, but preferably at an alcohol water molar ratio of between zero and about 1:1. The alcohol is carried with the water throughout the system and may be oxidized at the anode to carbon dioxide gas ($CO_2$), six hydrogen ions ($H^+$), and six electrons ($e^{31}$). The hydrogen ions, or protons, and electrons are recombined at the cathode to form three molecules of molecular hydrogen ($H_2$).

A bubble detector 37 is preferably disposed adjacent or around the return line 34 in order to sense the passage of gas bubbles therein. A suitable type of bubble detector is an optical transmission type detector. The electronic signal from the bubble detector 37 is preferably transmitted to a controller 134 and the signal indicates that at least certain aspects of the electrolyzer 22 are operating properly. Conversely, if the signal indicates the absence of gas bubbles in the return line 34, then the electrolyzer 22 may have a problem, such as a ruptured proton exchange membrane (PEM), depleted or blocked water supply, etc. Furthermore, the controller 134 receiving the signal from the bubble detector 37 may analyze the number of gas bubbles passing through the line 34 over a period of time as some indication of the electrolyzer's operating efficiency.

The hydrogen produced at the cathodes of the electrolyzer 22 is delivered under pressure to a hydrogen storage system 23 comprising a hydrogen storage vessel 24 alone or in communication with one or more additional hydrogen storage vessels 36. The use of more than one hydrogen storage vessel is not necessary to the operation of the invention, but may be desirable to provide sufficient storage capacity while making accommodation for space limitations on board the vehicle. The storage vessel may be made from various materials, such as aluminum, carbon steel, stainless steel or a noncorrosive plastic material. It is preferred that the hydrogen storage vessel 24 or combination of vessels 24, 36 have a total hydrogen storage capacity that is sufficient to heat up the catalyst to a light off temperature at least one time. By storing such amount, the rate of hydrogen production from the electrolyzer can be reduced substantially below the rate of hydrogen consumption by the catalytic converter during the start up period. Furthermore, the electrolyzer may be controlled to refill the storage vessel with hydrogen at various times, preferably when the vehicle is operating efficiently.

The system preferably also includes a water recycle line with valves 38, 39 to capture and reuse most of the entrained water from the hydrogen exiting the electrolyzer 22, a check valve 40 to prevent back flow of hydrogen from the storage vessel 24 into the electrolyzer 22, and a pressure relief valve 42 to protect the system against over pressurization. Because the storage vessel 24 may be designed to operate at a much higher pressure than the water reservoir 20 or the supply line 32, the mere opening of the recycle valve 38 causes water to flow out of the vessel 24. Valves 38 and 39 are alternately cycled to allow small, well controlled amounts of water out of the cathode reservoir. As valve 38 opens, water flows into the tubing between the valves and compresses the headspace in the vertical stub 41. Valve 38 closes and valve 39 opens allowing the compressed hydrogen in the stub 41 to push the captured water into the anode reservoir. The recycle valves 38 and 39 are preferably controlled to maintain the water level in the vessel 24. A preferred water level will be high enough to cover most or all of the pipe and instrument couplings along the bottom of the vessel yet not so high that the hydrogen storage capacity of the vessel is wasted.

Figure 40:
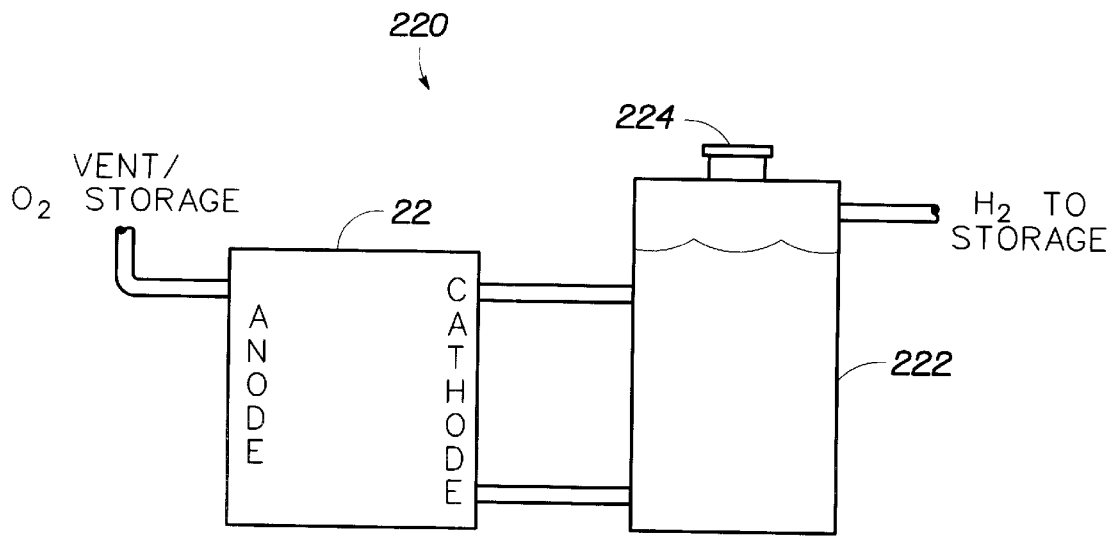
FIGS. 40 and 41 are schematic diagrams of two alternate embodiments of the system of FIG. 26, wherein the water recovery system in the vessel is eliminated.
Figure 41:
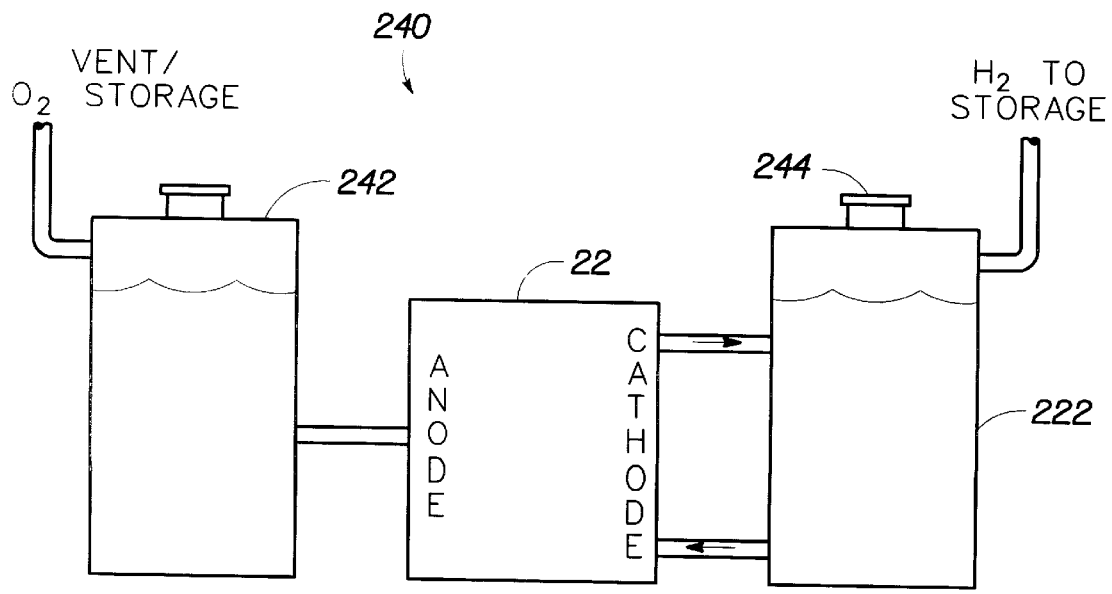

FIGS. 40 and 41 are schematic diagrams of two alternate embodiments of the system of FIG. 26, wherein the water recovery system in the vessel 24 is eliminated. Both alternate systems 220, 240 utilize a proton exchange membrane with the cell 22 which, when operated at sufficiently low current density, will provide the necessary reaction water to the anode when that water is provided at the cathode. The system 220 of FIG. 40 includes a pressurized cathode (hydrogen) reservoir 222 with means 224 for releasing the pressure and refilling the reservoir with water. Alternatively, the reservoir 222 could be filled using pressurized water, which would allow manufacturing control over filling if the system requires specialized equipment.

To eliminate the complexity and safety issues involved, the system 240 shown in FIG. 41 uses an anode reservoir 242 and a cathode reservoir 244. This system 240 still utilizes osmotic movement of the water from the cathode to the anode in normal operating mode but new water is provided at the anode (at ambient pressure) and this water is transferred to the cathode via electroosmosis during the initial operation of the electrolyzer 22 after filling the anode reservoir 242. Once all the anode water is depleted, electroosmosis between the reservoirs 242, 244 ceases and, once again, all process water is provided through the cathode.

Referring back to FIG. 26, the hydrogen is delivered out of the storage vessel 24, preferably through a standpipe 44, or from the top of the vessel 44 or 36 in accordance with the operation of a hydrogen delivery system 25. The hydrogen delivery system 25 determines the manner in which the hydrogen is introduced into the catalytic converter and may be as simple as a single solenoid valve. While hydrogen may be introduced through various valves or orifice plates as a slow, continuous stream, it has been found that introduction of hydrogen pulses or packets to the catalytic converter provides similar heating, yet requires less hydrogen. One preferred delivery system 25 for providing hydrogen pulses or packets comprises a first hydrogen valve 46, a second hydrogen valve 48 and a central region 50 disposed between the first and second valves 46, 48 having a defined volume. The central region 50 is filled with pressurized hydrogen from the storage vessel 24, 36 by opening the first hydrogen valve 46 communicating with the hydrogen storage vessel 24, 36. The first hydrogen valve 46 is then closed and the second hydrogen valve 48 is opened to release the pressurized hydrogen from the central region 50 into the catalytic converter 12, exhaust manifold 14 or engine, as desired. While the region 50 may be of any useful volume and configuration, a typical automobile will preferably have a region suitable to contain about 5 cubic centimeters (cc) at about 400 pounds per square inch (psi), which is released as about 100 cc at about 1 atmosphere (atm). Alternatively, the hydrogen delivery system 25 may comprise a turnstile valve. It is believed that the turnstile valve may be more reliable over a period of extended use.

The ignition switch 132 is preferably electronically coupled to a controller 134 which controls the operation of the hydrogen valves 46, 48 of the hydrogen delivery system 25. In one preferred method of operation, the hydrogen valves 46, 48 provide pulses of hydrogen to the manifold 14 until the temperature sensor 136 reads a temperature equal to or greater than the light-off temperature. The temperature sensor provides feedback to the controller so that adjustments in the manner of operating the hydrogen valves 46, 48 can be made. It should be recognized that any number of temperature sensors could be used and that the controller may take account of any number of conditions in determining the appropriate operation of the valves 46, 48, or other hydrogen delivery systems 25 such as a rotary valve. It is anticipated that refinements in the hydrogen delivery may include pulses of varying frequency and/or volume over time to compensate for increasing catalytic converter temperature or decreasing pressure in the hydrogen storage reservoir.

The electrolyzer 22 receives power from a source 138. It is preferred that the electrolyzer produce hydrogen when the hydrogen pressure in or near the hydrogen storage vessel 24, as indicated by pressure sensor 144, falls below a setpoint pressure between about 100 psig and about 400 psig. It should be recognized that the power to the electrolyzer 22 should be turned off when the pressure exceeds a high pressure setpoint, such as 400 psig. It should also be recognized that many other conditions may be considered in controlling the electrolyzer 22, such as signals from the engine management unit, the length of time that the vehicle has been running, the characteristics of the power supply and the volume of the storage vessel. The other conditions mentioned may be relevant to the efficient operation of the vehicle and the timely replenishment of the hydrogen supply for use during the next cold start. However, in order for the system to account for multiple conditions, it is preferred that the system communicate with a microprocessor controller 134, whether the controller is dedicated to the system 10 or provided as part of the vehicle (such as the engine management controller,) or some combination of controllers.

The microprocessor controller 134 may also be used to monitor and control the water level in hydrogen storage vessel 24. The hydrogen storage vessel 24 is preferably equipped with a water level sensor 146, most preferably a sensor without any moving parts such as an optical sensor. When the water level is too high, the water outlet valve 38 is opened so that the pressure in the vessel 24 will drive water out of the vessel into the reservoir 20 or supply line 32. When the water level is within an acceptable range, the valve 38 is closed. Again, it is preferred to maintain a sufficient level of water in the vessel 24 in order to provide additional protection against hydrogen leaks. Other various control schemes and considerations may be employed as will be readily recognized by those with skill in the art which are within the scope of the present invention. For example, the microprocessor may also be programmed to carry out timed control functions apart from responding to sensory inputs, and may also serve various safety functions.

Figure 27:
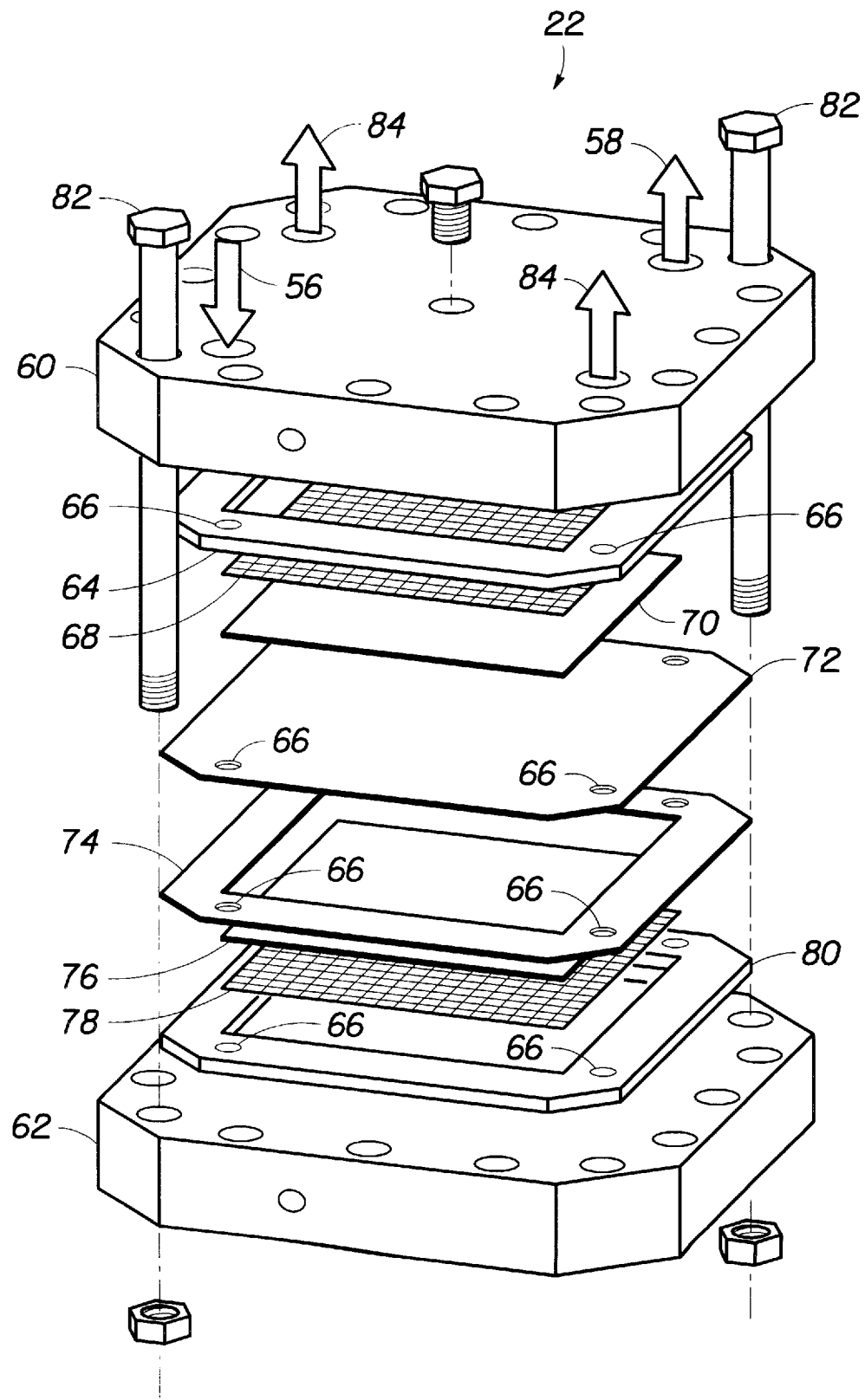
FIG. 27 is an exploded view of a preferred electrolyzer that may be employed in the present invention.

FIG. 27 is an exploded view of a preferred electrolyzer 22 that may be employed in the present invention. In the following description of the electrolyzer 22, the materials of construction referred to as "preferred" are the materials actually used in a test device to prove that the invention would work for its intended purpose. In commercial production models of the present invention, where possible, less expensive materials may be used throughout, such as carbon steel replacing titanium where possible, and plastics, such as polypropylene, where heat and stress will permit the use of such materials.

The electrolyzer 22 may be referred to herein as a proton exchange membrane (PEM) electrolyzer. The proton exchange membrane 72 may itself prove corrosive in this environment in contact with certain substances, thus requiring the careful selection of the material of construction of the electrolyzer. For example, the PEM 72 should only come in contact with carbon, graphite, valve metals (such as titanium or tantalum), noble metals (such as platinum or palladium) or gold. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the anode and/or cathode electrocatalysts.

The electrolyzer 22 includes an anodic electrocatalyst substrate and/or current collector 70 and a flattened "expanded" titanium flow field 68 held within an anodic cell frame 66 made of polychlorotrifluoroethylene (PCTFE) sheet (such as KEL-F available from the 3M Company, St. Paul, Minn.). The preferred anode substrate and/or current collector is a thin sheet of porous titanium made by sintering small diameter titanium spheres and is available from AstroMet, Cincinnati, Ohio. A more preferred anode substrate and/or current collector is a thin sheet of porous titanium made by sintering small diameter titanium fibers and is available from Porous Metal Products, Jacksboro, Tex.

The electrolyzer 22 further includes a cathode substrate and/or current collector 76 and an expanded stainless steel flow field 78 retained in a cathodic cell frame 80 formed of polysulfone. The preferred cathode substrate and/or current collector is a carbon paper consisting of pressed carbon fibers or a carbon cloth made from a weave having a cathodic electrocatalyst layer on one side containing polytetrafluoroethylene (PTFE)-bonded high surface area colloidal platinum or palladium, supported on carbon black or preferably an electrolessly deposited or electroplated thin film of platinum or palladium, most preferably having a platinum or palladium loading of at least 0.1 mg/cm$^2$. Alternatively, the cathode may be constructed using a semi-compressible stainless steel felt, suitably supported, having high porosity and sufficient catalytic activity.

The various components of the PEM electrolyzer are stacked together and retained with a plurality of tie rods 82, preferably 16 such tie rods. Stainless steel tubes, such as SS316, are then screwed into four threaded ports on one of the titanium end plates. The ports are the anode water inlet port 56, the anode water/oxygen outlet port 58, and a pair of cathode hydrogen/water outlet ports 84. To minimize electrical contact resistance between components, the titanium end plates 60 and 62 and the expanded titanium metal current collectors 68 and 78 may be electroplated with a thin film of gold or noble metals, such as platinum.

The cathode and the anode of the electrolyzer are of special construction. The cathodic electrode structure for hydrogen evolution may be fashioned from a commercially available fuel cell gas diffusion layer on a carbon cloth backing (such as ELAT available from E-TEK, Inc., Natick, Mass.), which acts as a support for the active hydrophilic electrocatalyst layer. This active layer contains high surface area colloidal platinum (about 100 m$^2$/g), supported on carbon black (between about 10 and about 50 wt % Pt on C), yielding a platinum loading of at least about 0.1 mg/cm$^2$. The cathodic electrode structure may be hot-pressed onto one side of a segment of a precleaned PEM material. Hot-pressing of the cathodic electrode and PEM is preferably carried out between the plates of a hot-press elevated to about 200° C. for about 60 seconds, and using a force of about 15,000 pounds.

One suitable anodic electrocatalyst layer contains mixed iridium and ruthenium dioxides at a molar ratio of about 1:1. The layer is prepared by dissolving iridium and ruthenium chlorides in about 8 ml of concentrated HCl and heating the mixture to almost dryness. The resulting chlorides are then dissolved in isopropanol to make an ink-line coating. A porous titanium plate (such as a 0.05" thick plate available from Astro Met of Cincinnati, Ohio) is etched in 12% HBF$_4$ for about 60 seconds and rinsed with isopropanol. This substrate is then coated with the ink-like mixture and the solvent evaporated under low heat of about 90° C. This coating and drying procedure is repeated several times, then the electrode is heated in a furnace at 400° C. for 10 minutes in ambient air. The coating, drying, and furnace treatment is repeated twice more, but with a final baking time of two hours instead of 10 minutes. A preferred anodic electrocatalyst consists of high surface area platinum-ruthenium metal alloy powder having an atomic ration of 1:1, platinum:ruthenium and which is available from E-TEK, Inc., Natick, Mass. A more preferred anodic electrocatalyst consists of high surface area platinum-ruthenium oxide (Pt—$RuO_x$) powder having an atomic ratio of 1:1, platinum:ruthenium. The synthesis of the Pt—$RuO_x$ electrocatalyst employs anhydrous chloride salts of platinum and ruthenium. Quantities of the two salts are utilized such that the Pt—Ru atomic ratio is 1:1. The salts are ground together with $NaNO_3$ using a mortar and pestle until a homogenous powder is obtained. The resulting mixture is then deposited in a crucible, placed into a 500° C. oven, and fired in ambient atmosphere for 10 minutes. After heating, the crucible is removed from the oven and allowed to cool to room temperature. A shiny black crystalline solid is observed in the crucible which consists of the desired Pt—$RuO_x$ product dispersed in a salt matrix. To dissolve the salt and liberate the insoluble catalyst product from the matrix, the crucible is placed into a beaker of distilled/deionized water for 24 hours. The product is then isolated using vacuum filtration, washed with copious amounts of deionized water, and dried in a heated vacuum oven.

To ensure that surface atoms of platinum and ruthenium in the Pt—$RuO_x$ crystallites are activated completely, the catalyst is subjected to a heated reduction step. The catalyst is placed into a cool ceramic heating tube which is housed in a muffle furnace and equipped for the external supply of gaseous reactant. Initially, argon is allowed to flow for one hour in the tube to remove potential oxidizing species from the ceramic. Hydrogen is then introduced into the ceramic tube and the temperature of the furnace/ceramic tube is increased slowly to 200° C. This environment is maintained for six hours. The resulting catalyst is a very fine powder which displays catalytic activity toward methanol oxidation in the presence of air.

An even more preferred anodic electrocatalyst consists of a homogenous mixture of high surface area iridium and ruthenium oxides with either high surface area platinum-ruthenium metal alloy powder or high surface area Pt—$RuO_x$. In each case, the mole ratio of iridium and ruthenium oxides to platinum-ruthenium metal alloy or to Pt—$RuO_x$ should preferably be 1:1.

The anodic eletrocatalysts described above are applied to one side of a proton exchange membrane in the form of a catalyst ink that is prepared using the following procedure. The catalyst is first dispersed into distilled water using a water:catalyst ratio of approximately 1:1 by weight. The mixture is then sealed into an appropriate container to prevent solvent evaporation and agitated using high energy sonication for one hour or more until complete dispersion is achieved. Following dispersion and wetting of the catalyst, a quantity of commercially-available, dissolved ionomer, solution, such as the 5 wt % Nafion® solution available from Solution Technologies, Mendenhall, Pa., is added to the dispersion such that the final concentration of ionomer is approximately 15 wt %.

This mixture is resealed into a container to minimize evaporation and subjected to high energy sonication until a homogenous, well-dispersed catalyst ink is achieved. The ink is applied directly to the surface of a dry membrane as a single layer or as a multilayer coating using a brush technique. For multilayer coatings, the solvent of the previously applied layer is evaporated to dryness prior to the application of the next coat. The procedure could be modified to make use of other coating application techniques such as air spraying or spin coating which are more amenable to mass production.

After the catalyst ink has been applied successfully to one side of the membrane the membrane and electrode (M&E) assembly is subjected to a hot press step. In this step, the electrodes and membranes are fused under elevated temperature and pressure in a hydraulic press equipped with resistively-heated platens. To press the M&E, a "press package" is created which consists of the M&E and various insulative and support layers to facilitate the release of the M&E from the package after the press step. In this package, the M&E assembly is sandwiched typically between two thin Teflon sheets to protect the electrode surface(s), and this sandwich is placed between two thin, flat metal plates that provide support and heat transfer between the platens and the M&E during the press step. The complete M&E, Teflon, and metal plate press package is positioned quickly between the two pre-heated platens (ca. 150 to 200° C.), and pressure (1000 to 1500 psi) is applied to the package for 60 to 120 seconds to finish the M&E fabrication process.

For the longest component lifetime it is important to prevent the movement of internal electrolyzer components as the cathode (hydrogen) pressure is changed. This is accomplished by selecting an anode flowfield and a porous electrocatalyst substrate that are noncompressible and selecting cathode components which provide sufficient elasticity such that the PEM is pressed firmly against the anode regardless of the cathode pressure.

In the preferred structure the anode flowfield consists of flattened "expanded" metal and the cathode flowfield includes at least one piece of non-flattened (as expanded) metal to provide compression.

An alternative flow field would be perforated corrugated steel. The corrugates could be designed to provide more rigidity on the low pressure side and more elasticity and resiliency on the high pressure side of the membrane.

In mass production, where components such as the cell frames are molded, the anode flowfield components could be molded into the cell frame. This would increase the rigidness of the noncompressible side as well as simplify assembly.

Figure 28:
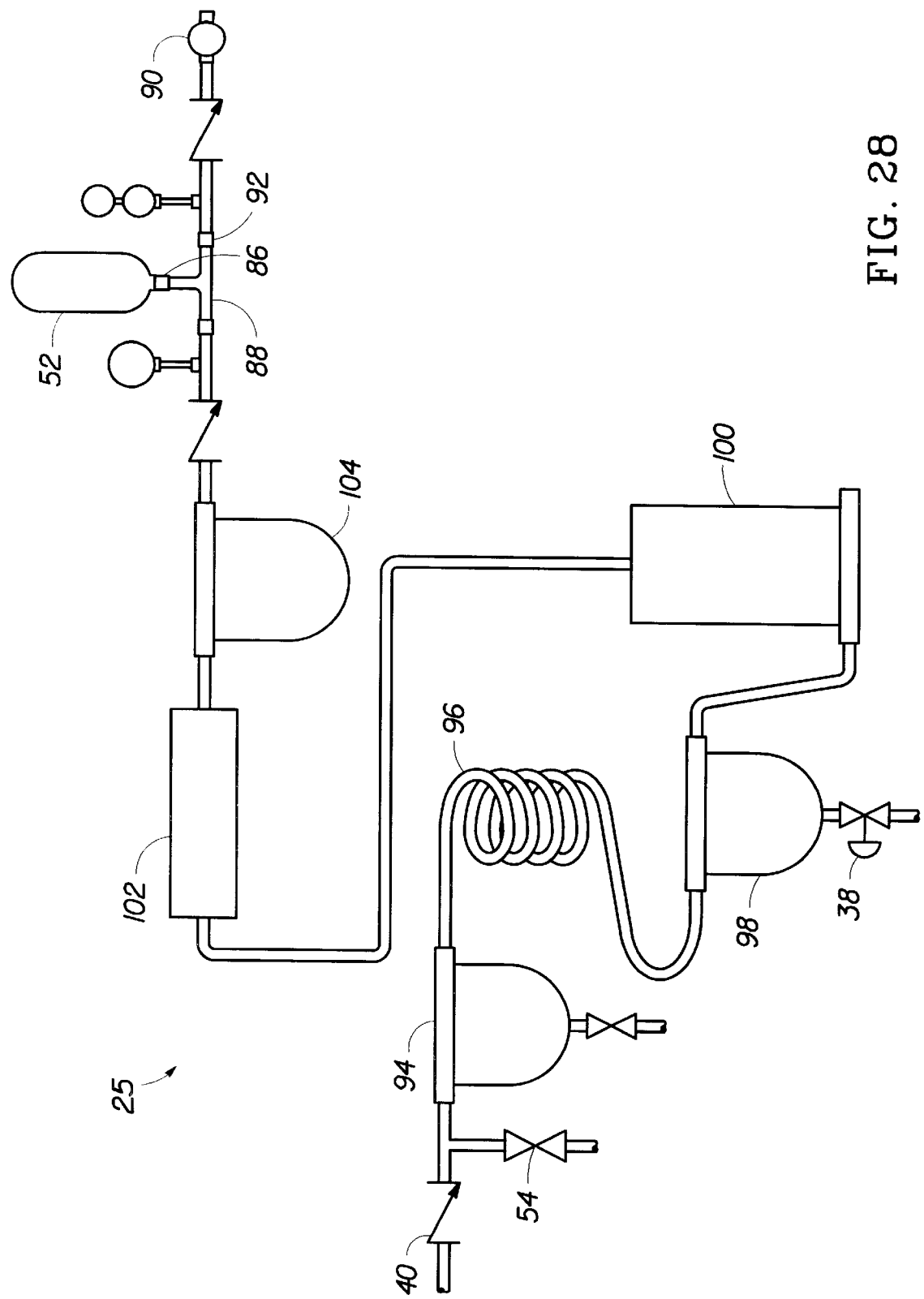
FIG. 28 is a schematic of an alternate hydrogen storage system of the present invention.

FIG. 28 is an alternative hydrogen storage system 25 which utilizes a metal hydride type storage vessel 52. Prior to operation, the system 25 of FIG. 28 permits purging all air from the system with an inert gas, such as nitrogen, by attaching a nitrogen gas feed line at a purge gas inlet 54 downstream of the check valve 40. During the purging operation, the metal hydride vessel 52 is detached at a quick disconnect 86. This operation effectively seals both the vessel 52 and a gas line 88, to keep the purge gas out of the vessel 52. The remainder of the system 25 is then purged from the purge gas inlet 54 through a back pressure regulator 90.

To charge the system 25 with hydrogen, a needle valve 92 between the storage vessel 52 and the back pressure regulator 90 is shut. Hydrogen gas generated by the electrolyzer (See FIG. 26) is preferably processed through a four-stage process to remove entrained water (liquid or vapor) and any oxygen contaminant from the hydrogen stream before storage in the vessel 52. The first step involves removal of a small amount of entrained liquid water coming from the electrolyzer in the hydrogen gas. The entrained liquid water is removed without a pressure loss by means of the entrained liquid water trap 94. The second step involves cooling the hydrogen gas stream from the electrolyzer temperature to ambient in a condensing coil 96. The electrolyzer typically operates at between about 20 and about 60° C. above ambient, with the exact temperature depending on specific electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 98 and removed through the drain valve 38.

At this point, the hydrogen gas stream is still saturated with water vapor, but now at a lower temperature. This saturated gas stream is next passed into a zeolite-filled gas drier 100. This drier absorbs water vapor and any alcohol vapor present when using a windshield washer fluid feed. Any oxygen contaminant present in the hydrogen gas stream is then eliminated in a catalytic recombiner or oxygen eliminator 102 to reduce it to water. Final clean-up of the hydrogen gas stream is accomplished in a second zeolite absorber bed in a polishing drier 104. The polishing drier removes traces of water produced by the catalytic recombiner 102.

The hydrogen storage system 25 of FIG. 28 is designed for relatively short term operation. The system 25 may be designed for longer term operations, for example 100,000 miles or more, utilizing other methods of water removal known in the art. A satisfactory metal hydride hydrogen storage unit is available from Hydrogen Consultants of Littleton, Colo. Such an available unit can store 30 liters of hydrogen which can be delivered at 30–45 psig, with recharging using hydrogen gas at 100–200 psig. Still, the most preferred hydrogen storage means is a pressure vessel, such as vessel 24 of FIG. 26, made of a composite structure, involving the use of aluminum or ferrous-based alloys. A suitable hydrogen storage vessel of this type is available from Harless Specialties of Irwin, Pa.

Figure 29:
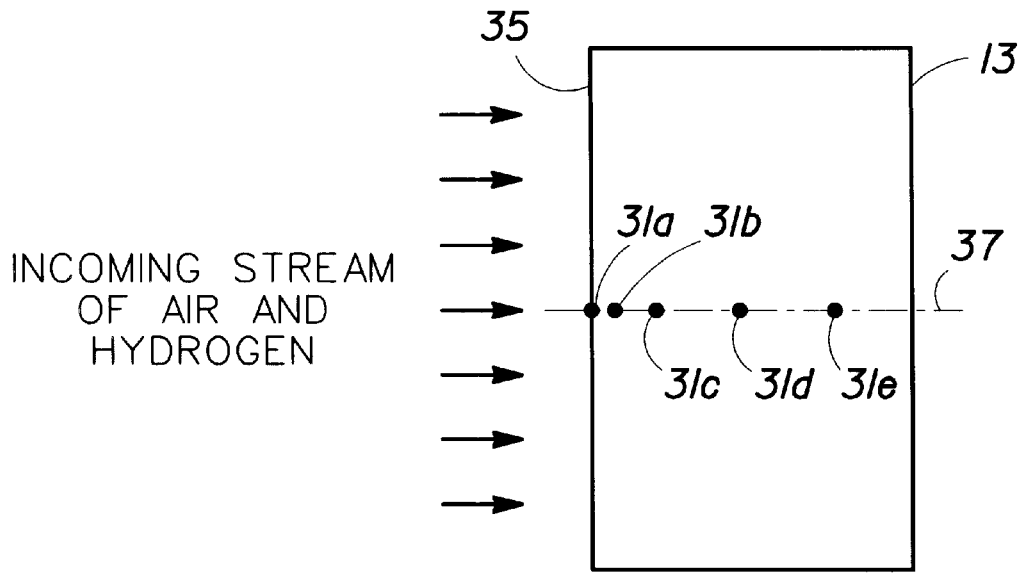
FIG. 29 is a cross-sectional side view of a catalytic converter monolith showing air and hydrogen flow in the axial direction.

FIG. 29 is a simplified cross-sectional view of a catalytic converter monolith showing air and hydrogen flow in the axial direction through the monolith 13. The temperature of the monolith is measured with a thermocouple at points 31($a$)–($e$) along the central axis, with point 31($a$) being on the front face where the gases first contact the catalyst and the other points 31($b$)–($e$) located at positions successively further into the monolith. The results of these temperature measurements at 40 liters per minute (lpm) total gas flow rate containing 3%, 5%, 8.5% and 17% hydrogen is shown in FIGS. 31($a$)–($d$). FIGS. 31($a$)–($d$) are graphs of the catalyst temperature measured at axial positions within the monolith as indicated in FIG. 29.

Figure 30:
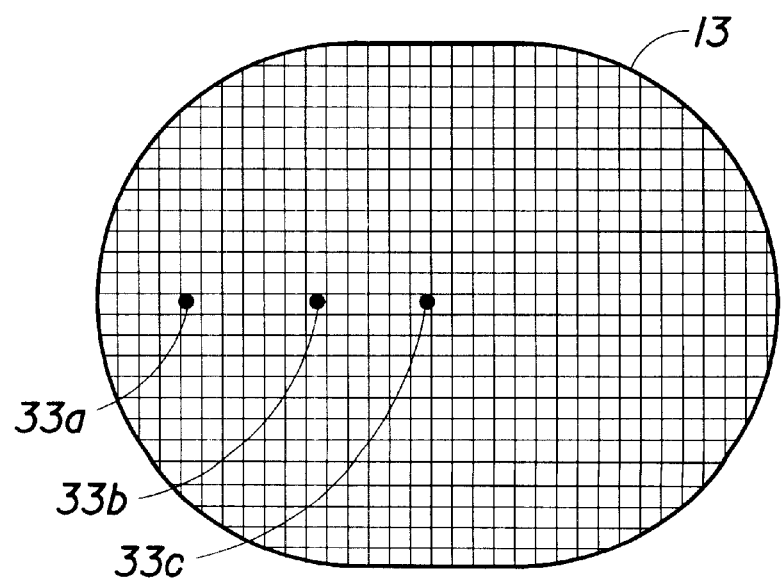
FIG. 30 is a cross-sectional front view of the catalytic converter monolith in FIG. 29.
Figure 31A:
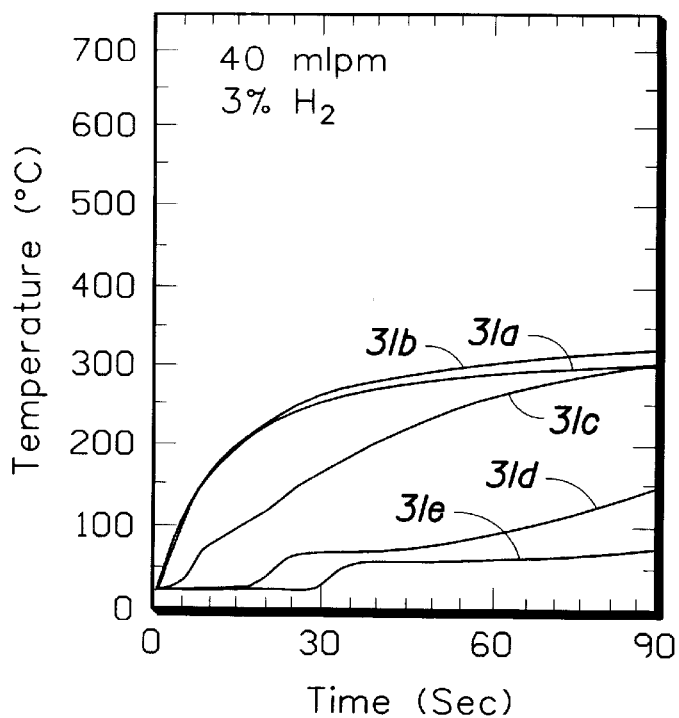
FIGS. 31(a–d) are graphs of the catalyst temperature measured at axial positions within the monolith as indicated in FIG. 29.
Figure 31B:
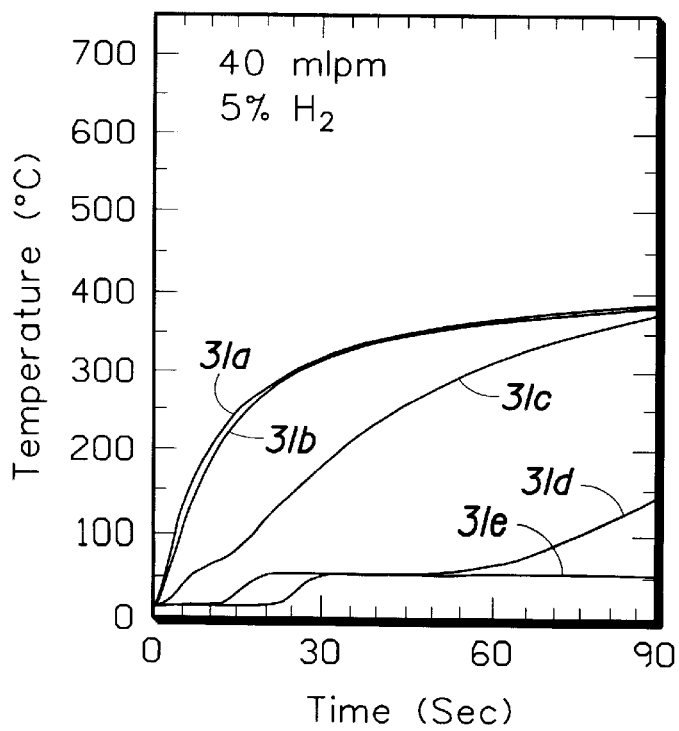
Figure 31C:
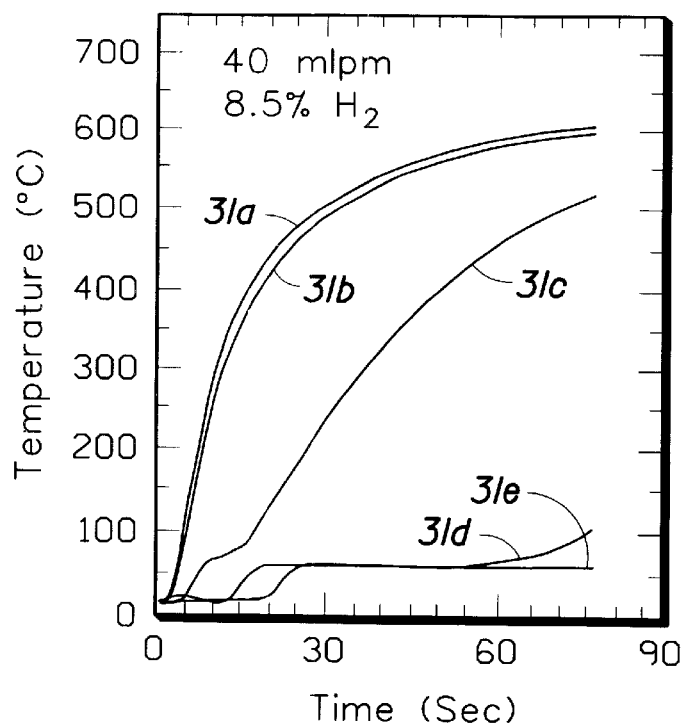
Figure 31D:
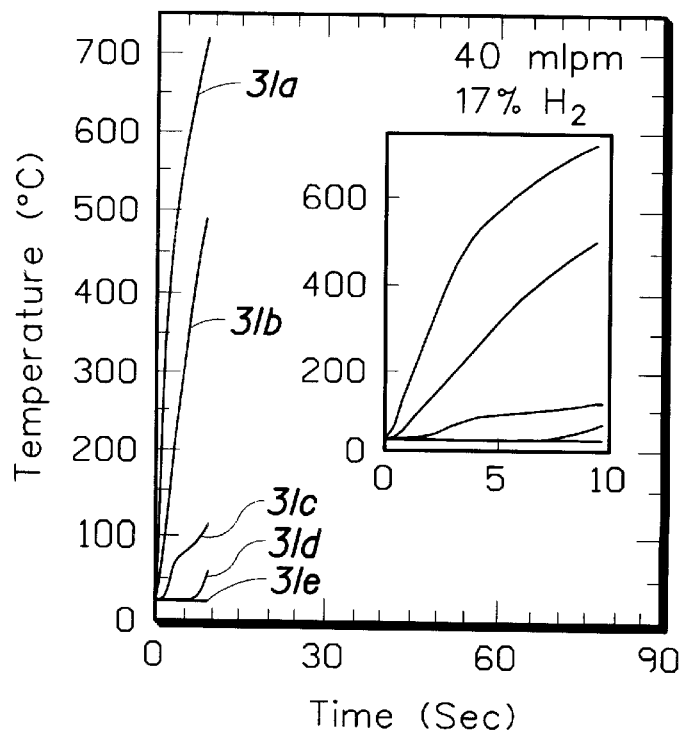
Figure 32A:
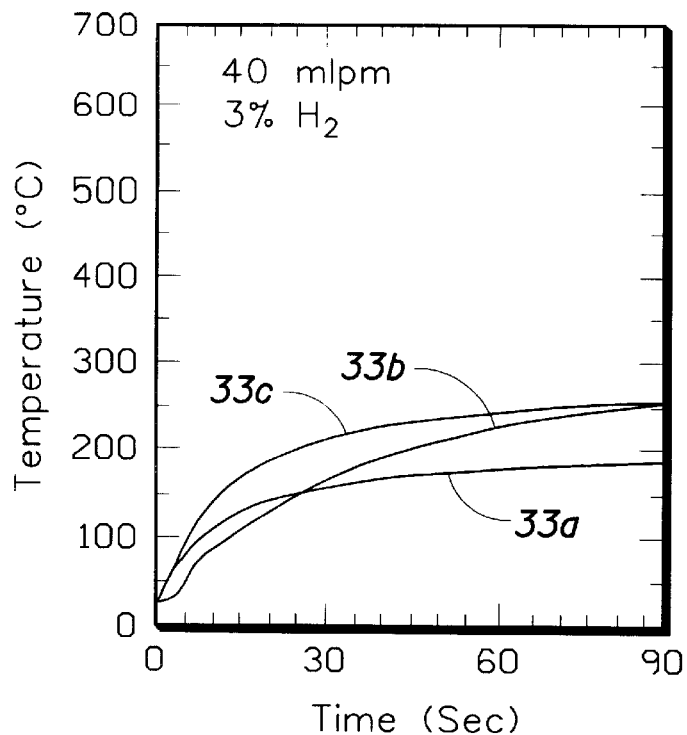
FIGS. 32(a–d) are graphs of the catalyst temperature measured at radial positions within the monolith as indicated in FIG. 30.
Figure 32B:
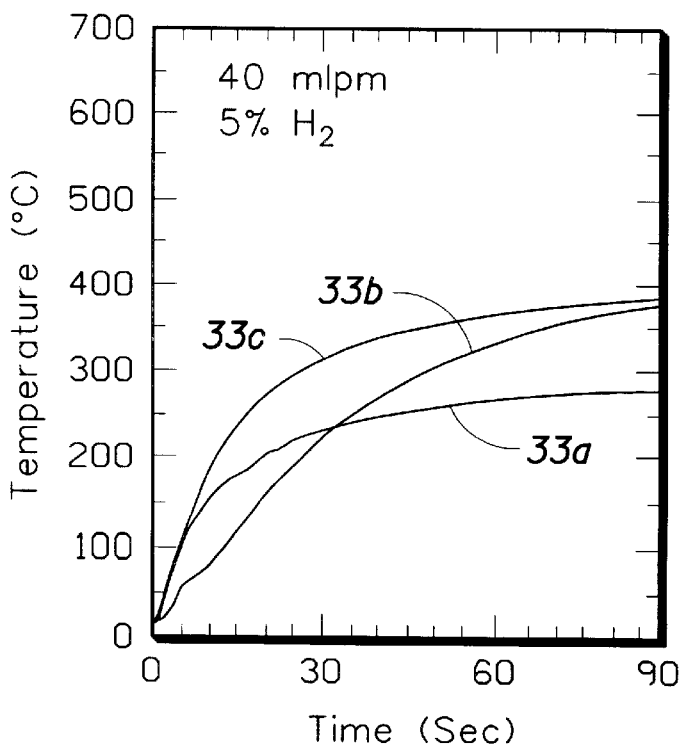
Figure 32C:
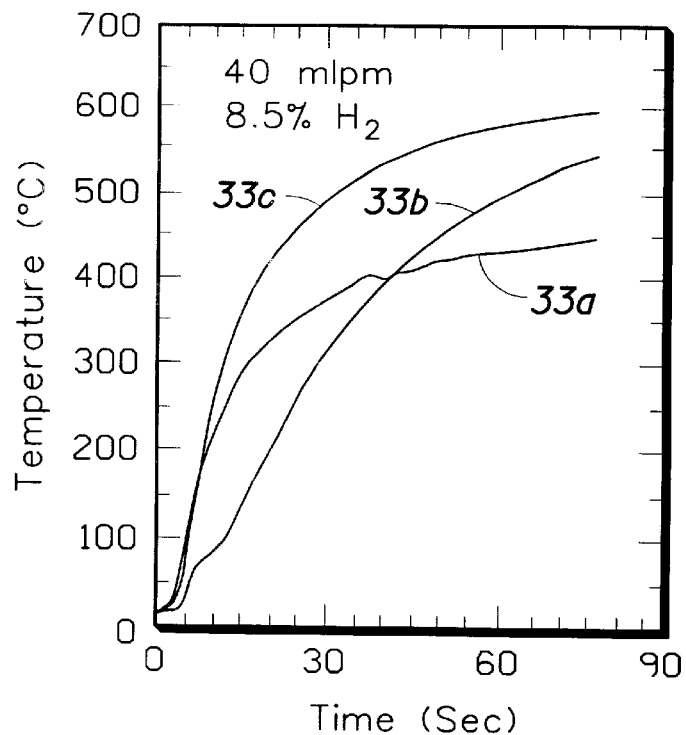
Figure 32D:
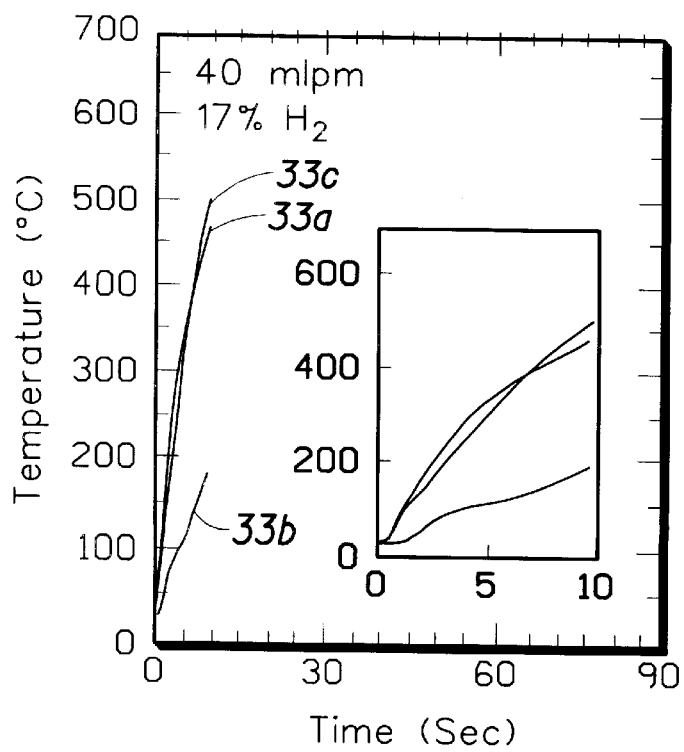

Now referring to FIG. 30, a simplified cross-sectional view of the catalytic converter monolith 13 of FIG. 29 is presented. The temperature of the monolith 13 is measured with a thermocouple at points 33($a$)–($c$) along the monolith radius, with point 33($c$) being in the center of the monolith and the other points 31($b$) and ($a$) located at greater distances from the center. The results of these temperature measurements at 40 liters per minute (lpm) total gas flow rate containing 3%, 5%, 8.5% and 17% hydrogen is shown in FIGS. 32($a$)–($d$). FIGS. 32($a$)–($d$) are graphs of the catalyst temperature measured at radial positions within the monolith as indicated in FIG. 32.

The face of the monolith should be noted as the beginning of the active catalyst sites, not the physical front of the brick. Using this definition, the face will move as the catalyst ages.

It has been found that the introduction of a relatively small percentage of hydrogen in an air stream within a typical automobile exhaust system provides nearly spontaneous heating of a major portion of a face 35 (see FIG. 29) of the catalyst material almost immediately following ignition in the internal combustion engine providing the exhaust gas. This heating along the face 35 of the converter is fortuitous because it has been found that the most effective site for providing local heating is along and near the upstream face 35 of the catalyst monolith 13. In fact, where the monolith 13 is made of a material that heats slowly when used in association with the present invention, the face 35 may comprise a more reactive catalytic material to bring the entire catalytic converter to light-off more quickly. In addition, the heat supplied by the spontaneous combination of hydrogen with oxygen or air in the presence of the catalyst monolith 13 produces only a small quantity of water as a product of the reaction, which does not degrade the performance of the catalytic converter.

The air flow rate through the monolith 13, depending on engine size and tuning parameters, typically falls in the range between about 40 and about 400 liters per minute (lpm). The ideal range is between 80 and 300 lpm, depending on engine size. Effective concentrations of hydrogen for these flow rates are between about 1 and about 28 volume percent, with a preferred range between about 5 and about 18 volume percent. The most preferred range of hydrogen concentration, again depending on engine size, is between about 8 and about 15 volume percent. For example, at an air flow rate of about 150 lpm across the catalytic converter, the ideal range of hydrogen concentration in that flow is between about 12 and about 13 volume percent. Under those conditions, light-off temperature at the face 35 is reached in about one second. At an air flow rate of about 90 lpm and a hydrogen concentration between about 8.5 and about 11 volume percent, light-off is achieved in about two seconds.

The energy consumption to heat the catalyst varies depending on the air flow rate and the concentration of hydrogen. For example, at an air flow rate between about 30 and about 50 lpm and a hydrogen concentration between about 10 and about 11½ volume percent, the chemical energy required to heat the monolith to light-off is approximately 1.5 Watt-hours. An electrically heated catalyst (EHC) unit requires between about 10 to about 15 Watt-hours to heat the same monolith at the air flow rate of 30 to 50 lpm.

The present invention is also suitable for use in low ambient temperature conditions, for example where the outside temperature is as low as −7° C. or lower. Depending on the active catalyst compositions used, these extremely low temperatures may cause the amount of time required to achieve light-off to double. In those conditions, it may be desirable to add a small electrical heater, which would be much smaller than an EHC heater and require only about 200 Watts of power, in order to achieve the results similar to those achieved at typical ambient temperatures.

Figure 33:
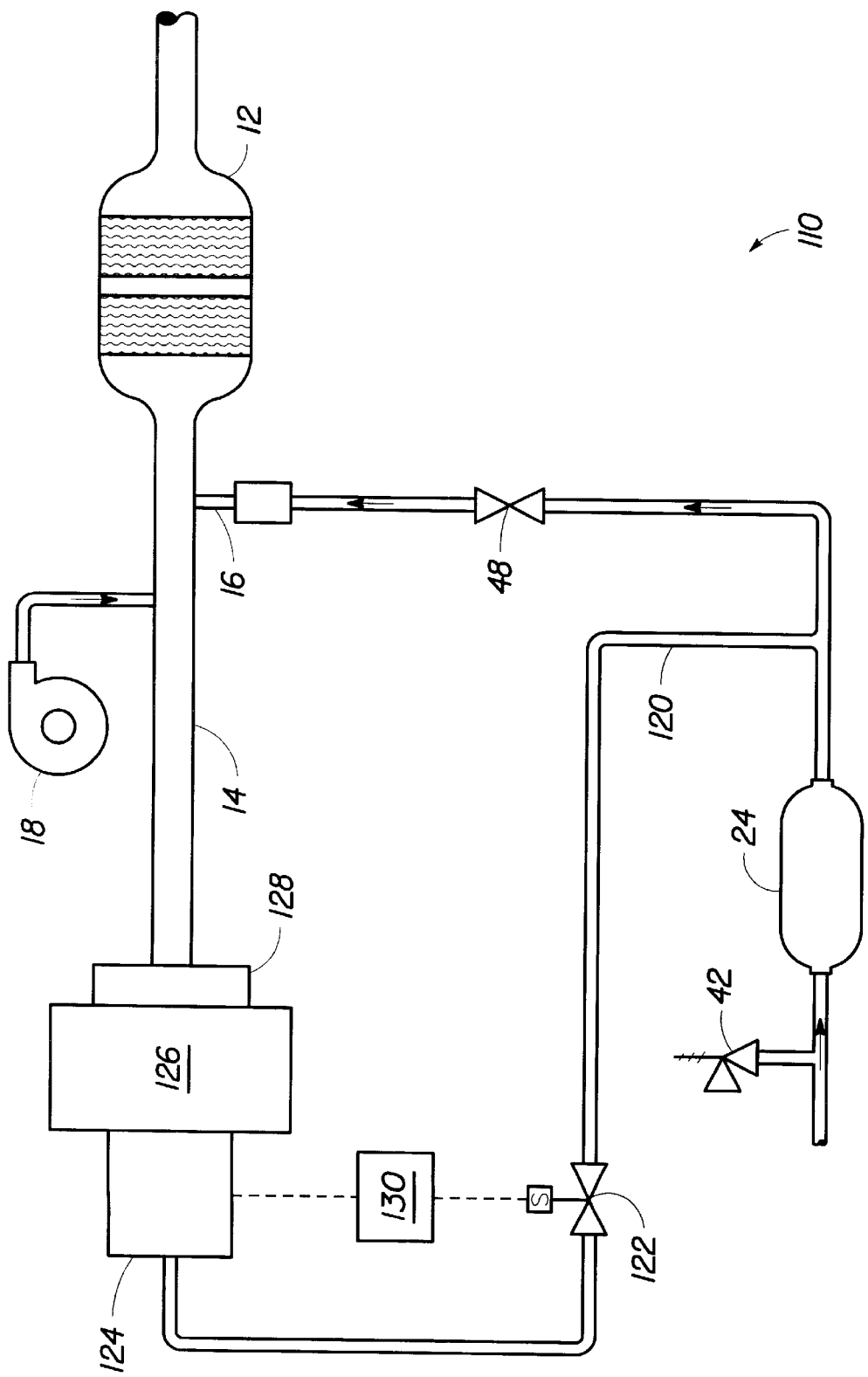
FIG. 33 is a schematic diagram of a system for the combustion of hydrogen in an internal combustion engine.

Now referring to FIG. 33, one aspect of the invention provides an on-board hydrogen ignition assist system 110. A source of hydrogen, such as the electrolyzer described above or any suitable means, fills the hydrogen storage cylinder 24. An ignition supply line to a control valve 122 controls the supply of hydrogen into an engine ignition 124. The engine ignition 124 includes the fuel, air, and electrical components for an internal combustion engine 126. Thus, the hydrogen can be supplied at any convenient location so that it is injected into the cylinders of the engine 126. For example, hydrogen under pressure can be supplied to the intake manifold where there is already a fuel/air mixture (during the inlet cycle), or the hydrogen can be mixed with air before it goes to the engine's fuel injection system, or other means.

The system 110 of FIG. 33 turns the internal combustion engine 126 into a hydrogen fuel injected engine for the first few seconds of start-up, before any gasoline is introduced into the engine. This way, the catalytic converter can be brought to light-off temperature before the engine begins producing undesirable emissions. Then, when gasoline is finally injected into the system, the catalytic converter has already been heated to a more efficient operating temperature, preferably the light off temperature.

Expended fuel gases are collected in an output manifold 128 and flow into the exhaust line 14. An ignition controller 130 provides control signals to the control valve 122 for the introduction of hydrogen to the engine ignition 124 to coordinate hydrogen introduction during cold start operations. The on-board hydrogen ignition assist system 110 functions with or without the hydrogen delivery system 25 for introducing hydrogen directly into the catalyst monolith, but the system 110 is preferably used in combination with hydrogen delivery to the catalyst. When using both systems 25, 110, the hydrogen generation and on-board storage can be used for both.

Figure 34:
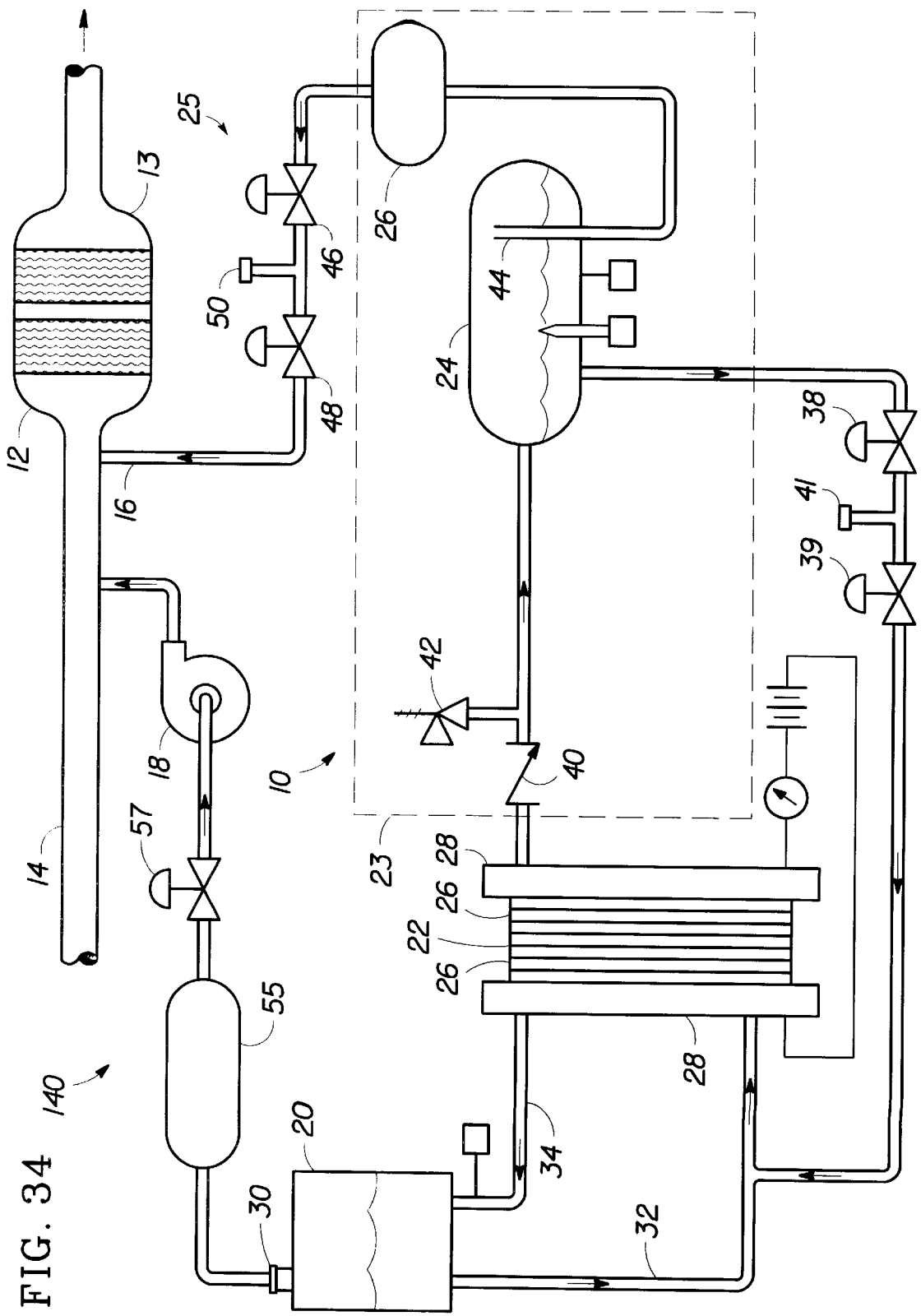
FIG. 34 is a schematic diagram of a system having oxygen recovery and storage equipment and means for injecting oxygen into the catalytic converter.

Another aspect of the invention provides oxygen recovery from the electrolyzer. FIG. 34 is a schematic diagram of a system 140 providing equipment for oxygen recovery, storage and injection into the catalytic converter. The oxygen separated from water in the water reservoir 20, passes through the port 30 and is collected in a storage vessel or cylinder 55. During ignition, and perhaps during all operation of the vehicle, the oxygen may be released from the vessel 55 by opening a valve 57 and input into the intake of the air pump 18. In this manner, the oxygen enriches the air and provides more efficient combustion of the hydrogen or exhaust gases within the catalytic monolith 13. It should be recognized that the pump 18 of FIGS. 26 and 36 may be replaced with a venturi for drawing air into the catalytic converter.

Figure 35A:
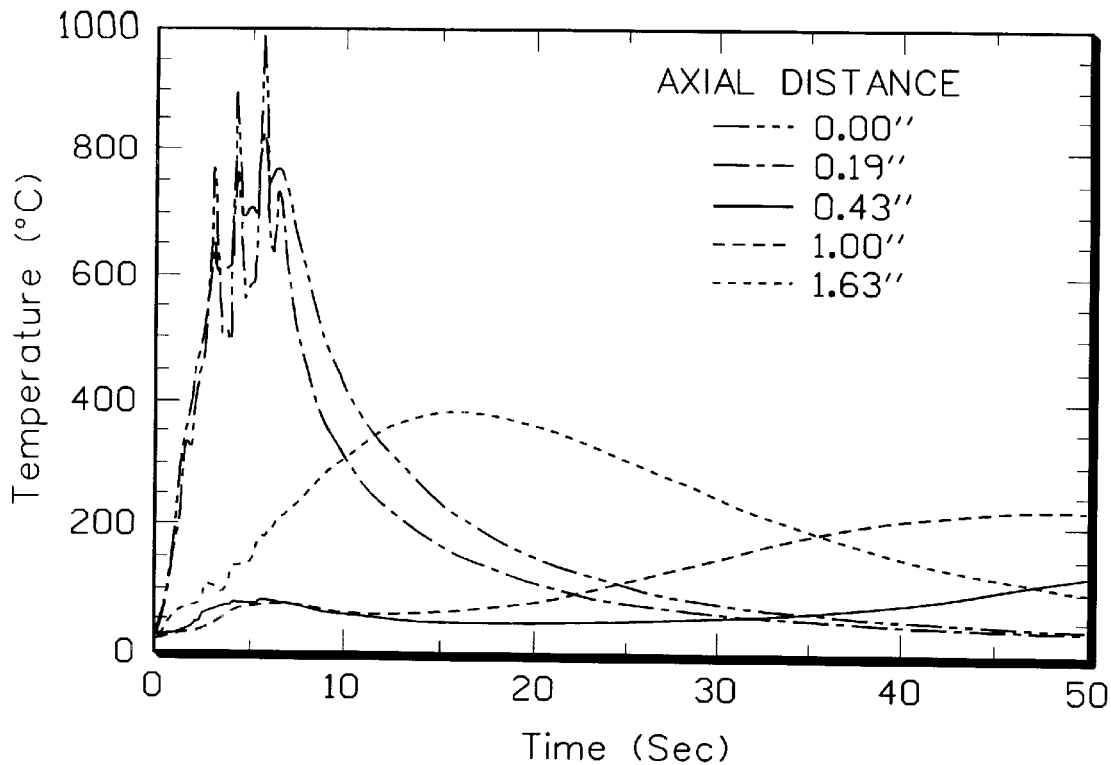
FIGS. 35(a–b) are graphs of the catalyst temperature at various axial and radial distances in the catalyst monolith over a period of 50 seconds using a pulsed release of hydrogen into an air stream.

Now referring to FIGS. 35(a) and (b), graphs are provided showing the catalyst temperature at various axial distances and radial distances in the catalyst monolith over a period of 50 seconds using a pulsed release of hydrogen into an air stream. The graphs show the temperature rise in the catalytic converter monolith at an air flow rate of 90 lpm and pulsed hydrogen flow controlled by a microprocessor. The pulsed hydrogen flow was provided by opening the hydrogen release valves 46 and 48 (see FIG. 26) for 0.01 seconds and closing the valves for 0.66 seconds, successively 10 times.

Figure 35B:
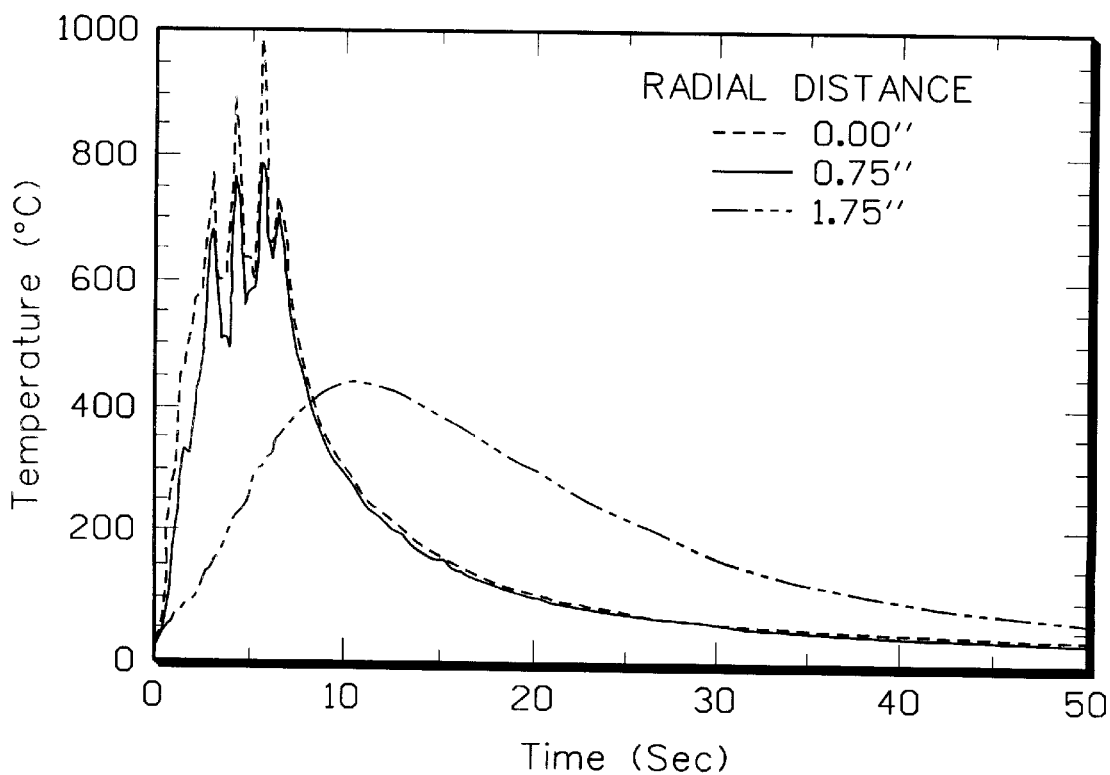

Comparing the temperature profiles of FIG. 35(a) with those of FIGS. 31(a)–(d) and the temperature profile of FIG. 35(b) with those of FIGS. 32(a)–(d) it is shown that light-off temperatures of between about 400° C. and about 600° C. can be readily attained even with pulsed hydrogen flow. One advantage of pulsed flow is the better utilization of the hydrogen and therefore conservation of the hydrogen supply.

Figure 36:
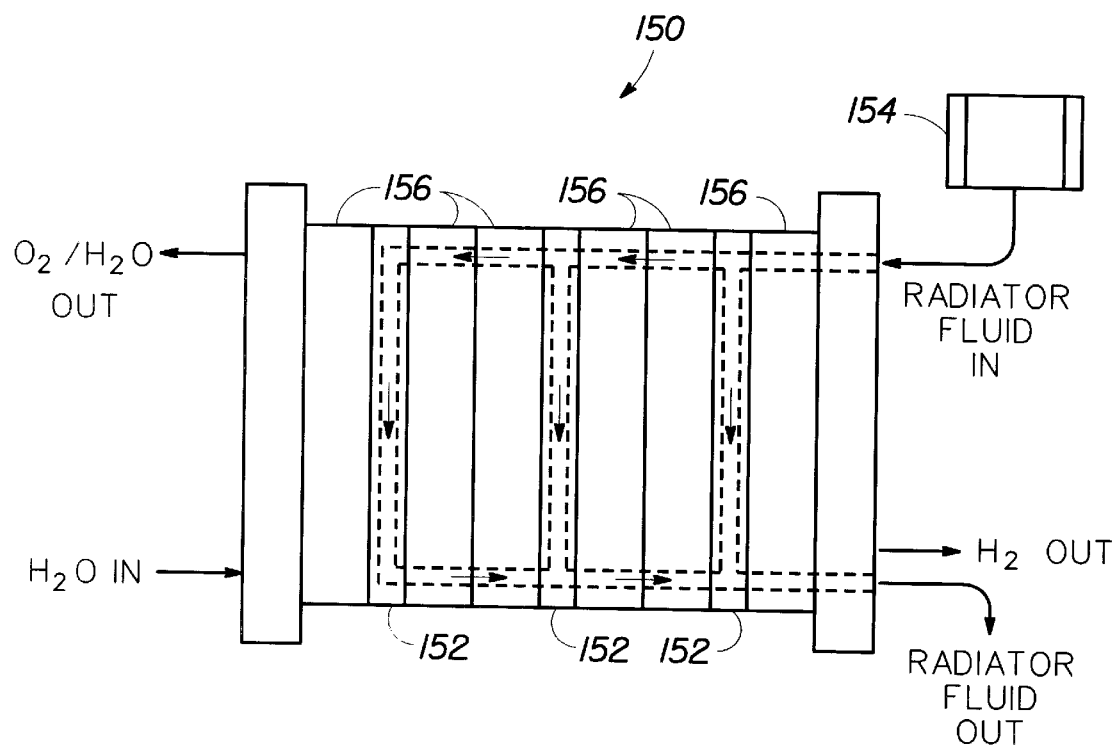
FIG. 36 is a schematic diagram of an electrolyzer having dummy cells for heating or cooling the electrolyzer using liquid from a vehicle radiator.

FIG. 36 is a schematic diagram of an electrolyzer 150 having non-gas producing cells 152 used for heating or cooling the electrolyzer using liquid from a vehicle radiator 154. These cells 152 may be comprised of plates providing a passage for the radiator fluid between electrolytic cells 156 in order to absorb or deliver heat to the electrolyzer. Because electrolyzers operate most efficiently at elevated temperatures, the radiator may be used to warm the electrolyzer in cold weather conditions. Alternately, the radiator fluid may be used to cool the electrolyzer after an extended period of use.

Figure 37A:
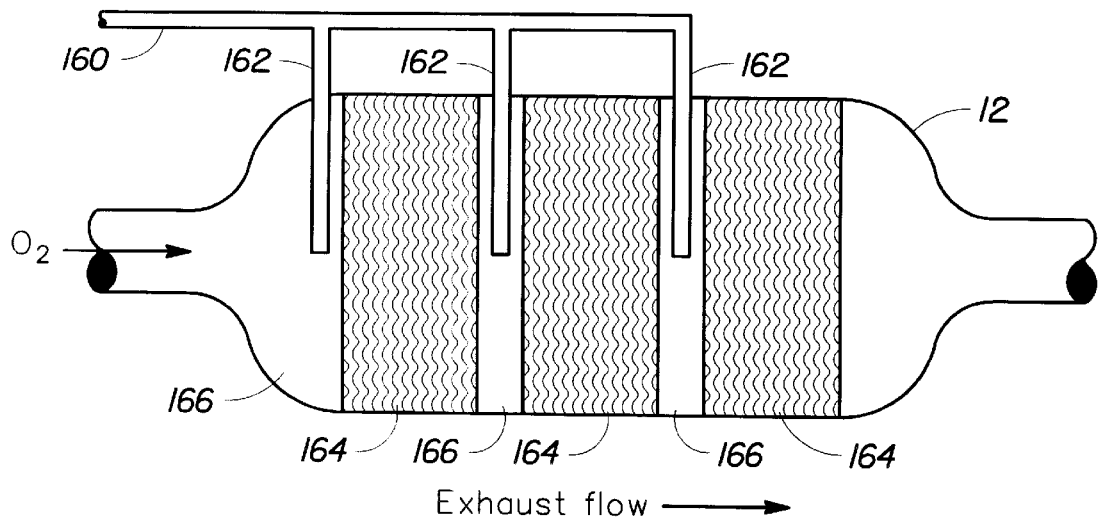
FIGS. 37(a–b) are catalyst monoliths having hydrogen injection distributors.
Figure 37B:
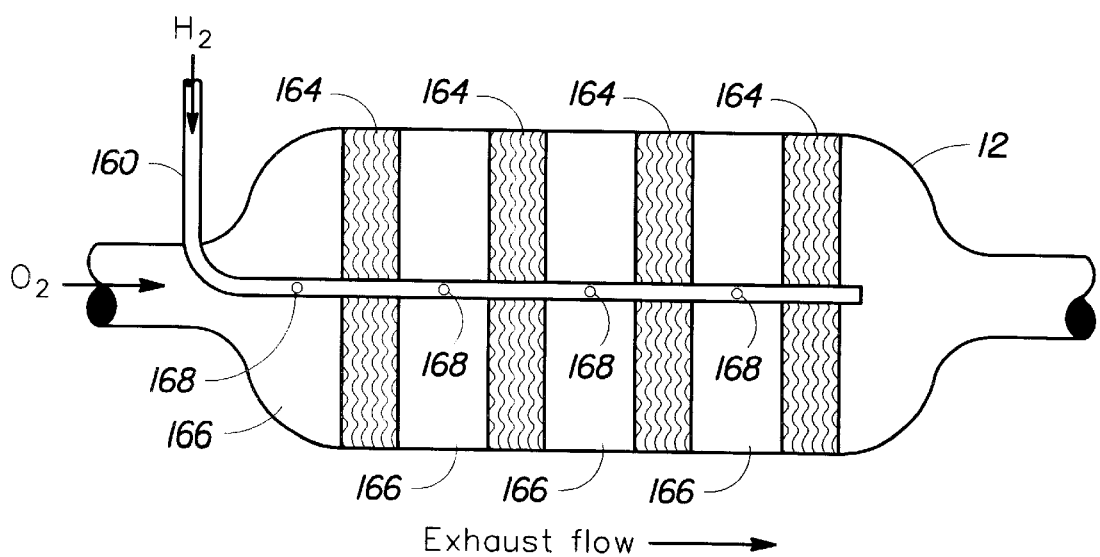

FIGS. 37(a) and (b) are two catalytic converters 12 having different hydrogen injection means 160. In each of the figures, the converters 12 have multiple monoliths 164 separated by a region 166 for hydrogen introduction and diffusion. In FIG. 37(a), the injection means 160 is primarily external to the converter 12 with a plurality of injection tubes 162 delivering hydrogen into the gaps 166. Conversely, in FIG. 37(b) the injection means 160 passes through the monoliths 164 with a plurality of holes or ports 168 for hydrogen delivery into the gaps 166. In a very similar manner, air or air/oxygen may be introduced in multiple locations to improve mixing, distribution, or hydrogen and oxygen combination characteristics such as uniformity across the face of the catalyst.

Figure 38:
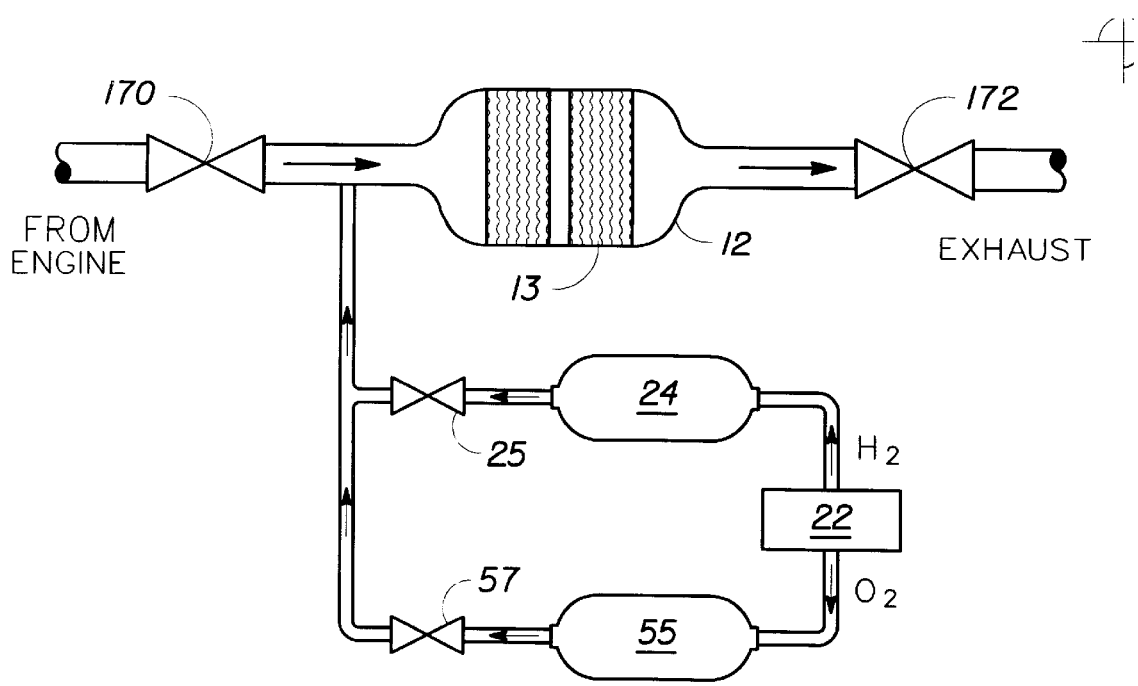
FIG. 38 is a schematic diagram of a catalytic converter having isolation valves allowing hydrogen or oxygen to diffuse evenly throughout the monolith before delivery of another gas to provide a combustible mixture.

FIG. 38 is a schematic diagram of a catalytic converter 12 having an upstream isolation valve 170 and a downstream isolation valve 172. When the valves 170, 172 are closed, hydrogen can be injected into the monolith 13 and allowed to diffuse evenly throughout the monolith. After only a fraction of a second for difflusion, the valve 172 is opened and oxygen is delivered to provide a combination mixture. Alternatively, because oxygen is a larger molecule and diffuses more slowly, it may be similarly advantageous to first diffuse oxygen into the isolated monolith, then introduce hydrogen while opening valve 172.

Figure 39A:
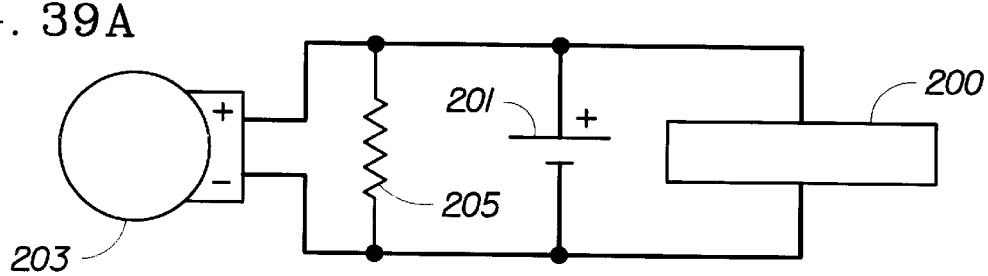
FIGS. 39(a–e) are schematic diagrams of alternative electrical systems for providing electrical power to the electrolyzer.
Figure 39B:
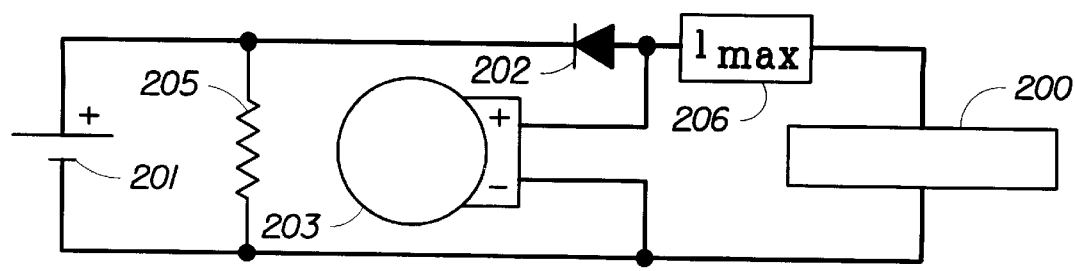
Figure 39C:
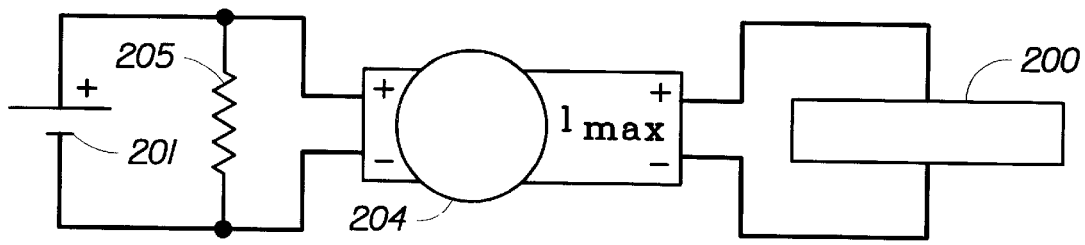
Figure 39D:
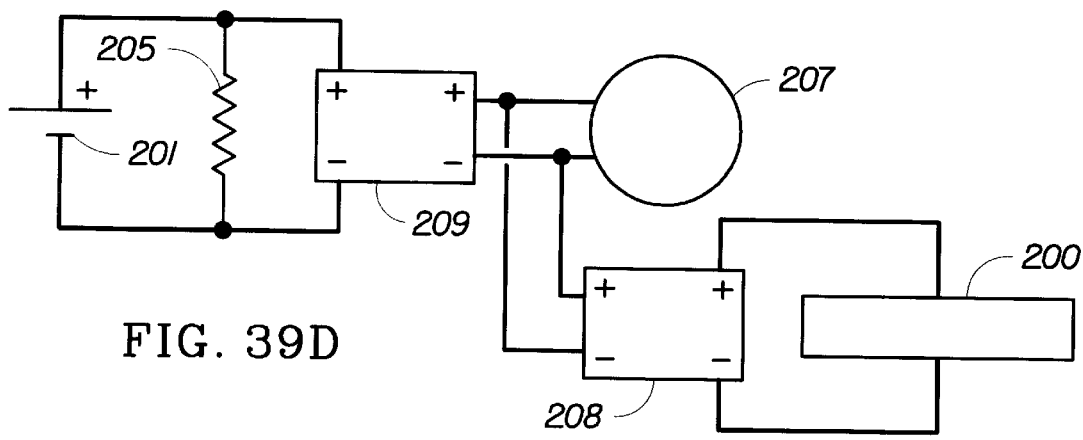

Now referring to FIGS. 39(a)–(e) which are schematic diagrams outlining four possible topologies for the powering of the electrolyzer system 200. In FIG. 39(a) the primary source of electrolyzer power is drawn directly from the vehicle battery 201 as well as from the alternator 203. FIG. 39(b) eliminates the electrical draw on the battery 201 by placing diode 202 between the alternator 203 and the battery 201. Diode 202 allows current flow from the alternator to the battery and other vehicle loads 205 but stops current flow from the battery to the electrolyzer 200. The current limiting circuit 206 protects the electrical system from over currents that could be drawn by the electrolyzer as the electrolyzer resistance changes. FIG. 39(c) is shown having an alternator 204 having an additional winding in which the magnetic circuit provides current limiting to the electrolyzer 200. This second winding would also allow higher voltages to be delivered to the electrolyzer 200, allowing the number of cells within the stack to be increased. FIG. 39(d) shows a system in which the vehicle alternating current is drawn from the alternator 207 before the vehicle regulator 209 and a separate current control/regulator 208 provides electrical power to the electrolyzer 200. This topology is able to current limit the electrolyzer load and provide higher voltages to the electrolyzer while using a conventional alternator.

Figure 39E:
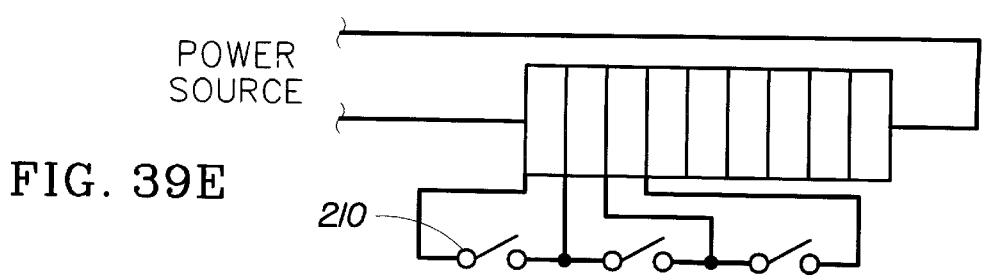

FIG. 39(e) shows a method of controlling the electrolyzer current while maintaining overall electrical conversion efficiency. In this mode of operation, the full potential of the vehicle's electrical system is placed across the electrolyzer 200. Individual cells are then bypassed by external mechanical or solid state switches 210, to lower the effective resistance of the electrolyzer, in steps, until a current close to the desired current is achieved. Cells may be switched in and out as desired to maintain the current within a window.

FIGS. 40 and 41 are schematic diagrams of two alternate embodiments of the system of FIG. 26, wherein the water recovery system in the vessel 24 is eliminated. Both alternate systems 220, 240 utilize a proton exchange membrane with the cell 22 which, when operated at sufficiently low current density, will provide the necessary reaction water to the anode when that water is provided at the cathode. The system 220 of FIG. 40 includes a pressurized cathode (hydrogen) reservoir 222 with means 224 for releasing the pressure and refilling the reservoir with water. Alternatively, the reservoir 222 could be filled using pressurized water, which would allow manufacturing control over filling if the system requires specialized equipment.

To eliminate the complexity and safety issues involved, the system 240 shown in FIG. 41 uses an anode reservoir 242 and a cathode reservoir 244. This system 240 still utilizes osmotic movement of the water from the cathode to the anode in normal operating mode but new water is provided at the anode (at ambient pressure) and this water is transferred to the cathode via electroosmosis during the initial operation of the electrolyzer 22 after filling the anode reservoir 242. Once all the anode water is depleted, electroosmosis between the reservoirs 242,244 ceases and, once again, all process water is provided through the cathode.

While the foregoing is directed to the preferred embodiment of the present invention, other and further embodiments of the invention may be devised without departing from the basic scope thereof, and the scope thereof is determined by the claims which follow.

What is claimed is:

1. A method of conditioning a catalyzed monolith included in the exhaust system of an internal combustion engine for catalytic destruction or decomposition of a pollutant exhaust gas having a lightoff temperature, comprising the steps of:

(a) substantially drying only a first region of the catalyzed monolith immediately prior to, during or just after starting of the engine on electrically heating only the first region of the catalyzed monolith; and then (b) catalytically oxidizing a fuel that undergoes catalytic oxidation with oxygen in the catalyzed monolith at a temperature less than the lightoff temperature of the pollutant exhaust gas.

2. The method of claim 1, wherein the fuel catalytically oxidizes at a temperature below about 250° C.

3. The method of claim 1, wherein the fuel catalytically oxidizes at a temperature below about 130° C.

4. The method of claim 1, wherein the fuel catalytically oxidizes at a temperature below about 75° C.

5. The method of claim 1, further comprising the step of:

(c) passing the pollutant exhaust gas through the catalyzed monolith.

6. The method of claim 1, wherein the fuel is selected from hydrogen, methanol, ethanol, dimethoxymethane, trimethoxymethane, methylformate, diethyl ether, and combinations thereof.

7. The method of claim 1, further comprising the step of:

(c) after step (b), catalytically combining oxygen and a second fuel that undergoes catalytic oxidation at a temperature less than the lightoff temperature of the pollutant exhaust gas in the catalyzed monolith.

8. The method of claim 1, wherein the fuel is an organic gas.

9. The method of claim 8, further comprising the step of:

(c) mixing the gaseous fuel with oxygen to obtain a substantially homogeneous mixture prior to introducing the fuel to the catalyzed monolith.

10. The method of claim 8, wherein the fuel is selected from propane, butane, propene, butene and combinations thereof.

11. The method of claim 1, wherein the fuel is an organic liquid.

12. The method of claim 11, further comprising the step of:

(c) mixing the liquid fuel with oxygen to obtain a substantially homogeneous mixture prior to introducing the fuel to the catalyzed monolith.

13. The method of claim 11, wherein the liquid fuel is introduced to the catalyzed monolith as a fine mist or spray.

14. The method of claim 13, wherein the liquid fuel has droplets sized less than about 25 $\mu$m.

15. The method of claim 11, wherein the fuel is selected from pentane, hexane, heptane, pentene, hexene, heptene and combinations thereof.

16. The method of claim 1, further comprising the step of:

(c) providing a source of oxygen to the catalyzed monolith.

17. The method of claim 16, further comprising the step of:

(d) providing to the catalyzed monolith an excess of oxygen with respect to the fuel.

18. The method of claim, 16, further comprising the step of:

(d) providing to the catalyzed monolith a substantially stoichiometric amount of oxygen with respect to the fuel.

19. The method of claim 16, further comprising the step of:

(d) providing to the catalyzed monolith a sub-stoichiometric amount of oxygen with respect to the fuel.

20. The method of claim 1, further comprising the step of:

(c) electrically heating the catalyzed monolith to a temperature above about 100° C.

21. The method of claim 20, further comprising the step of:

(c) electrically heating the catalyzed monolith to a temperature sufficiently high to provide substantially complete oxidation of the fuel that undergoes catalytic oxidation at a temperature less than the lightoff temperature of the pollutant exhaust gas.

22. The method of claim 21, further comprising the step of:

(c) catalytically combining oxygen and the fuel in the catalyzed monolith to yield a temperature to provide oxidation of the pollutant exhaust gas.

23. The method of claim 22, further comprising the step of:

(d) adjusting the flow rate of the fuel or the oxygen to obtain a catalyst temperature sufficiently high to provide oxidation of the pollutant exhaust gas.

24. The method of claim 22, wherein the fuel that undergoes catalytic oxidation at a temperature less than the lightoff temperature of the pollutant exhaust gas is a liquid fuel, and further comprising the step of introducing the liquid fuel to the catalyzed monolith as a fine mist or spray.

25. The method of claim 20, further comprising the step of:

(c) electrically heating the catalyzed monolith to a temperature above about 250° C.

26. The method of claim 1, further comprising the step of:

(c) after step (b), catalytically combining oxygen and a second fuel that undergoes catalytic oxidation in the catalyzed monolith at a temperature less than the lightoff temperature of the pollutant exhaust gas, wherein the second fuel is a liquid fuel; and (d) introducing the liquid fuel to the catalyzed monolith as a fine mist or spray.

27. The method of claim 1, wherein the fuel is hydrogen gas.

28. The method of claim 1, wherein step (b) is initiated before step (a) is terminated.

29. A method of heating a catalyzed monolith included in the exhaust system of an internal combustion engine, comprising the steps of:

(a) substantially drying only a first portion of the catalyzed monolith and raising the temperature of the catalyzed monolith to a first temperature immediately prior to or during starting of the engine on electrically heating said portion of the catalyzed monolith; and then (b) chemically heating the portion of the catalyzed monolith to a second temperature greater than the first temperature.

30. The method of claim 29, wherein the step of chemically heating comprises catalytically combining a fuel that undergoes catalytic oxidation with oxygen at a temperature less than the lightoff temperature of a pollutant exhaust gas produced by the internal combustion engine.

31. A method of conditioning a catalyzed monolith included in the exhaust system of an internal combustion engine, wherein the catalyzed monolith is housed within a canister having an inlet end and an outlet end, and further, wherein the monolith includes a substrate having a surface coated with a washcoat layer containing catalyst particles for the catalytic destruction or decomposition of a pollutant exhaust gas compound, comprising the steps of:

(a) partially drying only a first region of the catalyzed monolith immediately prior to, during or just after starting of the engine to render the catalyst particles on the outer surface of the washcoat layer substantially dry on electrically heating only the first region of the catalyzed monolith; and (b) catalytically oxidizing hydrogen on the dry catalyst particles to heat the catalyst particles to a light-off temperature for the pollutant exhaust gas compound.

32. The method of claim 31, wherein the step of drying only a first region of the catalyzed monolith continues until the catalyst particles reach a temperature of at least 100° C.

33. The method of claim 32, wherein the porous substrate is selected from porous metals or porous ceramic materials.

34. The method of claim 32, wherein the porous substrate is hydrophilic and contains nano-pores and micro-pores.

35. The method of claim 32, wherein the substrate and washcoat have sufficient porosity to draw condensates into the substrate.

36. The method of claim 31, wherein the catalyzed monolith comprises:

(a) a porous substrate;

(b) a porous washcoat covering a surface of the porous substrate; and (c) catalyst particles exposed over a surface of the porous washcoat.

37. The method of claim 36, wherein the porous metal substrate comprises:

(a) sintered metal particles forming a resistive element of an electrical heater.

38. The method of claim 36, wherein the porous substrate has pores with a diameter between about 5 and about 1000 Angstroms.

39. The method of claim 31, wherein the catalyzed monolith is a three-way catalytic converter monolith or a catalyzed regenerable particulate filter.

40. The method of claim 31, wherein the pollutant exhaust gas compound is contained in the exhaust gas stream produced by the internal combustion engine.

41. The method of claim 31, wherein the pollutant exhaust gas compound is selected from hydrocarbons, their partially oxidized derivatives such as aldehydes and carbon monoxide, and oxides of nitrogen.

42. The method of claim 31, wherein the source of hydrogen is an electrolyzer.

43. The method of claim 31, wherein the steps of electrically heating and catalytically oxidizing hydrogen are performed in sequence or overlapping with each other.

44. A method of conditioning a catalyzed monolith included in the exhaust system of an internal combustion engine, wherein the catalyzed monolith is contained within a canister having an inlet end and an outlet end, and further, wherein the monolith includes a substrate having a surface coated with a washcoat containing catalyst particles for the catalytic destruction or decomposition of a pollutant exhaust gas compound, comprising the steps of:

(a) partially drying only a first, region of the catalyzed monolith and raising the temperature of the monolith to a temperature of 100° C. making at least a portion of the outer surface of the washcoat substantially dry on electrically heating only the first region of the catalyzed monolith immediately prior to or during starting of the engine;

(b) catalytically combining hydrogen with oxygen on the outer dry catalyzed surface to heat the catalyst particles to a temperature in the range 120° C. to 250° C.; and then (c) catalytically oxidizing an organic fuel that readily oxidizes on the surface of the dry and heated catalyst particles to heat the catalyst particles to a light-off temperature for the pollutant exhaust gas compound.

45. The method of claim 44, wherein the step of catalytically oxidizing the organic fuel heats the catalyst particles to at least 300°0 C.

46. The method of claim 44, wherein the source of oxygen is pure oxygen or air.

47. The method of claim 44, wherein the organic fuel catalytically oxidizes at a temperature below 250° C.

48. The method of claim 44, wherein the organic fuel catalytically oxidizes at a temperature below 130° C.

49. The method of claim 44, wherein the organic fuel catalytically oxidizes at a temperature below 75° C.

50. The method of claim 44, wherein the organic fuel is a gas or a liquid at room temperature and atmospheric pressure.

51. The method of claim 44, wherein the steps of electrically heating, catalytically combining hydrogen with oxygen, and catalytically oxidizing an organic fuel are carried out sequentially or overlapping each other.

52. The method of claim 44, wherein a plurality of organic fuels are used.

53. The method of claim 44, wherein the hydrogen undergoes catalytic oxidation at a lower catalytic oxidation temperature than the organic fuel.

54. The method of claim 44, wherein the organic fuel is selected from pentane, methanol, hexane, ethanol, heptane, dimethoxymethane, pentene, trimethoxymethane, hexene, methylformate, heptene, diethyl ether, and combinations thereof.

55. The method of claim 44, wherein the organic fuel is selected from methanol, ethanol, dimethoxymethane, trimethoxymethane, methylformate, diethyl ether, or combinations thereof.

56. A method of conditioning a catalyzed monolith included in the exhaust system of an internal combustion engine, wherein the catalyzed monolith is located within a canister having an inlet end and an outlet end, and further, wherein the monolith includes a substrate having a surface coated with a washcoat containing catalyst particles for the catalytic destruction or decomposition of a pollutant exhaust gas compound, comprising the steps of:

(a) partially drying only a first region of the catalyzed monolith and raising the temperature of the monolith to a temperature in the range 90° C. to 120° C. to substantially dry the catalyst particles over at least a portion of the outer surface of the monolith on electrically heating only the first region of the catalyzed monolith immediately prior to or during starting of the engine; and then (b) catalytically oxidizing one or more fuels on the dry catalyst particles, such that the temperature of the catalyst particles reach light-off temperature for the pollutant exhaust gas compound.

57. The method of claim 56, wherein the one or more fuels comprise a first fuel that catalytically oxidizes on the dry catalyzed surface at a temperature below −7° C., and a second fuel that catalytically oxidizes on the dry catalyzed surface at a temperature below 25° C.

58. A method of conditioning a catalyzed monolith fixed within a canister having an inlet end and an outlet end, wherein the monolith includes a substrate having a surface coated with a washcoat layer containing catalyst particles for the catalytic destruction or decomposition of a pollutant compound, and wherein at least one temperature measuring device is in thermal communication with the monolith and in electronic communication with an electronic control unit, comprising the steps of:

(a) switching on a source of electrical energy to an electrical heater within a first region of the catalyzed monolith on receiving a signal from the electronic control unit;

(b) supplying a source of hydrogen and a source of oxygen to the first region of the catalyzed monolith on receiving a signal corresponding to a temperature in the range 50° C. to 100° C. from the electronic control unit;

(c) switching off the supply of electrical energy on receiving a signal corresponding to a temperature of no greater than 120° C. from the electronic control unit;

(d) supplying a source of one or more organic fuels and a source of oxygen to the first region of the catalyzed monolith on receiving a signal corresponding to a temperature in the range of 150° C. to 200° C. from the electronic control unit;

(e) switching off the supply of hydrogen on receiving a signal corresponding to a temperature of no greater than 250° C. from the electronic control unit;

(f) introducing the pollutant compound to the catalyzed monolith on receiving a signal corresponding to a temperature in the range 250° C. to 300° C. from the electronic control unit;

(g) switching off the supply of the one or more organic fuels on receiving a signal corresponding to the light-off temperature for the pollutant compound from the electronic control unit; and (h) switching off the source of oxygen to the catalyzed monolith.

59. The method of claim 58, wherein the electronic control unit is also electrically connected to the sources of electrical energy, hydrogen, oxygen, the one or more organic fuels, and the pollutant compound.

60. The method of claim 58, wherein after step (a) the first region of the catalyzed monolith is substantially dry.

61. The method of claim 58, wherein the flow rate of hydrogen, oxygen, and the one or more organic fuels can be adjusted in real time by means of the electronic control unit to quickly and efficiently reach a set point temperature or avoid an undesirably high temperature.

62. The method of claim 58, wherein the one or more organic fuels is a gas, a liquid, or a combination thereof at room temperature and atmospheric pressure.

63. The method of claim 58, wherein the source of hydrogen and the source of one or more organic fuels are delivered in a mode selected from continuous flow or pulsed flow.

64. The method of claim 58, wherein the one or more organic fuels is selected from pentane, methanol, hexane, ethanol, heptane, dimethoxymethane, pentene, trimethoxymethane, hexene, methylformate, heptene, diethyl ether, and combinations thereof.

65. The method of claim 58 wherein the one or more organic fuels is selected from methanol, ethanol, dimethoxymethane, trimethoxymethane, methylformate, diethyl ether, and combinations thereof.

66. A method of conditioning a catalyzed monolith fixed within a canister having an inlet end and an outlet end, wherein the monolith includes a substrate having a surface coated with a washcoat layer containing catalyst particles for the catalytic destruction or decomposition of a pollutant compound, and wherein at least one temperature measuring device is in thermal communication with the monolith and in electronic communication with an electronic control unit, comprising the steps of:

(a) switching on a source of electrical energy to an electrical heater within a first region of the catalyzed monolith on receiving a signal from the electronic control unit;

(b) supplying a source of hydrogen and a source of oxygen to the first region of the catalyzed monolith on receiving a signal corresponding to a temperature in the range 50° C. to 100° C. from the electronic control unit;

(c) switching off the supply of electrical energy on receiving a signal corresponding to a temperature of no greater than 120° C. from the electronic control unit;

(d) introducing the pollutant compound to the catalyzed monolith on receiving a signal corresponding to a temperature in the range 250° C. to 300° C. from the electronic control unit;

(e) switching off the supply of hydrogen on receiving a signal corresponding to the lightoff temperature for the pollutant compound from the electronic control unit;

(f) switching off the source of oxygen to the catalyzed monolith.

67. The method of claim 66, wherein the one or more organic fuels is selected from pentane, methanol, hexane, ethanol, heptane, dimethoxymethane, pentene, trimethoxymnethane, hexene, methylformate, heptene, diethyl ether, and combinations thereof.

68. The method of claim 66, wherein the one or more organic fuels is selected from methanol, ethanol, dimethoxymethane, trimethoxymethane, methylformate, diethyl ether, and combinations thereof.

69. The method of claim 66, wherein the electronic control unit is also electrically connected to the sources of electrical energy, hydrogen, oxygen, the one or more organic fuels, and the pollutant compound.

70. The method of claim 66, wherein after step (a) the first region of the catalyzed monolith is substantially dry.

71. The method of claim 66, wherein the flow rate of hydrogen, oxygen, and the one or more organic fuels can be adjusted in real time by means of the electronic control unit.

72. The method of claim 66, wherein the source of hydrogen and the source of one or more organic fuels are delivered in a mode selected from continuous flow or pulsed flow.

73. A method of conditioning a catalyzed monolith fixed within a canister having an inlet end and an outlet end, wherein the monolith includes a substrate having a surface coated with a washcoat layer containing catalyst particles for the catalytic destruction or decomposition of a pollutant compound, and wherein at least one temperature measuring device is in thermal communication with the monolith and in electronic communication with an electronic control unit, comprising the steps of:

(a) switching on a source of electrical energy to an electrical heater within a first region of the catalyzed monolith on receiving a signal from the electronic control unit;

(b) supplying a source of one or more organic fuels and a source of oxygen to the first region of the catalyzed monolith on receiving a signal corresponding to a temperature in the range of 150° C. to 200° C. from the electronic control unit;

(c) switching off the supply of electrical energy on receiving a signal corresponding to a temperature of no greater than 250° C. from the electronic control unit;

(d) introducing the pollutant compound to the catalyzed monolith on receiving a signal corresponding to a temperature in the range 250° C. to 300° C. from the electronic control unit;

(e) switching off the supply of the one or more organic fuels on receiving a signal corresponding to the lightoff temperature for the pollutant compound from the electronic control unit; and (f) switching off the source of oxygen to the catalyzed monolith.

74. The method of claim 73, wherein the one or more organic fuels is selected from pentane, methanol, hexane, ethanol, heptane, dimethoxymethane, pentene, trimethoxymethane, hexene, methylformate, heptene, diethyl ether, and combinations thereof.

75. The method of claim 73, wherein the one or more organic fuels is selected from methanol, ethanol, dimethoxymethane, trimethoxymethane, methylformate, diethyl ether, and combinations thereof.

76. The method of claim 73, wherein the electronic control unit is also electrically connected to the sources of electrical energy, hydrogen, oxygen, the one or more organic fuels, and the pollutant compound.

77. The method of claim 73, wherein after step (a) the first region of the catalyzed monolith is substantially dry.

78. The method of claim 73, wherein the flow rate of hydrogen, oxygen, and the one or more organic fuels can be adjusted in real time by means of the electronic control unit.

79. The method of claim 73, wherein the source of hydrogen and the source of one or more organic fuels are delivered in a mode selected from continuous flow or pulsed flow.

80. A method of conditioning a catalyzed monolith included in the exhaust system of an internal combustion engine for catalytic destruction or decomposition of a pollutant exhaust gas having a lightoff temperature, comprising the steps of:

(a) initiating electrically heating of only a first region of the catalyzed monolith immediately prior to or during starting of the engine; and then (b) switching off the electrical heating when the first region is substantially dry; and then (c) catalytically oxidizing a fuel that undergoes catalytic oxidation in the catalyzed monolith at a temperature less than the lightoff temperature of the pollutant exhaust gas.

81. The method of claim 80, wherein the fuel is hydrogen.

82. A method of conditioning a catalyzed monolith for catalytic destruction or decomposition of a pollutant gas, comprising the steps of:

(a) initiating electrically heating of only a first region of the catalyzed monolith; then (b) switching off the electrical heating when the first region is substantially dry; and then (c) catalytically oxidizing a fuel that undergoes catalytic oxidation in the catalyzed monolith at a temperature less than the lightoff temperature of the pollutant gas.

83. The method of claim 82, further comprising the step of:

(d) supplying a source of oxygen to the catalyzed monolith.

84. The method of claim 83, wherein the source of oxygen is air.

85. The method of claim 82, farther comprising the step of:

(d) supplying fuel to provide the catalyzed monolith at the lightoff temperature of the pollutant gas.

86. The method of claim 82, further comprising the step of:

(d) switching off the fuel when the first region of the catalyzed monolith reaches the lightoff temperature of the pollutant gas.

87. A method of conditioning a catalyzed monolith for catalytic destruction or decomposition of a pollutant gas, comprising the steps of:

(a) electrically heating only a first region of the catalyzed monolith to substantially dry the first region;

(b) introducing a fuel into the first region that undergoes catalytic oxidation in the catalyzed monolith at a temperature less than the lightoff temperature of the pollutant gas, wherein the steps of electrically heating and introducing a fuel overlap to provide a continuously increasing temperature of the catalyzed monolith.

88. The method of claim 87, further comprising the step of:

(c) switching off the electrical heating upon the catalyzed monolith reaching a temperature greater than the temperature at which the fuel was first introduced.

89. The method of claim 87, further comprising the step of:

(c) blowing air into the catalyzed monolith prior to and during steps (a) and (b).

* * * * *

UNITED STATES PATENT AND TRADEMARK OFFICE
CERTIFICATE OF CORRECTION

PATENT NO.    : 6,235,254 B1
DATED         : May 22, 2001
INVENTOR(S)   : Oliver J. Murphy et al.

It is certified that error appears in the above-identified patent and that said Letters Patent is hereby corrected as shown below:

Column 1,
Line 4, insert the following: -- This invention was made with government support under contract number DMI-9661351 awarded by the National Science Foundation (NSF). The government has certain rights in this invention. --.

Signed and Sealed this

Third Day of January, 2006

JON W. DUDAS
*Director of the United States Patent and Trademark Office*